United States Patent [19]
Yamazaki

[11] Patent Number: 5,986,649
[45] Date of Patent: Nov. 16, 1999

[54] POWER CIRCUIT, LIQUID CRYSTAL DISPLAY DEVICE, AND ELECTRONIC EQUIPMENT

[75] Inventor: Suguru Yamazaki, Suwa, Japan

[73] Assignee: Seiko Epson Corporation, Tokyo, Japan

[21] Appl. No.: 08/704,556

[22] PCT Filed: Jan. 11, 1996

[86] PCT No.: PCT/JP96/00025

§ 371 Date: Nov. 18, 1996

§ 102(e) Date: Nov. 18, 1996

[87] PCT Pub. No.: WO96/21880

PCT Pub. Date: Jul. 18, 1996

[30] Foreign Application Priority Data

| Jan. 11, 1995 | [JP] | Japan | 7/002949 |
| Jul. 7, 1995 | [JP] | Japan | 7/172620 |
| Jul. 18, 1995 | [JP] | Japan | 7/181976 |

[51] Int. Cl.[6] ............................. G09G 3/36; G09G 5/00
[52] U.S. Cl. ............................. 345/211; 345/89; 345/95
[58] Field of Search ................... 345/87, 89, 94, 345/95, 98, 100, 211; 365/189.09, 189.11, 203, 226

[56] References Cited

U.S. PATENT DOCUMENTS

| 4,802,739 | 2/1989 | Iwamoto . | |
| 4,908,752 | 3/1990 | Suzuki et al. . | |
| 5,101,116 | 3/1992 | Morokawa . | |
| 5,229,761 | 7/1993 | Fuse . | |
| 5,262,881 | 11/1993 | Kuwata et al. . | |
| 5,343,221 | 8/1994 | Arakawa et al. | 345/211 |
| 5,510,814 | 4/1996 | Ise | 345/211 |
| 5,627,457 | 5/1997 | Ishiyama et al. | 345/94 |

FOREIGN PATENT DOCUMENTS

| 0 585 925 A2/A3 | 3/1994 | European Pat. Off. . |
| 0 645 751 A1 | 3/1995 | European Pat. Off. . |
| 54-5399 | 1/1979 | Japan . |
| 57-78092 | 5/1982 | Japan . |
| B2-57-57718 | 12/1982 | Japan . |
| 59-18992 | 1/1984 | Japan . |
| 61-33091 U | 2/1986 | Japan . |
| 2-150819 | 6/1990 | Japan . |
| 3-63998 | 3/1991 | Japan . |
| 3-200214 | 9/1991 | Japan . |
| 4-136981 | 5/1992 | Japan . |
| B2-5-34655 | 5/1993 | Japan . |
| B2-5-46954 | 7/1993 | Japan . |
| 7-120718 | 5/1995 | Japan . |
| 7-159754 | 6/1995 | Japan . |
| 7-160215 | 6/1995 | Japan . |

*Primary Examiner*—Matthew Luu
*Assistant Examiner*—David L. Lewis
*Attorney, Agent, or Firm*—Oliff & Berridge, PLC

[57] ABSTRACT

A power circuit which supplies VH, V3, V2, VC, -V2, -V3, VL, etc., which are potentials for driving a liquid crystal, with the objective of reducing the power consumption of a liquid crystal display device. Input power potentials VCC and GND are used without modification as V3 and VC, and high-level potentials VH and VL are supplied by a charge pump circuit. The charge pump circuit such as a negative-direction sextuple boosting circuit 2 uses a pulsed clock signal LP to operate. The circuit also has means for adjusting boosting/dropping ratios. The provision of two pumping capacitors ensures that a charge pump operation is performed every horizontal scan period, improving the display uniformity. When the supply of VCC, etc., is stopped, residual charge due to VH and VL is released. VCC and GND are used both as liquid crystal drive source and as power voltages for the logic portions of the drivers.

20 Claims, 39 Drawing Sheets

FIG. 10
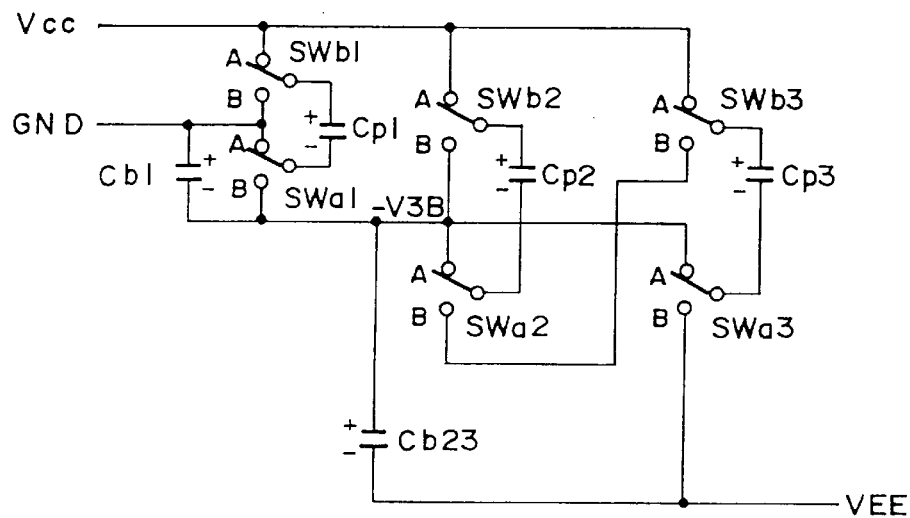
FIG. 11A
FIG. 11B
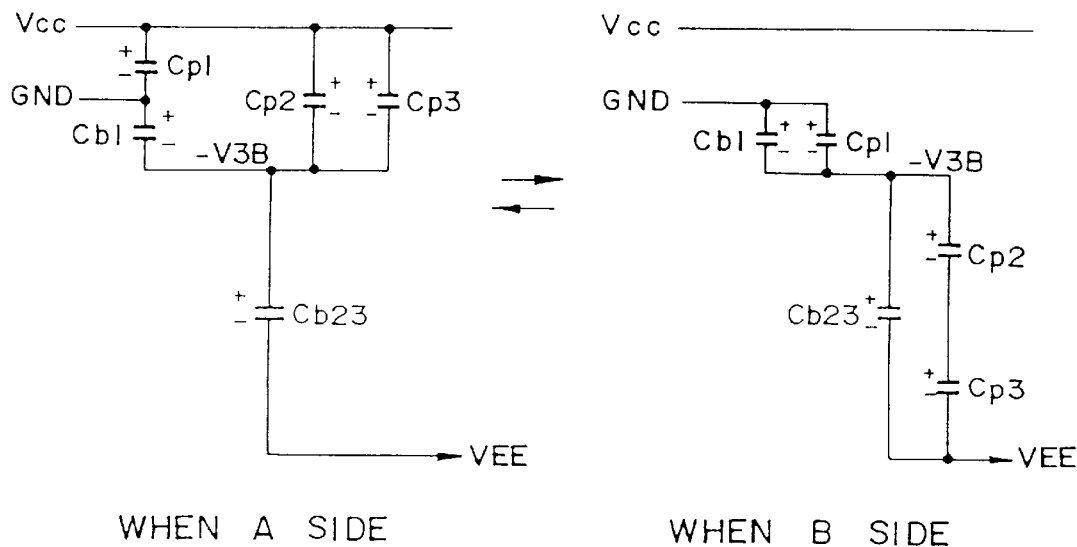
WHEN A SIDE
WHEN B SIDE

WHEN A SIDE  WHEN B SIDE

POWER CIRCUIT, LIQUID CRYSTAL DISPLAY DEVICE, AND ELECTRONIC EQUIPMENT

TECHNICAL FIELD

This invention relates to a power circuit, a liquid crystal display device that comprises this power circuit, and electronic equipment that comprises this liquid crystal display device.

BACKGROUND OF ART

A power circuit used in a liquid crystal display device driven by a one-line sequential drive method is described below as a first prior-art technique, with reference to FIG. 48. This diagram is basically the same as FIG. 3 of Japanese Patent Application Laid-Open No. 2-150819. In this case, V0 to V5 are in the relationship VD=(V0–V1)=(V1–V2)=(V3–V4) =(V4–V5), where VD is on the order of 1.6 V when the duty ratio is 1/240, for example.

The power source inputs to the liquid crystal display device from the exterior comprises VCC for the logic portions of the driver IC and VEE for creating the liquid crystal panel drive voltages, with GND as a reference potential. VEE is considerably higher than VCC; for example, it is on the order of 20 V to 25 V when the duty ratio is 1/240. Among V0 to V5, VEE is used without modification as V0 and GND as V5. V1+0V4 are obtained by division by resistances R1 to R5 between VEE and GND, the impedances of these outputs are lowered by operational amplifiers (op-amps) OP1 to OP4, and the resultant outputs are used as the remaining V1 to V4. OP1 to OP4 operate at VEE so that VCC is not directly used when the panel drive voltage is generated.

The description now turns to power consumption, with the scan line side being denoted by Y and the data line side being denoted by X. For instance, the scan line electrodes for the panel are called Y electrodes, the driver IC that drives these Y electrodes is called the Y driver, the data line electrodes of the panel are called X electrodes, and the driver IC that drives these X electrodes is called the X driver. The voltage applied to each non-selected Y electrode is V1 or V4. If the non-selected Y electrodes are at V1, the voltage applied to the X electrodes is V0 or V2; if the non-selected Y electrodes are at V4, the voltage applied to the X electrodes is V3 or V5.

With a duty ratio of 1/240, the Y electrode for one line alone is in a selected state; the remaining 239 lines are all in a non-selected state. Therefore, the charging/discharging current that flows between each X electrode and the selected Y electrode is much smaller than the charging/discharging current that flows between each X electrode and non-selected Y electrodes. That is to say, the current consumption of the liquid crystal panel itself is largely due to the charging/discharging currents flowing between each X electrode and the non-selected Y electrodes. Thus the description here concentrates only on the charging/discharging currents flowing between the X electrodes and the non-selected Y electrodes.

Consider, as an example, a case in which the voltage at an X electrode changes from V0 to V2 when the voltage of the non-selected Y electrodes is V1. If the capacitance of the liquid crystal layer between the X and Y electrodes is assumed to be Cpn, a charge of Cpn×(V0–V1) flows from V0 and into V1 when the voltage at the X electrode changes from V0 to V1 (see D in FIG. 48). When the voltage at the X electrode then changes from V1 to V2, a charge of Cpn×(V1–V2) flows from V1 and into V2 (see E). Since V0–V1=V1–V2 in this example, the charge flowing into V1 and the charge flowing out of V1 are equal. Therefore, the balance of the charges flowing into and out of V1 is zero, so that a charge of Cpn×(V0–V2) effectively flows from V0 and into V2 (see F). This charge passes through the op-amp OP2 and eventually flows to GND (see G). However, this charge migrates within OP2 so that it does no effective work along the path to GND, so that thermal losses are generated and OP2 simply becomes hotter. If it is assumed that the panel charging/discharging current in this case is Ipn and GND is 0V, the power consumption due to this Ipn is: Ipn×VEE. As is clear from G in FIG. 48, the effective utilization factor of Ipn is: (V0–V2)/VEE. For a duty ratio of 1/240, VEE is 20 V to 25 V when (V0–V2) is on the order of (2×1.6) V, so that the effective utilization factor is no more than 16%.

The description now turns to a power circuit used in a liquid crystal display device driven by a four-line simultaneous selection drive method, as a second prior-art technique. The basic concept of the multiple lines selection (MLS) drive method in which a plurality of Y electrodes (row electrodes) are simultaneously selected is disclosed in Document 1 (A Generalized Addressing Technique for RMS Responding Matrix LCDs, Proceedings of the 1988 International Display Research Conf, pp. 80–85) and U.S. Pat. No. 5,262,881. A simple one-line sequential drive has a problem in that contrast is degraded if the response of the liquid crystal is fast, but use of the MLS drive method can solve this problem.

When L lines (where L is a positive integer greater than 1) are simultaneously selected by an MLS drive method, it is necessary to have potentials at a total of three levels for the Y electrodes thereof: VM, and VH and VL positioned with this VM as a center potential. In this case, VM is a non-selection potential and VH and VL are selection potentials. Similarly, potentials at (L+1) levels centered on VM are necessary for the X electrodes. As L increases, the voltage amplitude VH–HL for driving the Y electrodes decreases, but conversely a large voltage amplitude is necessary for driving the X electrodes.

An example of a power circuit that could be considered when using the four-line simultaneous selection drive method is shown in FIG. 49. The voltages necessary for driving the panel are VH and VL that act as selection voltages for the Y electrodes, VM that acts as the non-selection voltage for the Y electrodes, and Vx0 to Vx4 that act as drive voltages for the X electrodes. VM is the center potential of voltages applied to the panel, and the other voltages are in the following relationships: (VH–VM)=(VM–VL) and (Vx0–Vx1) =(Vx1–Vx2)=(Vx2–Vx3)=(Vx3–Vx4). The center potential Vx2 on the X electrode side is at the same potential as VM. For a panel with a 1/240 duty ratio, for example, (VH–VL) is on the order of 25 V and (Vx0–Vx1) is on the order of 1.6 V.

Input power source that is input from the exterior of the liquid crystal display device comprises VCC for the logic portions of the driver ICs and VEE (=VH–VL) for creating the liquid crystal panel drive voltages, with respect to GND as a reference potential (0 V), and, as described above, VEE is a high voltage in comparison with VCC. It should be noted that VDDy and VSSy in FIG. 49 are voltages for the logic portion of the Y driver, and VCC and GND are connected thereto directly. Similarly, VDDx and VSSx are voltages for the logic portion of the X driver, where VDDx–VSSx=VCC if GND is 0 V. The resisting voltage necessary for the X driver is (Vx0–Vx4), which is on the order of 7 V for a panel with a 1/240 duty ratio, for example. VEE and GND are used without modification as VH and VL, respectively. Voltages divided by resistors R1 to R6 between VEE and GND, with their impedances lowered by op-amps OP1 to OP6, are used as Vx0 to Vx4 and VSSx. To ensure that the relationship (VDDx−VSSx)=VCC is satisfied, the resistances of R7 to R10 are set such that R7 =R8 and R9=R10. OP1 to OP6 operate on VEE and VCC has no direct effect on the formation of the panel drive voltages.

The description now turns to the power consumption that occurs when the power circuit of FIG. 49 is used. The voltage applied to each Y electrode when it is not selected is VM and the voltage applied to each X electrode is one of Vx0 to Vx4. In the same manner as in the previously described one-line sequential drive method, a large part of the current consumption of the liquid crystal panel itself is due to the charging/discharging currents flowing between the X electrodes and the non-selected Y electrodes. The power consumption due to the panel charging/discharging current Ipn when GND is 0 V is: Ipn×VEE. However, as described previously, the voltage difference between each of Vx0 to Vx4 and VM is much smaller than the voltage difference between VEE and GND. Therefore, the effective utilization factor of Ipn is extremely low, and a large part thereof migrates within the op-amp along a path to GND so that it becomes a thermal loss and the op-amp simply becomes hotter.

Furthermore, if the current consumption in portions such as the logic portion of the X driver is assumed to be IXD, the power consumption thereby is not (IXD×VCC) but (IXD× VEE). The portion {IXD×(VEE−VCC)} inevitably migrates within the op-amp along a path to GND to become a thermal loss so that the op-amp simply becomes hotter. With a method in which a plurality of lines are simultaneously selected, the operating voltage amplitude of the X driver can be made small, but it has not been possible to completely utilize this advantage in the reduction of power consumption in the prior art.

The power circuit for a liquid crystal display device that uses a two-terminal type of non-linear switching element will now be described as a third prior-art technique. This method of driving a liquid crystal display device is disclosed in Japanese Patent Publication No. 5-34655 and a power circuit for use in this method is disclosed in Japanese Patent Publication No. 5-46954 and U.S. Pat. No. 5,101,116. The operation and configuration of this power circuit will now be described with reference to FIG. 50 (drive voltage waveforms shown as FIG. 1A in U.S. Pat. No. 5,101,116) and FIG. 51 (a circuit shown as FIG. 2B therein). In FIG. 50, TPy (where y=1, 2, . . . , n) are the waveforms of voltages that drive Y electrodes, VD2 is a positive-side selection voltage, VS2 is a negative-side selection voltage, VM$^+$ is a non-selection voltage when VD2 is a selection voltage, and VM$^-$ is a non-selection voltage when VS2 is a selection voltage. (VD2−VS2) is on the order of approximately 40 V and the following relationship is substantially satisfied: (VD2−VM$^+$)=(VM$^-$−VS2). In other words, if the center voltage between VD2 and VS2 is VC, VD2 and VS2 are substantially symmetrical with respect to VC, and VM$^+$ and VM$^+$ are also substantially symmetrical with respect to VC. (VM$^+$−VM$^-$) is much smaller than (VD2−VS2). It is constantly necessary with the MLS drive method to have selection voltages on both the positive side and the negative side. In contrast thereto, in a liquid crystal display device using a two-terminal type of non-linear switching element, the selection voltage required at any certain time is one only of VD2 and VS2, so there is no necessity of providing both selection voltages at the same timing. An example of a circuit designed to address this problem by managing with a Y driver resisting voltage that is approximately half of (VD2−VS2) is shown in FIG. 51. A transistor 250 is turned on and another transistor 252 is turned off at a timing in which VD2 is necessary. This causes VD(t) to become VD2, which is a voltage higher than VM$^+$, and VS(t) to become VS1, which is a voltage higher than VS2, by capacitive coupling. The transistor 252 is turned on and the transistor 250 is turned off, at a timing in which VS2 is necessary. This causes VS(t) to become VS2, which is a voltage lower than VM$^-$, and VD(t) to become VD1, which is a voltage lower than VD2, by capacitive coupling. Swinging the power voltage applied to the Y driver in this manner makes it possible for a Y-driver resisting voltage of approximately half of (VD2−VS2) to be sufficient, provided that the selection voltage need only be applied to either the positive side or the negative-side at the same timing. A drive method in which the power voltage is made to swing in this fashion is hereinafter called a swinging power source method. At present, this swinging power source method is most commonly used for a liquid crystal panel that uses a two-terminal type of non-linear switching element.

This swinging power source method has an advantage in that an Y-driver resisting voltage of approximately half of (VD2−VS2) will suffice, as described above, but it has a disadvantage in that the power consumption of the liquid crystal display device increases significantly, regardless of this low resisting voltage. One cause of this increase in the power consumption is the presence of all of the parasitic capacitances within the Y driver that are charged and discharged by this swinging voltage, and the shorting currents flow through the Y driver at the same timing as the swinging. Another cause is that the power consumption of the power circuit itself is high and there is no good method of reducing power consumption in the power circuit.

To summarize the above points, each of the power circuits of the configurations shown in FIGS. 48 and 49 has the following problems:

(1) There is a large amount of wasteful power dissipation during the supply of panel charging/discharging currents.

(2) The power consumption is increased even further by current consumption due to the logic portion of the X driver which is also supplied from the high voltage VEE.

(3) Since the high voltage VEE is used as the power source of the op-amps, the power consumption due to the idling current that flows constantly from VEE to GND in the op-amp is large.

(4) Expensive op-amps that have low power consumption and high resisting voltages must be used as the op-amps used in the power circuit.

It is not possible to reduce the power consumption with the power circuit and drive method of the configuration shown in FIG. 51.

This invention was devised in order to solve the above problems and has as an objective thereof the provision of an inexpensive power circuit, liquid crystal display device, and electronic equipment with a low power consumption.

DISCLOSURE OF THE INVENTION

In order to address the above described problems, this invention provides a power circuit to which input power source is applied and which supplies first to Nth potentials (where N≧4) for driving a display element, the power circuit comprising:

means for supplying a first input potential on a high-potential side comprised within the input power source as a Gth potential within the first to Nth potentials (where 1<G<N);

means for supplying a second input potential on a low-potential side comprised within the input power source as a Jth potential within the first to Nth potentials (where 1<J<N);

a charge pump circuit which operates based on a given clock signal to thereby supply the first potential on the high-potential side, either directly or via adjustment means; and a charge pump circuit which operates based on a given clock signal to thereby supply the Nth potential on the low-potential side, either directly or via adjustment means.

When a display element such as a liquid crystal is driven, the current consumption relating to a first potential on a high-potential side and an Nth potential on a low-potential side is small and the current consumption relating to a Gth potential and a Jth potential, which are intermediate potentials, is large. In accordance with this aspect of the invention, the first and Nth potentials are each supplied by a highly efficient charge pump circuit that has a low output capability, and the Gth and Jth potentials are supplied by input power source that has high output capabilities. As a result, this aspect of the invention makes it possible to satisfy both the improvement of display quality and a reduced power consumption, enabling the provision of the optimal power circuit for a liquid crystal display device designed to have a reduced power consumption.

According to the present invention, a potential other than the first, Gth, Jth, and Nth potentials within the first to Nth potentials is supplied by a given op-amp or a charge pump circuit which operates based on a given clock signal.

If potentials other than the first, Gth, Jth, and Nth potentials are all supplied by charge pump circuits, an even further reduced power consumption could be expected. On the other hand, since this invention makes it possible to reduce the operating voltages of the op-amps, even if op-amps with high output capabilities are used in the supply of these potentials, it has an advantage in that the power consumption is not worsened by that amount.

According to the present invention, the first to Nth potentials are formed symmetrically with respect to one of:

the first input potential; the second input potential; a center potential between the first and second input potentials; or, when a potential differing from the first and second input potentials has been generated, a center potential between the generated potential and the first or second input potential.

In other words, in accordance with this aspect of the invention, the first to Nth potentials are formed symmetrically with respect to the first input potential, symmetrically with respect to the second input potential, symmetrically with respect to the center potential between the first and second input potentials, or symmetrically with respect to the center potential between the generated potential and the first or second input potential.

According to the present invention, a potential differing from the first and second input potentials is generated by the charge pump circuit on the basis of the first and second input potentials, and the generated potential is used as one of the Gth and Jth potentials.

For example, consider a case in which the potential difference between the Gth and Jth potentials is large in comparison with the potential difference between the first and second input potentials. In such a case, this aspect of the invention makes it possible to obtain Gth and Jth potentials having desired potential difference, by generating a higher potential from the first input potential, for example. This makes it possible to reduce the logic voltages.

According to the present invention, there is provided a power circuit to which input power source is applied and which supplies first to Nth potentials (where N≧4) for driving a display element, the power circuit comprising:

a charge pump circuit for performing a K-times (where K≧2) boosting charge pump operation based on a given clock signal to thereby supply one of the first to Nth potentials, either directly or via adjustment means; and a charge pump circuit for performing an L/M-times (where L/M is not an integer) dropping or M/L-times boosting charge pump operation based on a given clock signal to thereby supply one of the first to Nth potentials, either directly or via adjustment means.

Use of this aspect of the invention makes it possible to implement a power circuit in which a sextuple boosting circuit and a ⅓-times dropping circuit, for example, are mixed. This makes it possible to supply a varied group of voltages necessary for driving a display element, with a lower power consumption.

According to the present invention, there is provided a power circuit to which input power source is applied and which supplies first to Nth potentials (where N≧4) for driving a display element, the power circuit comprising:

a charge pump circuit which operates based on a clock signal comprising periodical pulses, to thereby supply one of the first to Nth potentials, either directly or via adjustment means; and means for stopping charging of a pumping capacitor comprised within the charge pump circuit and charging of a backup capacitor by the pumping capacitor during a period within the pulses.

In accordance with this aspect of the invention, the charging of pumping and backup capacitors is stopped during a period in which a pulse of a pulsed clock signal is generated, thus preventing the escape of charge during transitions. Note that a signal such as a latch pulse signal that used in a driver IC is optimal as the pulsed clock signal.

According to the present invention, there is provided a power circuit to which input power source is applied and which supplies first to Nth potentials (where N≧4) for driving a display element, the power circuit comprising:

a charge pump circuit which operates based on a given clock signal to thereby supply one of the first potential on a high-potential side and the Nth potential on a low-potential side, either directly or via adjustment means; and a charge pump circuit which operates for charging a backup capacitor alternately by a plurality of pumping capacitors on the basis of a given clock signal, to thereby supply an Ith potential within the first to Nth potentials (where 1<I<N), either directly or via adjustment means.

With this aspect of the invention, a backup capacitor is charged alternately by a plurality of pumping capacitors, enabling an increase in the output capability of the charge pump circuit. In particular, the display and other characteristics can be improved effectively by using a charge pump circuit with a high output capability to generate an Ith potential which is an intermediate potential that generally has a large current consumption.

According to the present invention, there is provided a power circuit to which input power source is applied and which supplies first to Nth potentials (where $N \geq 4$) for driving a display element, the power circuit comprising:

a charge pump circuit which operates based on a given clock signal to thereby supply one of the first to Nth potentials either directly or via an adjustment means; and means for charging a pumping capacitor comprised within the charge pump circuit and charging a backup capacitor by the pumping capacitor, every horizontal scan period.

With this invention, a charge pump operation can be completed in every horizontal scan period, thus making it possible to improve the display uniformity.

According to the present invention, the charge pump circuit operates for alternately charging the backup capacitor by a plurality of pumping capacitors every horizontal scan period.

This makes it possible to complete the charge pump operation every horizontal scan period, by charging the backup capacitor alternately by a plurality of pumping capacitors every horizontal scan period.

According to the present invention, there is provided a power circuit to which input power source is applied and which supplies first to Nth potentials (where $N \geq 4$) for driving a display element, the power circuit comprising:

a charge pump circuit for performing a K-times (where $K \geq 2$) boosting or L/M-times (where L/M is not an integer) dropping or M/L-times boosting charge pump operation based on a given clock signal to thereby supply one of the first to Nth potentials, either directly or via adjustment means; and means for adjusting boosting ratio or dropping ratio of the charge pump circuit.

With this aspect of the invention, the ratio of boosting or dropping performed by a charge pump circuit can be adjusted, making it possible to change a sextuple boosting circuit into a quintuple boosting circuit, for example. This makes it possible to form a necessary group of different drive voltages by adjusting a boosting ratio in accordance with factors such as the characteristics of the display element and the voltages of the input power source. Note that the adjustment of the boosting or dropping ratio can be also done by using an external terminal and the like.

According to the present invention, there is provided a power circuit to which input power source is applied and which supplies first to Nth potentials (where $N \geq 4$) for driving a display element, the power circuit comprising:

a charge pump circuit which operates based on a given clock signal to thereby supply one of the first potential on a high-potential side and the Nth potential on a low-potential side, either directly or via adjustment means; and means for stopping the generation of the first potential or the Nth potential by the charge pump circuit during a given period after the application of the input power source.

This aspect of the invention makes it possible to start the generation of the first or Nth potential after the input power source has been applied, a given period of time has elapsed, and the control circuitry is operating normally. This makes it possible for the system to start up in a normal fashion.

According to the present invention, there is provided a power circuit to which input power source is applied and which supplies first to Nth potentials (where $N \geq 4$) for driving a display element, the power circuit comprising:

means for supplying a first input potential on a high-potential side comprised within the input power source as a Gth potential within the first to Nth potentials (where $1 < G < N$);

means for supplying a second input potential on a low-potential side comprised within the input power source as a Jth potential within the first to Nth potentials (where $1 < J < N$);

means for supplying a third input potential on the high-potential side or low-potential side of the first and second input potentials comprised within the input power source as one of the first potential on a high-potential side and the Nth potential on a low-potential side;

a charge pump circuit which operates based on a given clock signal to thereby supply one of the first and Nth potentials, either directly or via adjustment means; and a charge pump circuit which operates based on a given clock signal to thereby supply an Fth potential (where $1 < F < N$) on either a high-potential side or a low-potential side of the Gth and Jth potential, either directly or via adjustment means; and wherein potentials within the first to Nth potentials but which are not one of the first, Fth, Gth, Jth, and Nth potentials are each supplied by a charge pump circuit that operates based on a given clock signal.

This aspect of the invention makes it possible to supply the first to Nth potentials by circuitry and means having an output capability matched to the required current consumption, making it possible to satisfy both the improvement of display quality and a reduced power consumption.

According to the present invention, there is provided a power circuit to which input power source is applied and which supplies first to Nth potentials (where $N \geq 4$) for driving a display element, the power circuit comprising:

a charge pump circuit which operates based on a given clock signal to thereby supply one of the first to Nth potentials either directly or via an adjustment means; and means for releasing residual charge in circuit portions supplied with a potential obtained from at least one of the first and Nth potentials, when at least one of the following events has occurred: the supply of the input power source is stopped, the supply of the given clock signal is stopped, or a display-off control signal is input.

This aspect of the invention prevents a state in which a high voltage is applied continuously to the display element abnormally, enabling an improvement in reliability.

According to the present invention, the power circuit comprises means for stopping the given clock signal of the charge pump circuits.

This aspect of the invention makes it possible to provide display-off control with only a tiny increase in the number of components, enabling a reduction in the current consumption when the display is off to substantially zero.

According to the present invention, there is provided a liquid crystal display device comprising:

one of the above described power circuits;

a liquid crystal panel having a liquid crystal layer driven by a plurality of data line electrodes and a plurality of scan line electrodes;

a data line driver for driving the data line electrodes; and a scan line driver for driving the scan line electrodes.

With this aspect of the invention, not only the power consumption of the power circuit itself but also the power consumption of the liquid crystal display device can be reduced, enabling the provision of a liquid crystal display device that is most suitable for portable electronic equipment.

According to the present invention, there is provided a liquid crystal device wherein a power circuit comprises:

means for supplying a first input potential on a high-potential side and a second input potential on a low-potential side both comprised within the input power source, as one of the first to Nth potentials; and a charge pump circuit which operates based on a given clock signal to thereby supply one of the first to Nth potentials either directly or via an adjustment means; and wherein the first and second input potentials are used as a power source for a logic portion in at least one of the data line driver and the scan line driver.

With this aspect of the invention, the first or second input potential is used as one of the first to Nth potentials and also as a power source for the logic portion of the data line driver or the scan line driver. This removes the necessity of providing an another power source for the logic portion of the data line driver, etc., enabling improvements in the convenience to the user of the device. This also enables a further reduction in the power consumption of the device.

According to the present invention, the power circuit comprises a charge pump circuit for generating a potential differing from the first and second input potentials by a charge pump operation based on a given clock signal, and supplying the generated potential as one of the first to Nth potentials.

If the potential difference of the power source for the logic portion differs from the potential difference between the Gth and Jth potentials (where 1<G, J<N) used for the liquid crystal driving, for example, this aspect of the invention makes it possible to use a charge pump circuit to generate the Gth and Jth potentials. This makes it easy to use the first and second input potentials as power voltages for the logic portions of the drivers.

According to the present invention, there is provided a liquid crystal display device wherein a power circuit comprises:

a charge pump circuit which operates based on a clock signal generated from a latch pulse signal for the data line driver or a shift clock signal for the scan line driver, to thereby supply one of the first to Nth potentials, either directly or via adjustment means.

A latch pulse signal or shift clock signal is a clock signal comprising periodical pulses, and it is best as a clock signal for charge pump circuits. The use of such a signal makes it possible to satisfy both the improvement of display quality and a reduced power consumption.

According to the present invention, there is provided electronic equipment comprising this liquid crystal display device.

This aspect of the invention makes it possible to expect a reduced power consumption, not only of the liquid crystal display device but also of the electronic equipment comprising this device. One advantage is to enable an increase in the battery life of electronic equipment such as portable information equipment.

BRIEF DESCRIPTION OF DRAWINGS

FIG. 10 is a conceptual diagram of a charge pump circuit for sextupling a voltage in the negative direction;

FIGS. 11A and 11B are diagrams illustrative of the operation of the circuit of FIG. 10;

FIG. 44A is a block diagram of an example of a liquid crystal display device relating to Embodiment 14 while

FIG. 45A is a block diagram of an example of a liquid crystal display device relating to Embodiment 15 while

FIG. 46A is a block diagram of an example of a liquid crystal display device relating to Embodiment 16 while

BEST MODE FOR CARRYING OUT THE INVENTION

Embodiments of this invention will be described below with reference to the accompanying drawings. Note that the description herein is based for the sake of convenience on the assumption that the GND potential is 0 V, unless otherwise specified.

EMBODIMENT 1

Figure 1:
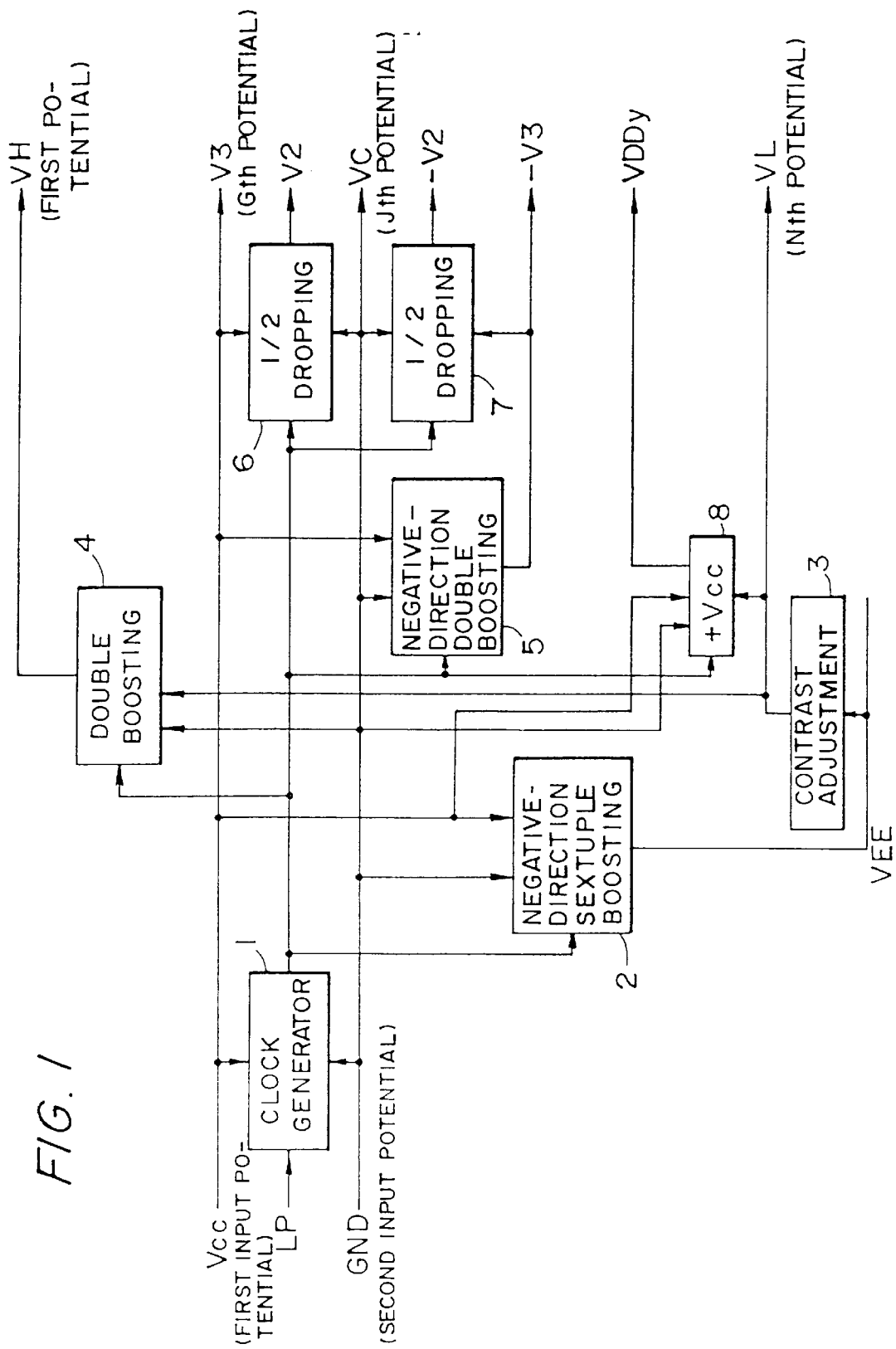
FIG. 1 is a block diagram of a power circuit relating to Embodiment 1.

A block diagram of the power circuit of a first embodiment of this invention is shown in FIG. 1. The function of this power circuit is to generate the same output voltages as those of the power circuit of FIG. 49.

The input power source of this power circuit is a single power source input that provides only Vcc (a first input potential) and GND (a second input potential). A latch pulse signal LP formed from a pulse generated every horizontal scan period is input to this circuit. A clock generator 1 generates a plurality of clock signals of different timings that are necessary for the charge pump circuit, based on LP, and uses Vcc and GND as a power source. A negative-direction sextuple boosting circuit 2 performs a charge pump operation to generate a voltage VEE which is six times GND with reference to Vcc, in the negative direction. If Vcc is 3.3 V, VEE is −16.5 V. A contrast adjustment circuit 3 generates a selection voltage VL that gives an optimal contrast, on the basis of VEE. This VL acts as a negative-side selection voltage for the Y electrodes. A double boosting circuit 4 performs a charge pump operation to generate a positive-side selection voltage VH which is twice GND with reference to VL. A negative-direction double boosting circuit 5 performs a charge pump operation to generate a voltage −V3 which is twice GND with reference to Vcc, in the negative direction. Two ½ dropping circuits 6 and 7 use a charge pump operation to generate a voltage V2 that is half the voltage between Vcc and GND and a voltage −V2 that is half the voltage between GND and −V3. GND is used without modification as a center potential VC. Similarly, Vcc is used without modification as a potential V3. V3 and −V3 are symmetrical with respect to GND. The voltages for driving the liquid crystal panel are formed in the above manner. The voltages VH, V3, V2, VC, −V2, −V3, and VL that are output by this power circuit are symmetrical with respect to GND (the second input potential). Note that a circuit 8 generates a voltage that is Vcc higher than VL, which is supplied as a logic voltage VDDy to the Y driver. Since VDDy itself is not supplied to the panel, the symmetry of voltages is not relevant in this case.

The above embodiment has the configurational characteristics discussed below.

(1) This embodiment uses a first input potential Vcc on the high-potential side and a second input potential GND on the low-potential side, which are comprised within the input power source, without modification as a Gth potential V3 and a Jth potential VC among first to Nth potentials (where N≧4). The configuration comprises the double boosting circuit 4 and the negative-direction sextuple boosting circuit 2 which each operates based on a given clock signal to thereby supply a first potential VH on the high-potential side and an Nth potential on a low-potential side, either directly or via an adjustment means (the contrast adjustment circuit 3).

As was described above with respect to the prior-art techniques, the current consumption of the liquid crystal panel itself is largely due to currents flowing between the non-selection voltage VC of the Y electrodes and the drive voltages V3, V2, −V2, and −V3 of the X electrodes. There are only four lines of Y electrodes that are in a selected state when the duty ratio is 1/240, while the remaining 236 lines are all in a non-selected state. This embodiment focuses on that point to use highly efficient charge pump circuits that have a low output capability (current supply capability) to provide the first potential VH and the Nth potential VL, and also connect the Gth potential V3 and the Jth potential VC, which are intermediate potentials, to the input power source Vcc and GND that have a high output capability. This configuration makes it possible to satisfy both the improvement of display quality and reducing power consumption.

Figure 49:
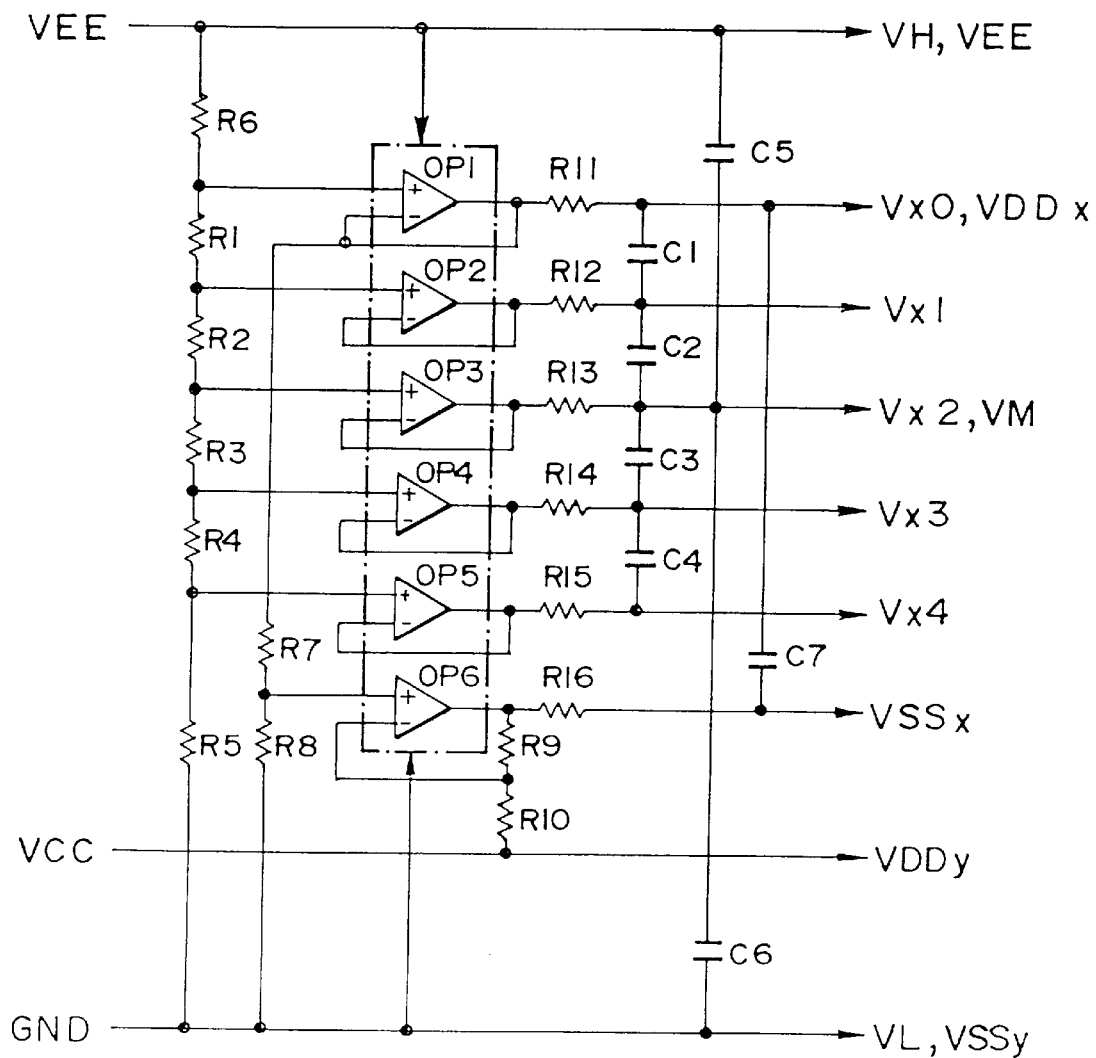
FIG. 49 is a circuit diagram of an example of the power circuit of a second prior-art example.
Figure 50:
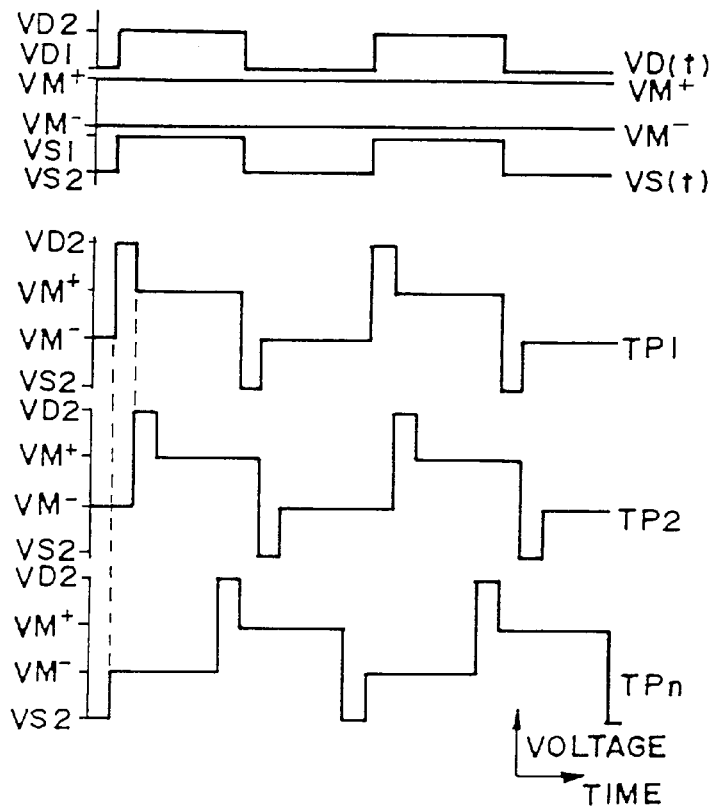
FIG. 50 shows an example of waveform of the voltage for driving the panel, used to illustrate the power circuit of a third prior-art example.

On the other hand, with the power circuit of FIG. 49 which has a configuration in which all of the current flows between the first potential VEE and the Nth potential GND, so the circuit that creates VEE must have a high output capability. It is therefore virtually impossible to use a charge pump circuit to provide VEE, and thus it is not possible to satisfy both of the conditions of a maintained display quality and a reduced power consumption.

(2) With this embodiment, the potentials V2, −V2, and −V3, which are not the first, Gth, Jth, and Nth potentials within the first to Nth potentials, are provided by the ½ dropping circuits 6 and 7 and the negative-direction double boosting circuit 5 which each operates based on a given clock signal. A further reduced power consumption can be expected by supplying V2, −V2, and −V3 by charge pump circuits in this manner. Moreover, since the clock signal necessary for the charge pump operation can be used in common by all the charge pump circuits in this embodiment, control is simple and any increase in the circuit scale can be kept to a minimum.

Figure 2:
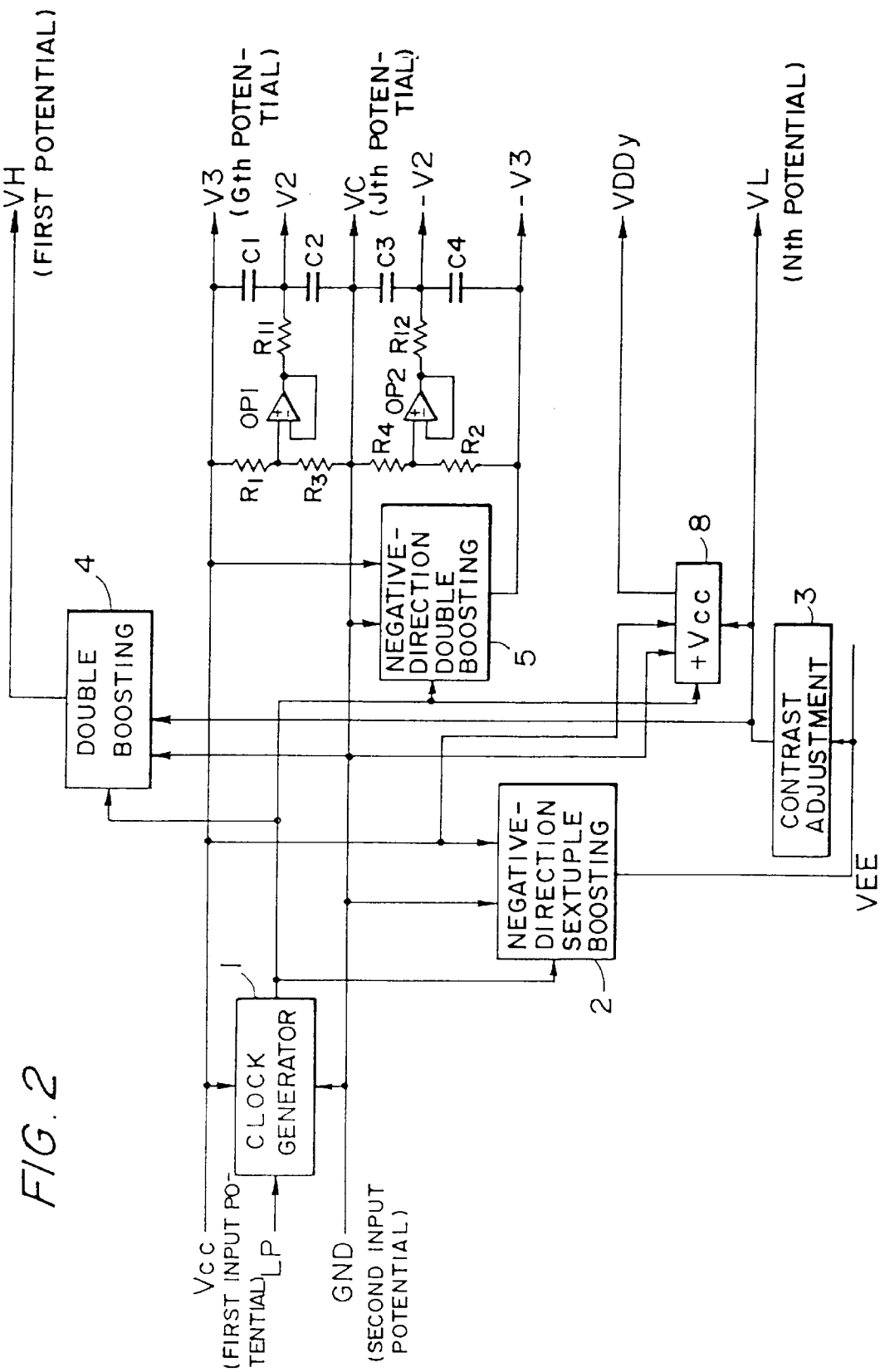
FIG. 2 is a block diagram of a power circuit when op-amps are used in the generation of V2 and −V2.

Note that a block diagram of the circuitry used when V2 and −V2 are supplied by op-amps OP1 and OP2 is shown in FIG. 2. In this figure, R1 and R3 are bleeder resistances for dividing the voltage between V3 and VC (GND), and R2 and R4 are bleeder resistances for dividing the voltage between VC and −V3. OP1 and OP2 are op-amps for outputting the voltages divided by these bleeder resistances, with a low impedance. In addition, R11 and R12 are resistances that are intended to control the output currents of OP1 and OP2 and thus stabilize their operation, and also reduce the power consumption thereof, and C1 to C4 are capacitors for stabilizing the V2 and −V2. OP1 operates with V3 and VC as a power source and OP2 operates with VC and −V3 as a power source. C1 could be disposed between V3 and VC, and C4 could be disposed between VC and −V3. Even if V2 and −V2 are supplied by the op-amps OP1 and OP2 in this manner, OP1 and OP2 operate with a low voltage, differing from the power circuit of FIG. 49 and thus the power consumption of this part can be restrained to within a permissible range.

(3) This embodiment comprises the negative-direction sextuple boosting circuit 2, the double boosting circuit 4, and the negative-direction double boosting circuit 5 which each perform a K-times (where K≧2) boosting charge pump operation based on a given clock signal to thereby supply one of the first to Nth potentials, either directly or via an adjustment means (the contrast adjustment circuit 3), and the ½ dropping circuits 6 and 7 which each perform an L/M-times (where L/M is not an integer) dropping or M/L-times boosting charge pump operation to supply one of the first to Nth potentials, either directly or via adjustment means. Thus this embodiment comprises both charge pump circuits that perform K-times boosting operations and charge pump circuits that perform L/M-times dropping or boosting operations. This makes it possible to supply a variety of voltages with a low power consumption, from a single input power source (Vcc and GND).

Figure 3:
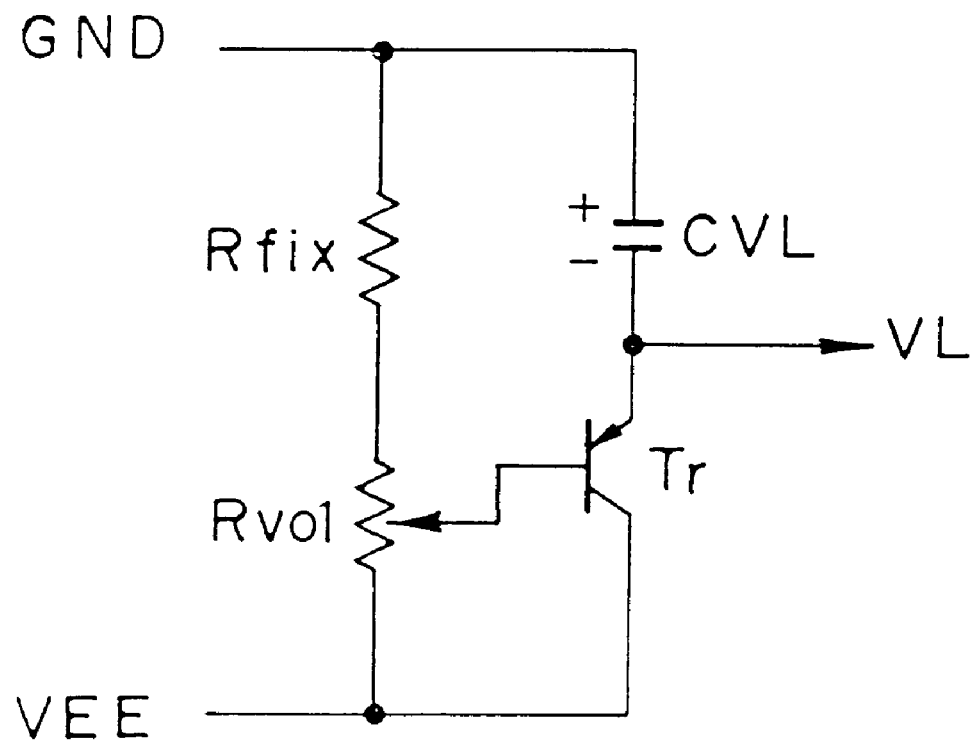
FIG. 3 is a circuit diagram of an example of a contrast adjustment circuit.

The description now turns to the contrast adjustment circuit 3, which is shown in FIG. 3. The contrast adjustment circuit 3 comprises a fixed resistance Rfix and a variable resistance Rvol connected in series between GND and VEE, a bipolar transistor Tr, and a capacitor CVL. Since the current flowing to and from VL is small in the liquid crystal display device driven by the power circuit of this embodiment, the base current of Tr can be made small. As a result, each of Rfix and Rvol can have a high resistance of 500 kΩ to 1 MΩ, and thus the power consumption due to these resistances can be suppressed to approximately 0.2 mW to 0.4 mW.

Note that, although the contrast adjustment circuit 3 is shown provided only on the VL side in FIG. 1, it can equally well be provided on the VH side alone, or on both the VH and VL sides. In FIG. 1, the contrast adjustment circuit 3 is provided only on one side and VH is generated by the double boosting circuit 4 on the basis of the voltage VL obtained by the contrast adjustment circuit 3. This configuration has the advantage that VH can be automatically adjusted by using the contrast adjustment circuit 3 to adjust VL. Conversely, a configuration in which a contrast adjustment circuit 3 is provided on each of the VH and VL sides has the advantage that VH and VL can be adjusted independently. A nonlinear switching element such as an MIM has a characteristic such that a current flows differs according to the direction in which the voltage is applied. This means that a liquid crystal display device in which such an MIM is used should preferably be arranged in such a manner that |VH| is on the order of 0.5 V lower than |VL|. Therefore, it is preferable to provide a contrast adjustment circuit on both the VH side and the VL side in such a case. More specifically, components such as diodes could be comprised within a contrast adjustment circuit on the VH side, and the forward-direction voltage of these diodes could be utilized to drop VH.

The ½ dropping circuits 6 and 7 are provided in the configuration of FIG. 1 in order to provide seven voltage levels, but the ½ dropping circuits 6 and 7 may be omitted if five voltage levels are desired.

This embodiment with the above described configuration makes it possible to reduce the power consumption of a liquid crystal display device driven by the four-line simultaneous selection drive method, for reasons that will be discussed below.

The first reason is that the power consumption due to the panel charging/discharging current is significantly reduced. Consider the charging/discharging currents that constitute a large proportion of the panel current, in other words, the charging/discharging currents which flow between the X electrodes and the non-selected Y electrodes. Assume that the charging/discharging current flowing between each of the X-electrode voltages V3, −V3, V2, and −V2 and the Y-electrode voltage VC is IP3, IM3, IP2, and IM2, respectively. With that assumption, the power consumption due to IP3 is (Vcc×IP3). Since charge pump circuits are extremely efficient, the power consumption due to IM3 is substantially Vcc×IM3 and the power consumptions due to IP2 and IM2 are similarly substantially {(½)×Vcc×IP2} and {(½)×Vcc×IM2}. In the prior-art example of FIG. 49, on the other hand, if the high voltage is VEE, the corresponding power consumptions due to these currents are (VEE×IP3), (VEE×IM3), (VEE×IP2), and (VEE×IM2). Since VEE is on the order of 25 V but Vcc is on the order of 3.3 V, the power consumptions due to IP3 and IM3 are no more than one-seventh those of the prior-art example and the power consumptions due to IP2 and IM2 are no more than one-fourteenth thereof.

The charging/discharging current that flows between the X electrode and the selected Y electrode will now be considered. Assume that the charging/discharging currents flowing between each of the Y-electrode voltages VH and VL and the X electrodes are IVH and IVL, respectively. The high efficiency of the charge pump circuits ensure that the power consumptions due to IVH and IVL are substantially (5×Vcc×IVH) and (5×Vcc×IVL), which are much smaller than the corresponding power consumptions in the prior-art example.

The second reason is that the power consumption is reduced in the logic portion of the X driver, which operates at high speed and has a large current consumption. As described previously, the logic portion of the X driver in the power circuit of the prior-art example is supplied with a high voltage VEE so that the power consumption thereof is (VEE×current consumption). In contrast thereto, the corresponding power consumption in this embodiment is (Vcc×current consumption) which is no more than one-seventh that of the prior-art example.

The third reason is that the power consumption in the boosting circuit that forms the high voltage VEE is small. In general, a boosting circuit using a charge pump method has a small output capability and the output voltage thereof drops as the extracted current increases. With a liquid crystal display device driven by a prior-art power circuit, the current in the high voltage portion is large, so that a boosting circuit using the charge pump method would have insufficient capability to create VEE. Therefore, this prior-art example uses a DC-DC converter operating by a switching regulator method that regulates a high voltage generated when the current flowing through a coil is interrupted, to form the high voltage VEE. The efficiency of a DC-DC converter using the switching regulator method is normally extremely low: on the order of 80% for an input of 5 V, or on the order of 60% for an input of 3.3 V. Therefore the power consumption of a liquid crystal display device driven by this prior-art example of the power circuit is very large, when including the boosting circuit for generating VEE. In contrast thereto, the current due to high voltages in a liquid crystal display device driven by the power circuit of this embodiment is small. Therefore, the high voltage VEE can be supplied by a boosting circuit which has a small output capability but which uses the highly efficient charge pump method, and thus the power consumption can be greatly reduced even though the configuration comprises a boosting circuit for generating VEE.

The reasons discussed above show that it is possible to reduce the power consumption in the power circuit of this embodiment. When a power circuit using the method of FIG. 1 was used to drive a liquid crystal display device in practice, where the drive was a dual-scan drive of 640×480 dots of a 0.2 mm pitch, a typical power consumption on the order of 12 mW was achieved as expected.

Note that if the power circuit of this embodiment is implemented as an IC chip, it is possible to form VL, not by an external circuit having bipolar transistors, but by incorporating a regulator using op-amps into the IC. A practicable means of reducing the resisting voltage of the IC is to externally attach the transistor that switches between VH and GND, of the elements configuring the double boosting circuit 4 used to form VH, and to make all the other elements together built in a single chip.

Since the power circuit of this embodiment is mostly configured of charge pump circuits, it gives the impression of requiring a large number of capacitors. However, in practice, some of the backup capacitors comprised within the charge pump circuits can be omitted, or it could be possible to make do with capacitors of small capacitances on the order of 0.1 μF. This is because the capacitance of the liquid crystal panel itself can be considered to act as a backup capacitor.

EMBODIMENT 2

Figure 4:
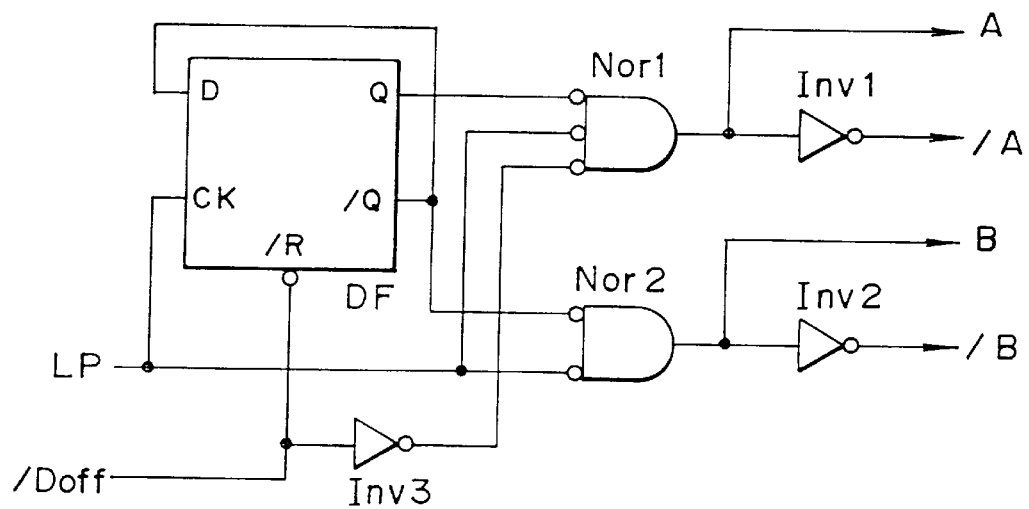
FIG. 4 is a circuit diagram of an example of a clock generator.
Figure 5:
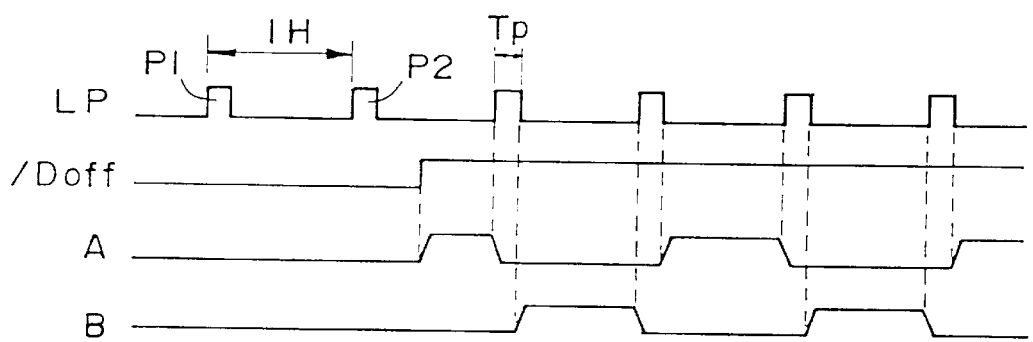
FIG. 5 is a timing chart illustrative of the operation of the clock generator.

Embodiment 2 relates to the clock generator 1 of FIG. 1; an example of the configuration thereof is shown in FIG. 4 and a timing chart used to illustrate the operation thereof is shown in FIG. 5. The entire circuitry operates on Vcc and GND. A latch pulse signal LP comprising a pulse generated every horizontal scan period (1H) is used as a basic clock signal. A /Q output of a D-type flip-flop DF is connected to a write data input D thereof, thereby providing a toggle operation at the rising edge of LP. NOR circuits Nor1 and Nor2 are designed to generate two-phase clock signals A and B, and inverter circuits Inv1, Inv2, and Inv3 are designed to generate /A, /B, and Doff signals which are of opposite phase to the A, B, and /Doff signals.

(1) Pulsed Clock Signal

In this embodiment, a charge pump operation is induced in charge pump circuits (such as the negative-direction sextuple boosting circuit 2 of FIG. 1) on the basis of a clock signal generated by the pulsed clock signal LP which comprises periodical pulses (such as P1 and P2 in FIG. 5). Charging of pumping capacitors comprised within the charge pump circuits and charging of a backup capacitor by the pumping capacitors is stopped during the period in which each pulse of the pulsed clock signal LP is generated. In other words, the configuration is such that both signals A and B are low during the period in which each pulse of LP is generated (the period during which LP is high), as shown by Tp in FIG. 5. When signals A and B are low, all of a group of switches (transistor group) configuring each charge pump circuit turn off, which makes it possible to prevent the escape of charge at the transition timing.

Note, however, that if this transition timing is such that the off-time of this group of switches is too long (if the period of TP is too long), the times during which the pumping and backup capacitors are charged are conversely reduced, so that the necessary voltages cannot be obtained. Since LP is a pulsed clock signal with a pulse width that is normally on the order of 100 ns to 300 ns and a period on the order of several tens of μs to 100 μs, it is suitable for use as the basic clock signal of this circuit. Since panel charging/discharging occurs every horizontal scan (1H) period, it is reasonable to use LP to charge the panel drive voltage every 1H period. A configuration is possible in which LP is not input and a basic clock signal is generated internally by means such as a CR oscillation circuit, but it is simpler and preferable to use a latch pulse signal input to the driver IC as the basic clock signal of this power circuit.

Note that the pulsed clock signal used with this embodiment is not limited to LP which is a latch pulse signal from the X driver; it can equally well be another signal such as a shift clock signal YSCL for the Y driver, for example. If a pulsed clock signal is not used, the time Tp during which the group of switches is off could be created by utilizing means such as a delay circuit.

(2) Clock Stop Operation

This embodiment is also configured in such a manner that the both signals A and B are low while a display-off control signal /Doff is low, to stop the operation of the charge pump circuits. In other words, the power circuit has a function that stops the clock signal that is applied to the charge pump circuits. The addition of this function makes it possible to make the power consumption of the power circuit substantially zero in a display-off mode. Since the output of the selection voltage is halted at the same time, it is possible to provide a display-off control function for the entire liquid crystal display device, even if the Y driver itself does not have a display-off control function. Note that the clock signal generation in the example shown in FIG. 4 is stopped by applying a reset to DF, stopping the operation of the charge pump circuits, from consideration of ease of testing when the power circuit is formed into an IC. However, the operation of the charge pump circuits can equally well be stopped by using a method such that LP and /Doff are input to a certain AND circuit and the thus-obtained signal is used as a new basic clock signal.

EMBODIMENT 3

Embodiment 3 of this invention relates to a charge pump circuit such as the negative-direction sextuple boosting circuit 2 or the double boosting circuit 4 of FIG. 1.

(1) Basic Concept

Figure 6:
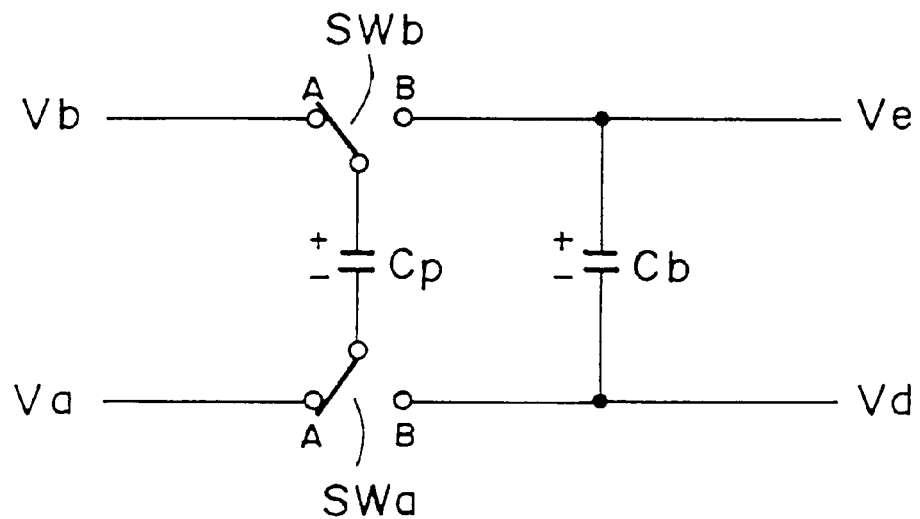
FIG. 6 is a basic conceptual diagram of a charge pump circuit.

A conceptual diagram of the most basic example of a charge pump circuit is shown in FIG. 6. SWa and SWb in FIG. 6 are linked switches such that, when one switch is being tripped towards an A side, the other one is also tripped towards the A side. Although SWa and SWb are shown in FIG. 6 as mechanical switches, the switches SWa and SWb could be configured in practice of two ordinary transistors: a MOS transistor that controls the opening and closing of the A side and another MOS transistor that controls the opening and closing of the B side.

A pumping capacitor Cp is charged by a voltage of (Vb–Va) while SWa and SWb are switched to the A side. When SWa and SWb are then switched to the B side, the charge in Cp is transferred to a backup capacitor Cb. Repeating this switching operation ensures that the voltage applied to Cb, that is, the voltage between Ve and Vd, approximates to substantially the same as the voltage between Vb and Va. During this time, if Vd is a fixed voltage, a voltage Ve is generated which is (Vb–Va) higher than Vd. Conversely, if Ve is a fixed voltage, a voltage Vd is generated which is (Vb–Va) lower than Ve. This is the basic operation of a charge pump circuit. The description below concerns whether this circuit functions as a boosting circuit or a dropping circuit depending on where Va, Vb, Vd, and Ve are connected.

(2) Double Boosting Operation

Figure 7:
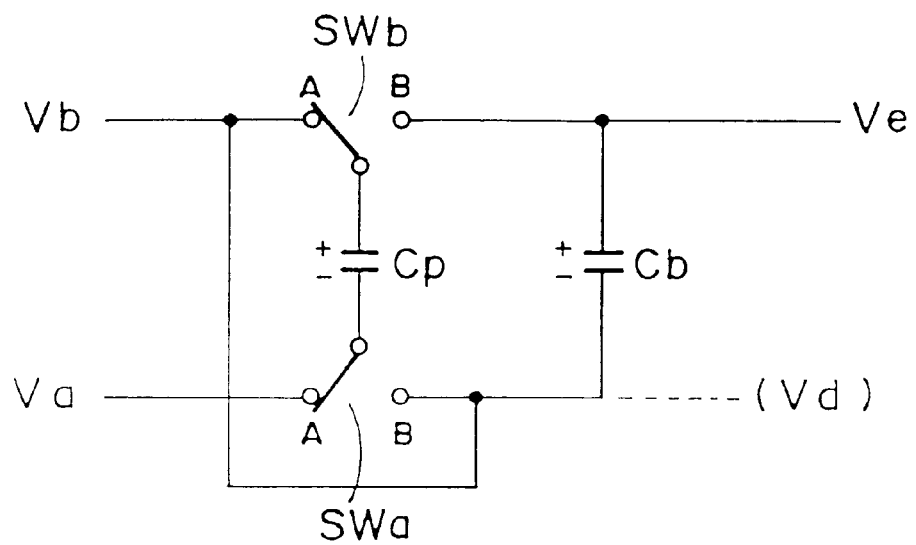
FIG. 7 is a conceptual diagram of a charge pump circuit for doubling a voltage.

A conceptual diagram of a charge pump circuit for doubling a voltage is shown in FIG. 7, wherein Vd and Vb of FIG. 6 are connected together. For reasons described above, repetition of the linked switching action of SWa and SWb ensures that the relationship (Ve–Vd)=(Ve–Vb)=(Vb–Va) sets: (Ve–Va)={(Ve–Vb)+(Vb–Va)}={2×(Vb–Va)}. In other words, if Va is assumed to be at the potential reference level (0 V), Ve=(2×Vb) and thus Ve is twice the voltage of Vb.

(3) Negative-Direction Double Boosting Operation

Figure 8:
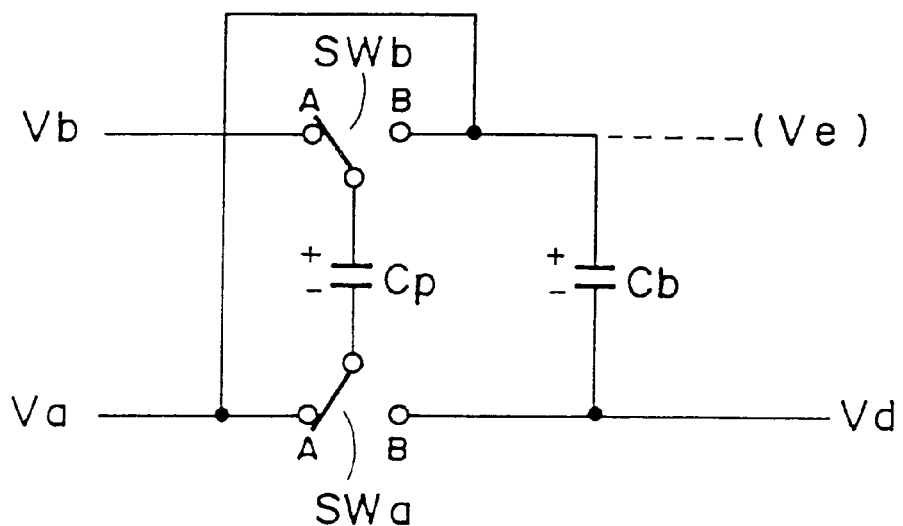
FIG. 8 is a conceptual diagram of a charge pump circuit for doubling a voltage in the negative direction.

A conceptual diagram of a charge pump circuit for doubling a voltage in the negative direction is shown in FIG. 8, wherein Ve and Va of FIG. 6 are connected together. Repetition of the linked switching action of SWa and SWb ensures that the relationship (Ve–Vd)=(Va–Vd)=(Vb–Va) sets: (Vb–Vd)={(Vb–Va)+(Va–Vd)}={2×(Vb–Va)}. In other words, if Vb is assumed to be at the potential reference level (0 V), Vd=(2×Va) and thus Vd is twice the voltage of Va in the negative direction.

(4) ½ Dropping Operation

Figure 9:
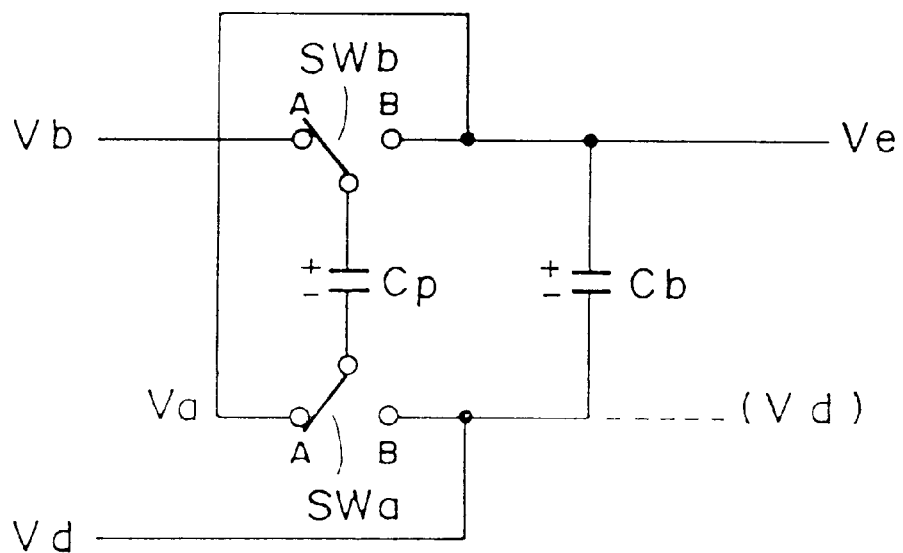
FIG. 9 is a conceptual diagram of a charge pump circuit for halving a voltage.

A conceptual diagram of a charge pump circuit for halving a voltage is shown in FIG. 9, wherein the input voltage (Vb–Va) of FIG. 8 is changed to (Vb–Vd). Ve is an output voltage and the current dissipated through the load connected to Ve is supplied from the backup capacitor Cb. First of all, SWa and SWb are connected to the B side so that Cp and Cb are connected in parallel and the voltages applied to Cp and Cb are equal. When SWa and SWb are then switched to the A side, Cp and Cb become connected in series and disposed between Vb and Vd, and thus the voltage applied to Cp and Cb becomes a half of (Vb–Vd). When SWa and SWb are once again switched to the B side, Cp and Cb are connected in parallel so that the charge stored in Cp is supplied to Cb and thus the voltage applied to Cp and the voltage applied to Cb become equal. Therefore, if the charge enabled by storage in Cp and Cb is sufficiently larger than the charge carried off by the Ve load current, an output voltage that is close to half the input voltage will be generated at Ve by the repetitive linked switching action of SWa and SWb.

(5) Negative-Direction Sextuple Boosting Operation

A conceptual diagram of an example of a charge pump circuit for sextupling a voltage in the negative direction is shown in FIG. 10, with the connection relationships formed when switches SWa1 to SWa3 and SWb1 to SWb3 are turned to the A side and the B side, respectively, being shown in FIGS. 11A and 11B. SWa1 to SWa3 and SWb1 to SWb3 are linked switches, Cp1 to Cp3 are pumping capacitors, and Cb1 and Cb23 are backup capacitors.

A voltage of {–2×(Vcc–GND)}, which is twice the voltage of GND with reference to Vcc in the negative direction, is generated at –V3B by an operation that is the same as that of the above described negative-direction double boosting circuit. Since Cp2 and Cp3 are connected in parallel when all of the switches are at the A side, as shown in FIG. 11A, Cp2 and Cp3 are each charged by a voltage that is substantially {2×(Vcc–GND)}.

When all of the switches are then turned to the B side, as shown in FIG. 11, Cp2 and Cp3 are connected in series, parallel to Cb23. Cp2 and Cp3 are thus charged by {2× (Vcc–GND)}, as described above. Therefore a voltage of {4×(Vcc–GND)} is generated between –V3B and VEE, and Cb23 is charged by this voltage. For the reasons described above, by the repetitive linked switching action of all the switches, a voltage is generated at VEE which is six times GND with reference to Vcc in the negative direction, that is, {Vcc–6×(Vcc–GND)}. If Vcc is 3 V, for example, a voltage of –3 V is generated at –V3B and –15 V is generated at VEE.

Figure 12:
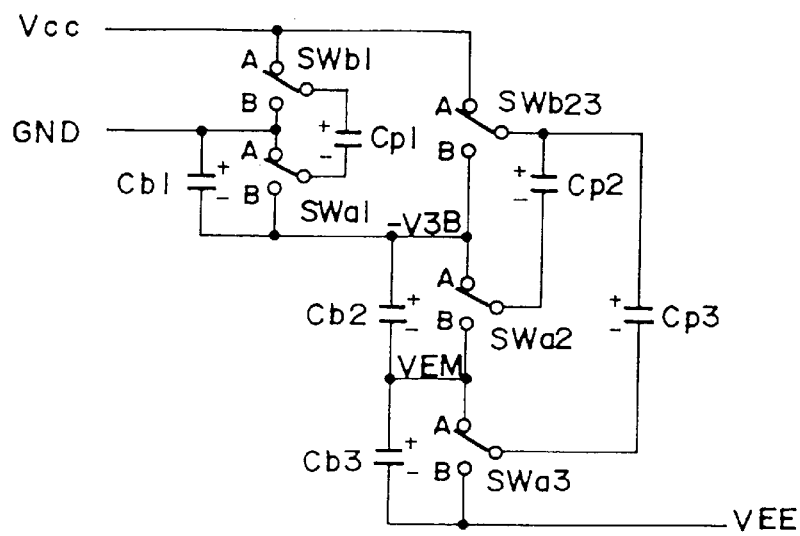
FIG. 12 is a conceptual diagram of another charge pump circuit for sextupling a voltage in the negative direction.
Figures 13A, 13B:
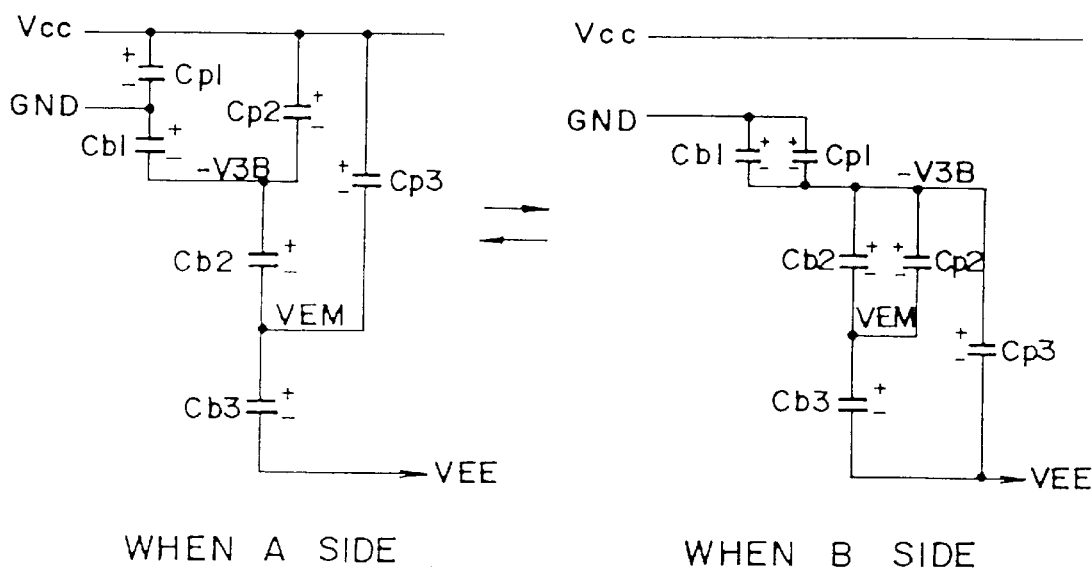
FIGS. 13A and 13B are diagrams illustrative of the operation of the circuit of FIG. 12.

A conceptual diagram of another example of a charge pump circuit for sextupling a voltage in the negative direction is shown in FIG. 12, with the connection relationships formed when switches SWa1 to SWa3, SWb1, and SWb23 are turned to the A side and the B side, respectively, being shown in FIGS. 13A and 13B. Cp1 to Cp3 are pumping capacitors and Cb1 to Cb3 are backup capacitors.

In a similar manner to that of the circuit of FIG. 10, a voltage of {–2×(Vcc–GND)}, which is twice GND with reference to Vcc in the negative direction, is generated at –V3B. When all of the switches are turned to the A side, as shown in FIG. 13A, Cp2 is charged by a voltage that is substantially {2×(Vcc–GND)}. The circuit formed by Cp2, Cb2, SWb23, and SWa2 of FIG. 12 acts as a negative-direction double boosting circuit in the same manner as the circuit formed of Cp1, Cb1, SWb1, and SWa1. Therefore Cb2 is also charged by a voltage of {2×(Vcc–GND)}, and a voltage of {–4×(Vcc–GND)} is generated at VEM. This causes Cp3 to be charged by a voltage of {4×(Vcc–GND)}.

When all of the switches are then turned to the B side, as shown in FIG. 13B, a connection relationship is formed in which Cp3 is inserted between −V3B and VEE. The voltage at −V3B is {−2×(Vcc−GND)}, and Cp3 is charged by a voltage of {4×(Vcc−GND)}. This has the result of generating at VEE a voltage which is six times GND with reference to Vcc in the negative direction, that is, {Vcc−6×(Vcc−GND)}.

The circuit of FIG. 10 differs from that of FIG. 12 in that VEM, which is an intermediate stabilized voltage between −V3B and VEE, is not necessary so that it has the advantage that the number of capacitors required therefor is one fewer than in the circuit of FIG. 12. On the other hand, the circuit of FIG. 12 has the advantage that the number of switches required is one fewer than that of the circuit of FIG. 10 (or the number of transistors is two fewer), because a common switch is used to connect the positive electrodes of Cp2 and Cp3. The formation of the intermediate voltage VEM has the advantage of making the drain resisting voltages of the transistors lower than those of the circuit of FIG. 10, thus making it possible to reduce the size of the transistors.

(6) $3/2$-Times Boosting Operation

Figure 14A:
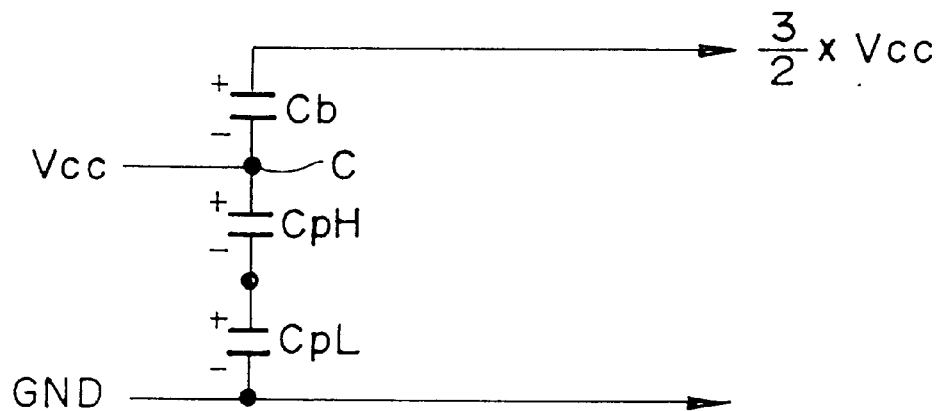
FIGS. 14A and 14B are conceptual diagrams of a charge pump circuit for boosting a voltage by 3/2.
Figure 14B:
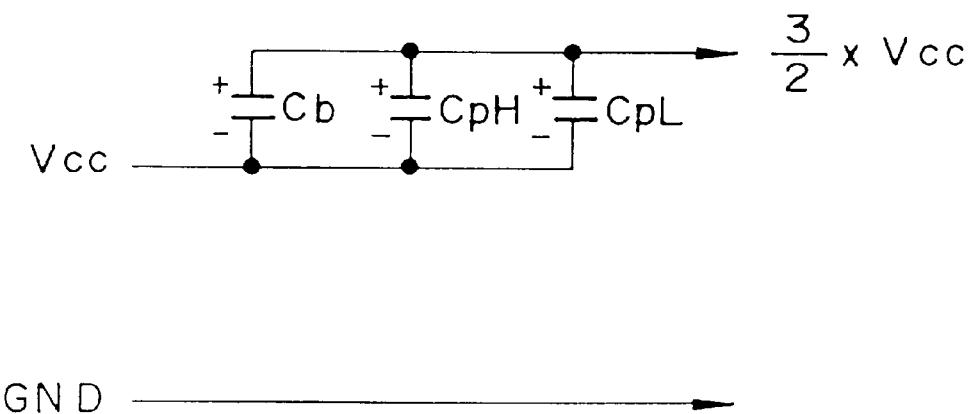

Conceptual diagrams of a charge pump circuit for boosting a voltage by $3/2$ are shown in FIGS. 14A and 14B. CpH and CpL are pumping capacitors and Cb is a backup capacitor. This circuit repeatedly alternates between a state in which CpH, CpL, and Cb are connected in series and a state in which Cb, CpH, and CpL are connected in parallel, as shown in FIGS. 14A and 14B. If the voltages applied to CpH and CpL are denoted by VcpH, VcpL, respectively, the parallel connection of CpH and CpL in FIG. 14B means that: VcpH=VcpL. When CpH and CpL are connected in series between Vcc and GND, as shown in FIG. 14A, CpH and CpL are each charged by a voltage that is half Vcc. When the connection state subsequently changes to that of FIG. 14B, the charge stored in CpH and CpL is supplied to Cb. Several repetitions of this operation causes the voltages applied to Cb, CpH, and CpL to approximate to half of Vcc, with the result that a voltage that is $3/2$ times Vcc is generated as an output voltage.

(7) Negative-Direction $3/2$-Times Boosting Operation

Figure 15A:
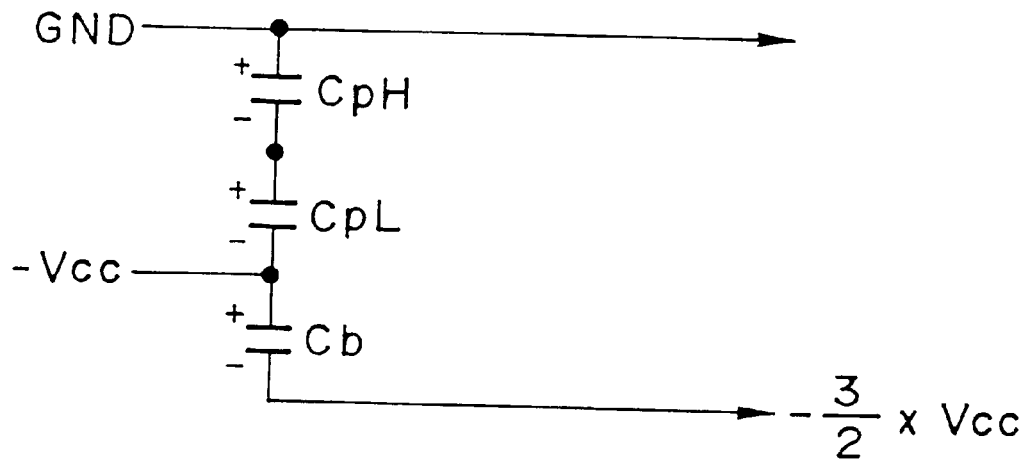
FIGS. 15A and 15B are conceptual diagrams of a charge pump circuit for boosting a voltage by 3/2 in the negative direction.
Figure 15B:
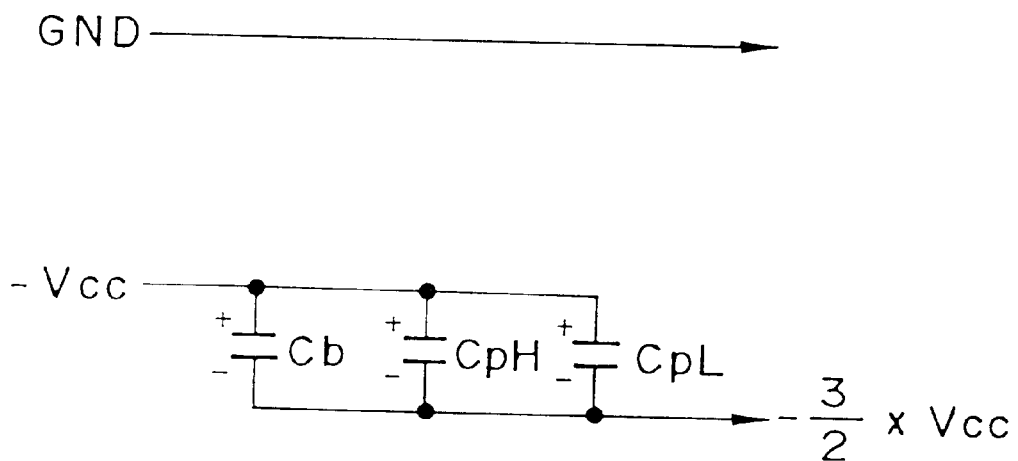

Conceptual diagrams of a charge pump circuit for boosting a voltage by $3/2$ in the negative direction are shown in FIGS. 15A and 15B. Since the operating principle of this circuit is similar to that of the above $3/2$-times boosting circuit, detailed description thereof is omitted. In a similar manner to that of the $3/2$-times boosting circuit, this circuit repeatedly alternates between a state shown in FIG. 15A in which pumping capacitors CpH and CpL and a backup capacitor Cb are connected in series and a state shown in FIG. 15B in which Cb, CpH, and CpL are connected in parallel, so that a boosting voltage of $(-3/2 \times Vcc)$ can be obtained in the direction opposite to that of the above $3/2$-times boosting circuit. It is often necessary to provide the driver IC of a liquid crystal display device with a logic voltage and a voltage on the negative side of that logic voltage, and the power consumption of the liquid crystal display device can be reduced by using this circuit is used in a liquid crystal display device of this type.

(8) $2/3$-Times Dropping Operation

Figure 16A:
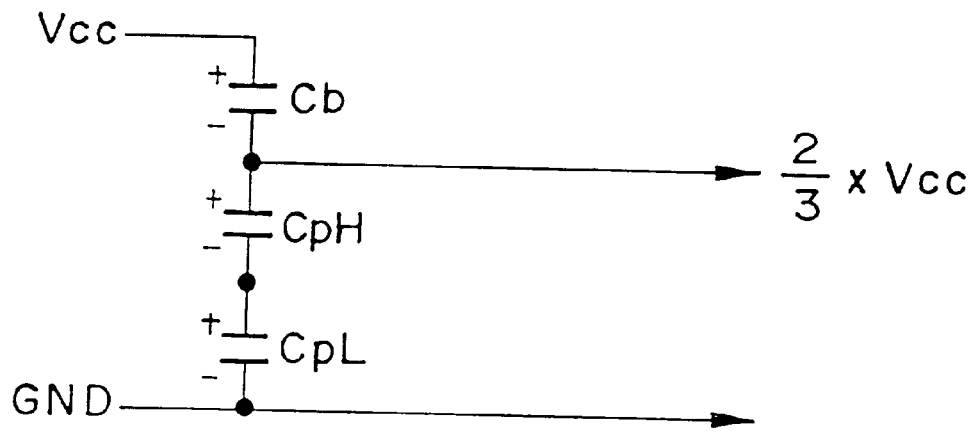
FIGS. 16A and 16B are conceptual diagrams of a charge pump circuit for dropping a voltage by 2/3.
Figure 16B:
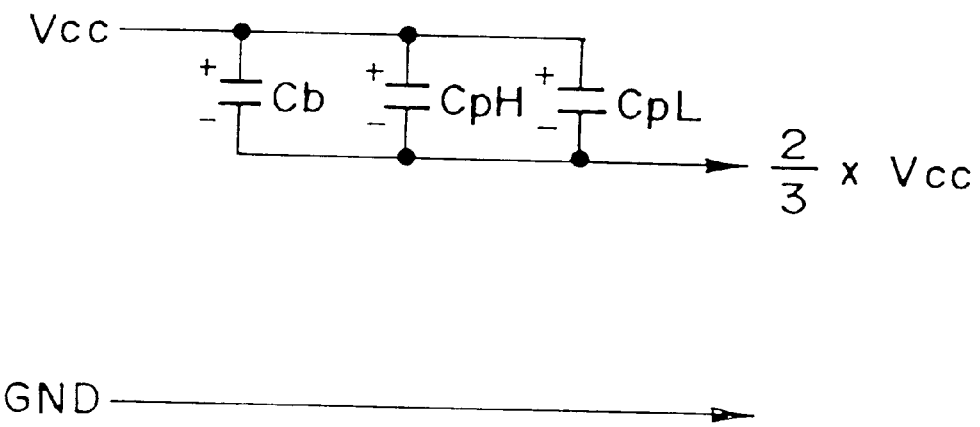

Conceptual diagrams of a charge pump circuit for dropping a voltage by $2/3$ are shown in FIGS. 16A and 16B. This circuit also repeatedly alternates between a state shown in FIG. 16A in which pumping capacitors CpH and CpL are connected in series with a backup capacitor Cb and a state shown in FIG. 16B in which Cb, CpH, and CpL are connected in parallel. The voltages applied to Cb, CpH, and CpL when in the parallel connection of FIG. 16B are all the same, so that each of Cb, CpH, and CpL is charged to a voltage that is substantially one-third of Vcc when they are connected in series as shown in FIG. 16A. Several repetitions of this operation causes the voltages applied to Cb, CpH, and CpL to approximate to one-third of Vcc, with the result that a voltage that is one-third less than Vcc, that is, two-thirds that of Vcc, is generated as an output voltage.

(9) Negative-Direction $2/3$-Times Dropping Operation

Figure 17A:
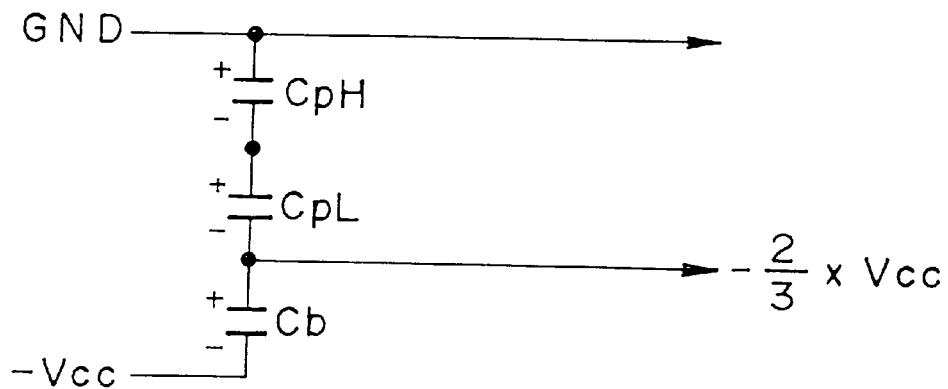
FIGS. 17A and 17B are conceptual diagrams of a charge pump circuit for dropping a voltage by 2/3 in the negative direction.
Figure 17B:
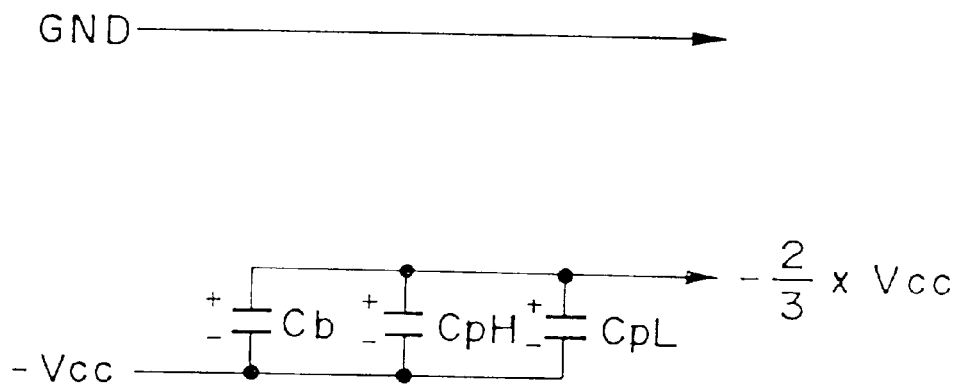

Conceptual diagrams of a charge pump circuit for dropping a voltage by $2/3$ in the negative direction are shown in FIGS. 17A and 17B. Since the operating principle of this circuit is similar to that of the above $2/3$-times dropping circuit, detailed description thereof is omitted. In a similar manner to that of the $2/3$-times dropping circuit, this circuit repeatedly alternates between a state shown in FIG. 17A in which CpH and CpL and a backup capacitor Cb are connected in series and a state shown in FIG. 17B in which Cb, CpH, and CpL are connected in parallel, so that a dropped voltage of $(-2/3 \times Vcc)$ can be obtained in the direction opposite to that of the above $2/3$-times dropping circuit.

(10) Specific Example of Charge Pump Circuit

Figure 18:
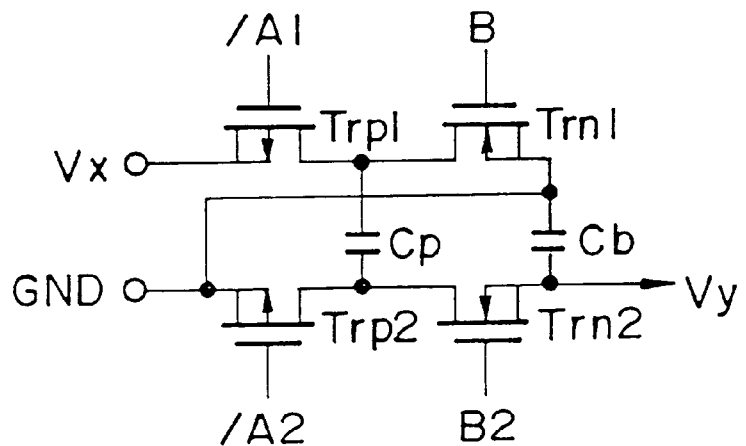
FIG. 18 is a circuit diagram of a specific example of a circuit for doubling a voltage in the negative direction.

An example of a configuration in which the basic parts of the charge pump circuit for doubling a voltage in the negative direction of FIG. 8 are represented by individual components (a discrete configuration) is shown in FIG. 18. Assume that Vx is an input voltage, Vy is an output voltage, and Vx>0. At a time T1 (shown in FIG. 19), PMOS transistors Trp1 and Trp2 are turned on, so that a pumping capacitor Cp is charged by a voltage of (Vx×GND). NMOS transistors Trn1 and Trn2 are off during this time. At a time T2, Trp1 and Trp2 are turned off and Trn1 and Trn2 are turned on, so that the charge within the pumping capacitor Cp migrates to a backup capacitor Cb. If the source electrode of Trn1 is connected to GND as shown in FIG. 18, alternate repetitions of the operations at times T1 and T2 generate a voltage at the output Vy that is symmetrical with Vx with respect to GND.

Figure 19:
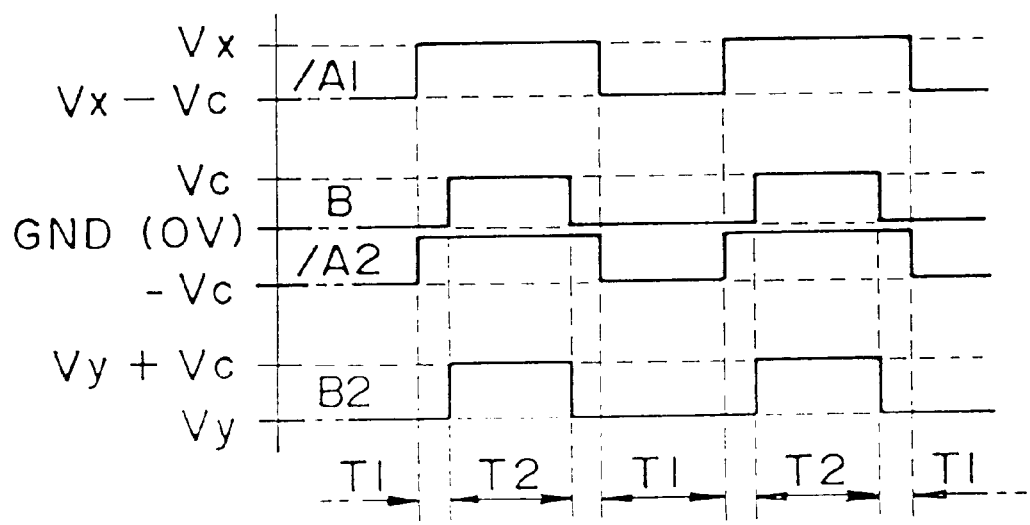
FIG. 19 is a diagram illustrative of the operation of the circuit of FIG. 18.
Figure 20A:
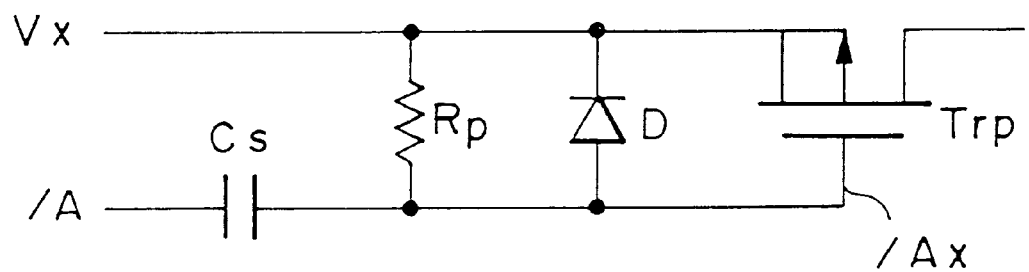
FIGS. 20A and 20B are circuit diagrams of examples of a level-shifting means.
Figure 20B:
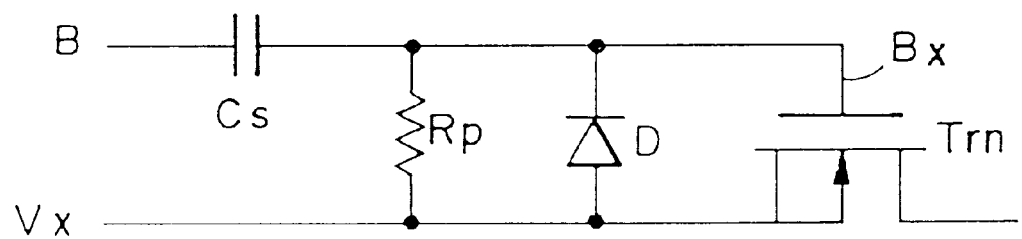

Signals /A1, /A2, B, and B2 that are input to the gates of the transistors in FIG. 18 could be signals of the phases and voltages shown in FIG. 19, for example. If the levels of these signals are not between VC and GND, means for shifting the levels of these signals will be necessary. A simple level-shifting method for use with individual components utilizes a coupling capacitor Cs and a diode D, as shown in FIGS. 20A and 20B. The capacitance of the coupling capacitor Cs could be on the order of 470 pF. The connections shown in FIG. 20A make it possible to obtain a gate signal /Ax which is of the same phase and amplitude as the signal /A and which can turn on and off a PMOS transistor Trp. Similarly, the connections shown in FIG. 20B make it possible to obtain a gate signal Bx which is of the same phase and amplitude as the signal B and which can turn on and off an NMOS transistor Trn. Rp is a resistor of several MΩ that acts to compensate for leakage currents in the diode and stabilize the voltage of the gate signals.

The configuration of a charge pump circuit using individual components has been described above. In contrast thereto, if a monolithic IC is to be used for the charge pump circuit, a known configuration and means that is more suitable for a monolithic IC could be utilized for the transistor configuration and level-shifting means.

(11) Charge Pump Circuit Using Diodes

Figure 21:
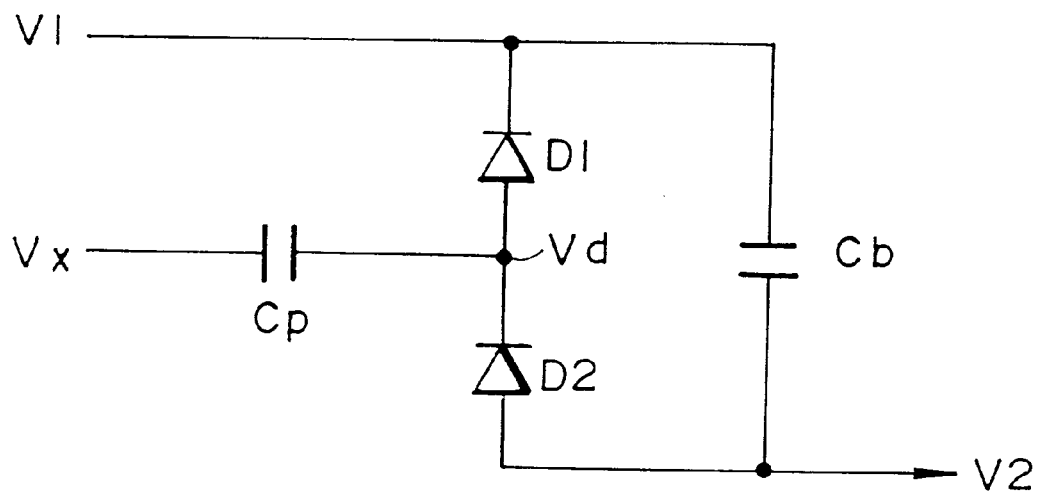
FIG. 21 is a circuit diagram of an example of a charge pump circuit that uses diodes.

A configurational example of a charge pump circuit that uses diodes D1 and D2 instead of transistors as the switching elements is shown in FIG. 21. V1 is a stabilized input voltage and Vx is a clock signal with an oscillation voltage of Vp and a high drive capability. This circuit makes it possible to efficiently generate an output voltage V2={V1—(clock signal oscillation voltage Vp—approximately 0.6 V)}, if the forward-direction voltage of the diodes is approximately 0.6 V.

Figure 22:
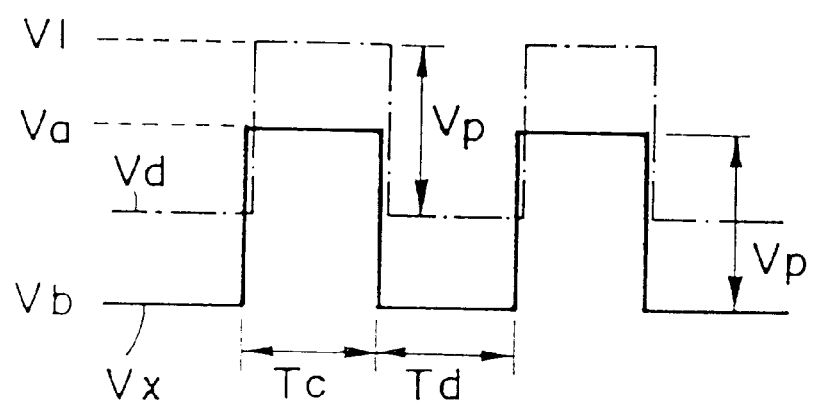
FIG. 22 is a diagram illustrative of the operation of the circuit of FIG. 21.

The operation of this circuit will now be described with reference to the timing chart of FIG. 22. Note that the forward-direction voltage of the diodes D1 and D2 is assumed to be 0 V, to simplify the description. During a time Tc, Vx=Va and, since D1 has a forward bias, Vd=V1. Therefore a capacitor Cp is charged by a voltage of (V1−Va). During a time Td, the level of Vd is pulled down by Cp so that it falls by Vp, which is the amount by which Vx falls. This causes a current to flow along the route from V1→Cb→D2→Cp→Vx, charging Cb. Repetition of the above operations at times Tc and Td makes it possible to obtain an output voltage V2=(V1−Vp).

Figure 23:
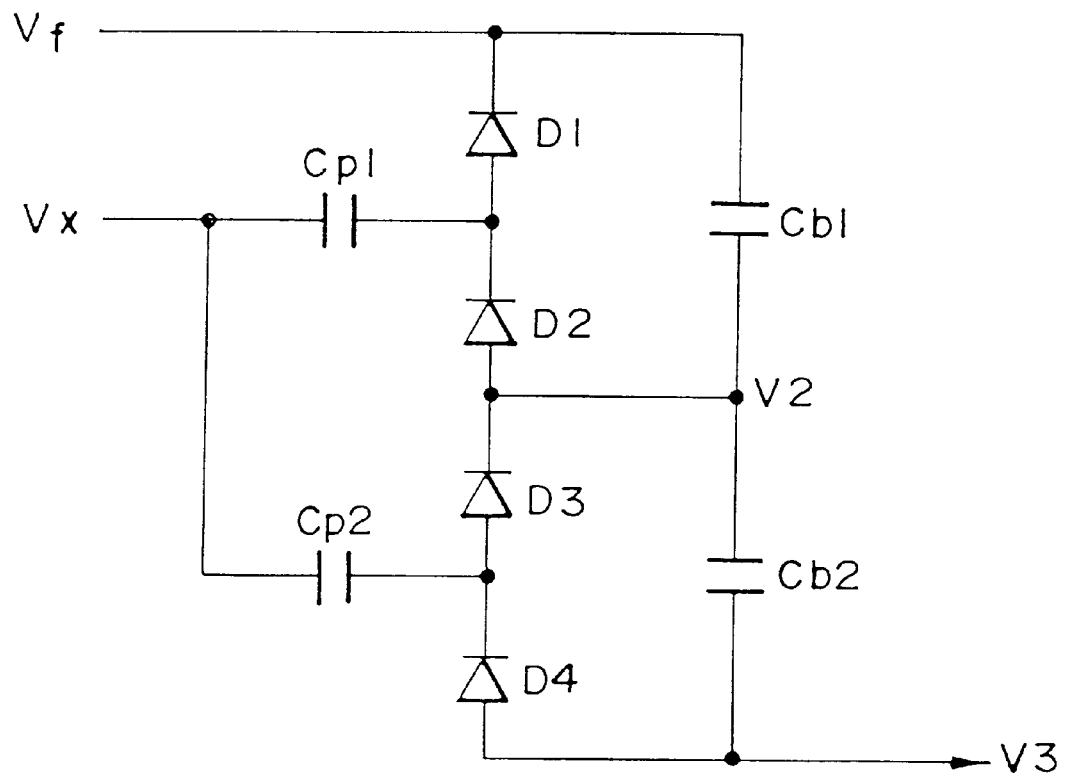
FIG. 23 is a circuit diagram of an application example of the circuit of FIG. 21.

Note that the circuit of FIG. 21 could be made to have a two-stage structure, as shown in FIG. 23, making it possible to obtain as V3 a voltage that is {V1−2×(Vp—approximately 0.6 V)}. In a similar manner, a three-stage structure would make it possible to obtain a voltage that is: {V1−3×(Vp—approximately 0.6 V)}.

As described above, the configuration of the charge pump circuit of this invention is not limited to the use of components such as transistors; it can be embodied by various other means such as diodes.

EMBODIMENT 4

Embodiment 4 relates to a method of increasing the output capability (current supply capability) of the charge pump circuits. A large output capability can basically be obtained by ensuring that the transistors that configure the charge pump circuit have a low on-resistance and capacitors thereof have a large capacitance, but an efficient circuit can also be obtained by other methods. One such method that could be considered is to provide a plurality of pumping capacitors and charge a backup capacitor alternately by this plurality of pumping capacitors. Another method is to add a circuit for doubling the frequency of LP and to cause the charging and pumping operations once every half-period of LP. A double voltage drops occurs at −V3 of FIG. 1, for example, due to the current dissipated by the circuit portions connected to −V3 and the current dissipated by the circuit portions connected to −V2. It is therefore preferable to use one of the above described methods to ensure that a charge pump circuit that supplies −V3 has a large output capability.

Figure 24:
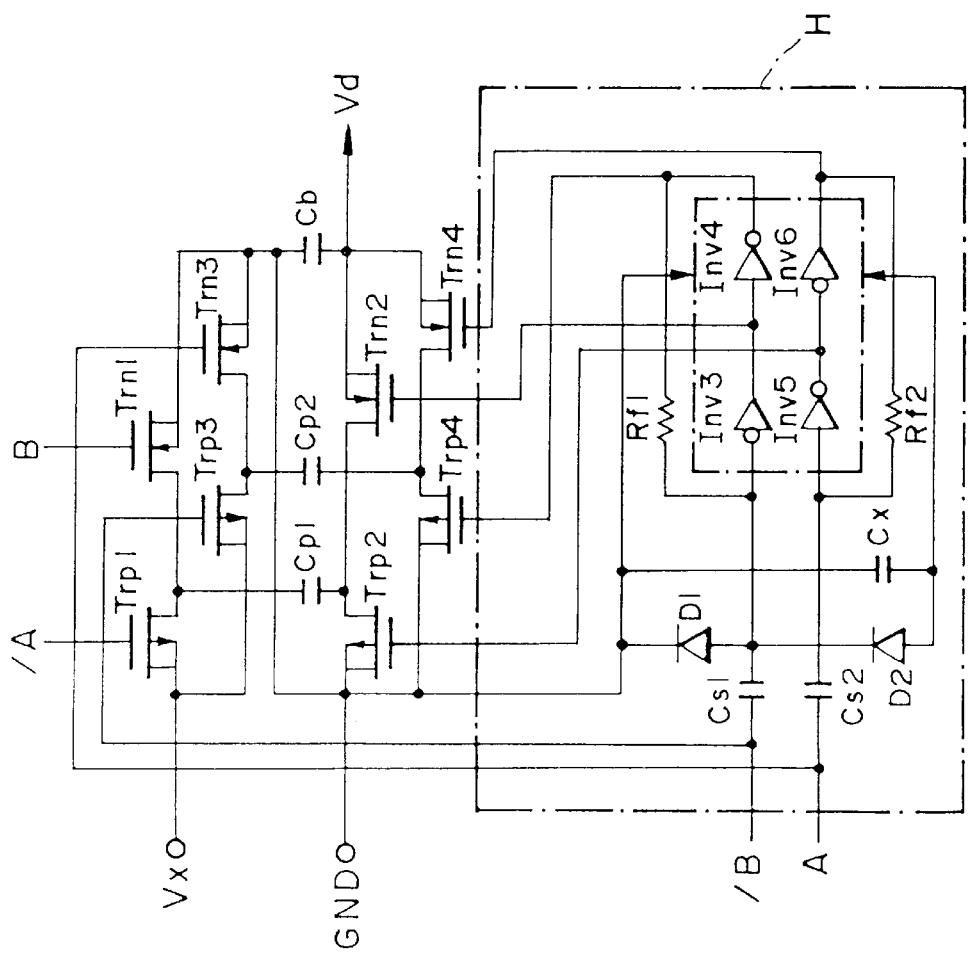
FIG. 24 is a circuit diagram of an example of a charge pump circuit provided with two pumping capacitors.

An example of a circuit with an increased output capability and which is provided with a plurality of pumping capacitors Cp1 and Cp2 is shown in FIG. 24. This example shows a circuit configured of individual components, in a similar manner to FIG. 18.

Signals A, /A, B, and /B are formed by the clock generator described with reference to FIG. 4, and Vx is an input voltage. A period of time during which A is high is T1 and a period of time during which B is high is T2. During the time T1, Trn1, Trn2, Trp3, and Trp4 are off and Trp1 and Trp2 are on. This causes Cp1 to be charged by the voltage Vx. Since Trn3 and Trn4 are on, the charge that was stored in Cp2 during the previous cycle migrates to Cb. During the next time T2, Trp1, Trp2, Trn3, and Trn4 are turned off and Trp3 and Trp4 are turned on. This causes Cp2 to be charged by the voltage Vx. Since Trn1 and Trn2 are on, the charge that was stored in Cp1 during the previous cycle migrates to Cb. A charge pump circuit with a small ripple output voltage and a high output capability can be implemented by supplying charge to Cb alternately from the two pumping capacitors Cp1 and Cp2 in this manner.

Note that a portion indicated by H in FIG. 24 is a level-shifting means for generating signals A and /B into signals having voltages and phases necessary for driving the gates of the transistors Trp2, Trp4, Trn2, and Trn4. Cs1 and Cs2 are coupling capacitors of a capacitance on the order of 470 pF, D1 and D2 are diodes, Inv3 to Inv6 are inverters, and Rf1 and Rf2 are resistances of about 1 kΩ. Inv3, Inv4, and Rf1 form one hold circuit and Inv5, Inv6, and Rf2 form another hold circuit. If the positive-side power source terminals of Inv3 to Inv6 are connected to GND in the configuration of FIG. 24, a voltage that is lower than GND by Vx is generated at the negative-side power source terminals of Inv3 to Inv6, so that signals of the same amplitude and the same or opposite phase as signals A and /B are obtained from the outputs of Inv3 to Inv6. It is preferable that a capacitor Cx on the order of 0.1 μF is inserted between the power source terminals of Inv3 to Inv6. This level-shifting means has an advantage over the level-shifting means described with reference to FIGS. 20A and 20B in that the drop in signal amplitude is small.

Figure 25A:
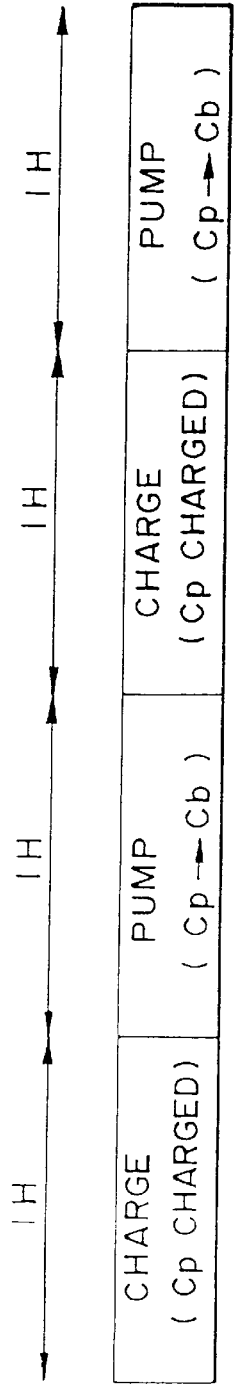
FIGS. 25A, 25B, and 25C are diagrams illustrative of the method used to perform a charge pump operation every horizontal scan period.
Figure 25B:
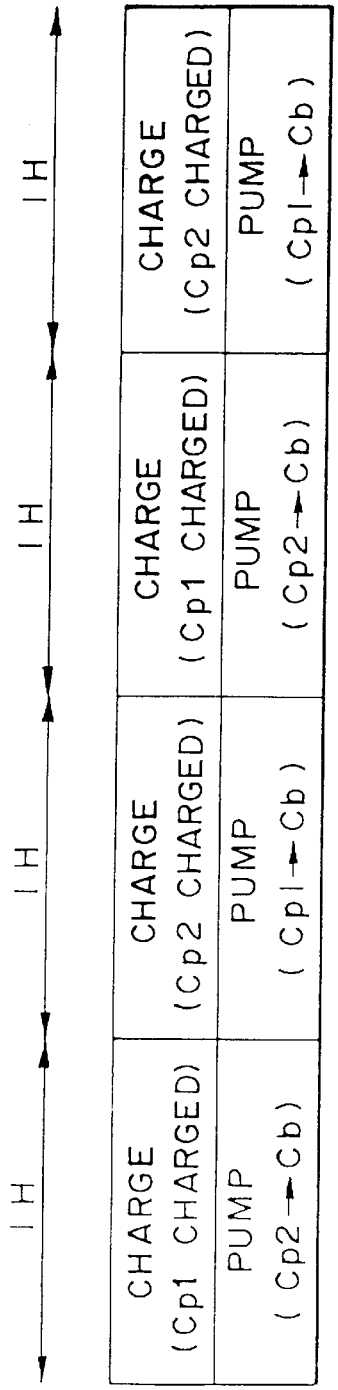

With this embodiment, a plurality of pumping capacitors are provided to improve the output capability, but this method is also effective in improving the display quality. With the method that uses the latch pulse signal LP, for example, the charging of the pumping capacitor Cp and the pumping of the backup capacitor Cb by Cp are repeated every two horizontal scan periods (2H), as shown in FIG. 25A. If a charge pump circuit of this configuration is used for the negative-direction double boosting circuit 5 of FIG. 1, for example, a zebra pattern that repeats every eight lines (four dark lines and four light lines) will appear. This is because the negative-direction double boosting circuit 5 supplies currents that are dissipated at both −V2 and −V3, and these voltages −V2 and −V3 dissipate larger currents than VH and VL. If this negative-direction double boosting circuit 5 is configured to have a plurality of pumping capacitors as shown in FIG. 24, however, the above described display aberration can be prevented effectively. The reason for this is because this configuration ensures that the charging of Cp1 or Cp2 and the charging of Cb by either Cp2 or Cp1 occurs in every horizontal scan period, as shown in FIG. 25B.

Figure 25C:
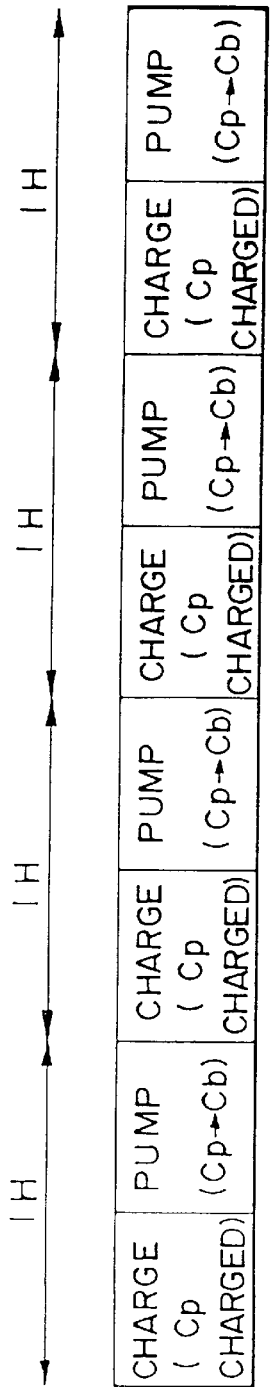

Note that the appearance of above described display un-uniformity could be prevented by performing at least the charging of a pumping capacitor and the charging of the backup capacitor by a pumping capacitor every horizontal scan period. Therefore, the above described display aberration can be prevented by using a signal of a frequency twice that of the latch pulse signal LP to perform the charge pump operation, as shown in FIG. 25C.

EMBODIMENT 5

Embodiment 5 relates to the adjustment of the boosting or dropping ratio of a charge pump circuit. The negative-direction sextuple boosting circuits described with reference to FIGS. 10 and 12 have a boosting ratio that is fixed at six times. This boosting ratio is set at six times because, when Vcc has been reduced to 3 V in a liquid crystal display device with a duty ratio of 1/240, a negative-direction quintuple boosted voltage VEE (in other words, VEE=−12 V) would be insufficient, and hence it is necessary to produce a voltage on the order of −13.5 V. The value of VEE necessary for this same liquid crystal display device is approximately −12 V if Vcc is 3.3 V, or approximately −10.5 V if Vcc is 3.6 V. The reason why the necessary value of VEE varies with the voltage of Vcc is discussed below. In other words, Vcc or a voltage that is half thereof is used without modification as the voltage for driving the X electrodes in this embodiment. Therefore, if Vcc increases, the effective voltage applied to the liquid crystal during non-selection periods also increases, and it is necessary to reduce the selection voltage by the same amount. Conversely, if Vcc decreases, the effective voltage applied to the liquid crystal during non-selection periods also drops, and thus it is necessary to increase the selection voltage by the same amount. For that reason, it is sufficient to set the boosting ratio of the negative-direction sextuple boosting circuit 2 of FIG. 1 to quintupling, not sextupling, when Vcc is higher than 3.3 V, and it is also preferable to reduce the power consumption by automatically switching it to quintupling when Vcc is high. A negative-direction quintuple boosting operation is also sufficient when Vcc has been reduced to 3 V in a liquid crystal display device with a duty ratio of 1/200. Thus it is preferable that the switching from quintupling to sextupling or from sextupling to quintupling can be set by an external terminal.

Figure 26:
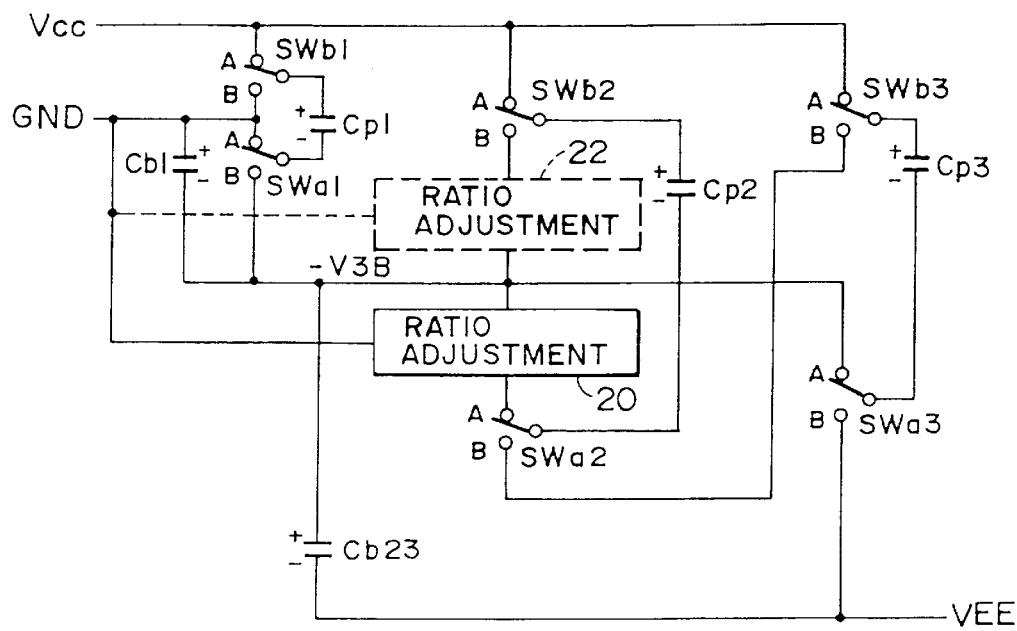
FIG. 26 is a circuit diagram of an example of a charge pump circuit provided with a boosting or dropping ratio adjustment section.
Figure 27:
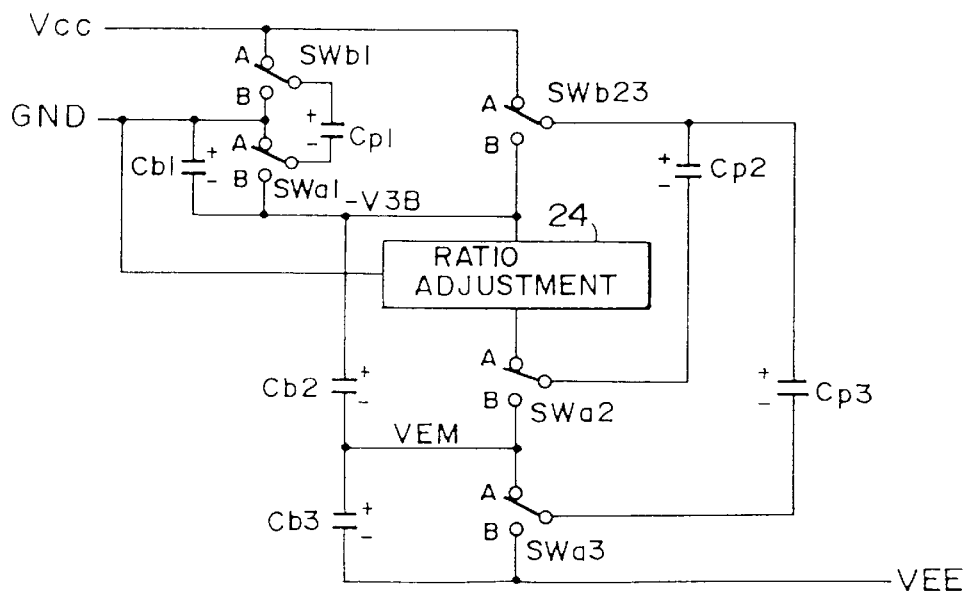
FIG. 27 is a circuit diagram of another example of a charge pump circuit provided with a boosting or dropping ratio adjustment section.

Adjustment of the boosting or dropping ratio can be implemented as described below. The configuration shown in FIG. 26 could be used to modify the boosting ratio of the previously described circuit of FIG. 10, for example. In other words, a ratio adjustment circuit 20 could be provided, whereby a node A of SWa2 is connected to −V3B for a sextuple boosting operation and the node A of SWa2 is connected to GND for a quintuple boosting operation. Alternatively, a ratio adjustment circuit 22 could be provided, whereby a node B of SWb2 is connected to −V3B for a sextuple boosting operation and the node B of SWb2 is connected to GND for a quintuple boosting operation. Similarly, a configuration such as that as shown in FIG. 27 could be used to adjust the boosting ratio of the previously described circuit of FIG. 12. In other words, a ratio adjustment circuit 24 could be provided, whereby a node A of SWa2 is connected to −V3B for a negative-direction sextuple boosting operation and the node A of SWa2 is connected to GND for a negative-direction quintuple boosting operation.

A 3/2-times boosting ratio could be adjusted into a 2/3-times dropping ratio as described below. In other words, the positive terminal of Cb in the 3/2-times boosting circuit of FIGS. 14A and 14B is connected to an output terminal and the negative terminal thereof is connected to Vcc, but this circuit could be provided with switching means such that the positive terminal of Cb is connected to Vcc and the negative terminal thereof is connected to output-terminal, as shown in FIGS. 16A and 16B.

An embodiment configured in this manner is provided with a charge pump circuit for performing a K-times (where K≧2) boosting or L/M-times (where L/M is not an integer) dropping or M/L-times boosting charge pump operation and means for adjusting the boosting ratio or dropping ratio of this charge pump circuit. This makes it possible to reduce the amount of current dissipated wastefully in the contrast adjustment circuit 3 of FIG. 1, leading to an even more reduced power consumption.

Note that −V3B is formed in the negative-direction sextuple boosting circuits shown in FIGS. 10 and 12, and this −V3B is equivalent to a voltage that is twice GND with reference to Vcc in the negative direction. Similarly, the output voltage −V3 of the negative-direction double boosting circuit 5 of FIG. 1 is equivalent to a voltage which is twice GND with reference to Vcc in the negative direction. Therefore, the circuit formed by SWb1, SWa1, Cp1 and Cp2 in FIGS. 10 and 12 could be omitted and the output voltage −V3 of the negative-direction double boosting circuit 5 could be provided in common as −V3B of FIGS. 10 and 12. Alternatively, the negative-direction double boosting circuit 5 could be omitted and −V3B of the negative-direction sextuple boosting circuit 2 could be provided in common as −V3. It should be noted, however, that the drop in the output voltage due to the load current is large when these voltages are used in common, so it is preferable to ensure that this common usage is dependent on the size of the panel.

EMBODIMENT 6

Embodiment 6 is provided with means for stopping the generation of high voltages by the charge pump circuits during a certain time after the input power source has been applied.

Figure 28A:
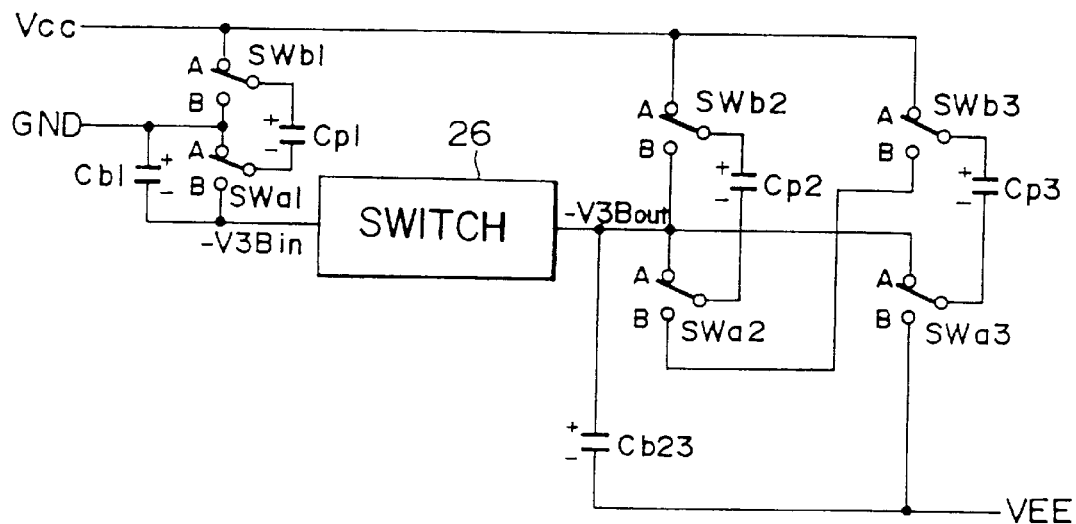
FIGS. 28A and 28B are circuit diagrams of an example in which the supply of high voltages is stopped during a given period of time after the power source is applied.
Figure 28B:
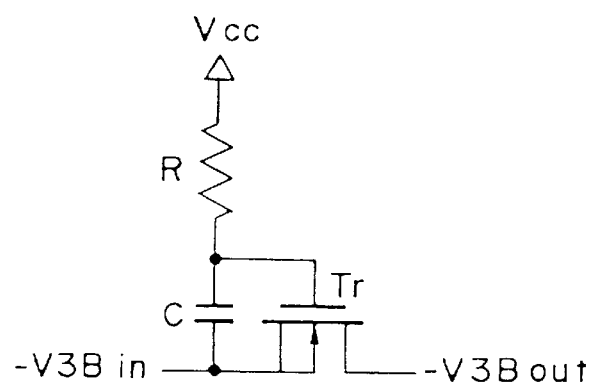

If high voltages (the first potential VH and the Nth potential VL in FIG. 1) are generated by using charge pump circuits, and this generation of high voltages is not stopped during a certain time after the input power source has been applied, there is a risk that the system will not start up correctly. One reason for this is because, if the logic portions of the driver ICs (the data line driver and scan line driver) are not operating normally before a high voltage is generated, the output circuit in the driver ICs could cause a short. To prevent this risk, a switch circuit 26 could be provided within the negative-direction sextuple boosting circuit 2 of FIG. 1, as shown in FIG. 28A. The connection between −V3Bin and −V3Bout could be cut during a given period of time after the input power source has been applied. A specific example of the configuration of this switch circuit 26 is shown in FIG. 28B. After Vcc is applied, a transistor Tr is turned off to cut the connection between −V3Bin and −V3Bout for a certain period of time determined by a time constant that is (C×R). It is preferable that a resistor on the order of 10 Ω is inserted to prevent excess currents into each path utilized when an input power source is used without modification as an output voltage, that is, each of the paths between Vcc and V3 and between GND and VC in FIG. 1.

Note that, if the generation of VL (Nth potential) is stopped by the switch circuit 26 provided within the negative-direction sextuple boosting circuit 2 in the configuration of FIG. 1, the generation of VH (first potential) is also stopped. It is therefore not necessary to provide a switch circuit in the double boosting circuit 4. If, on the other hand, VH is supplied by using a circuit that boosts Vcc by six times with reference to GND, a supply-halting circuit could be provided within this sextuple boosting circuit.

EMBODIMENT 7

Figure 29:
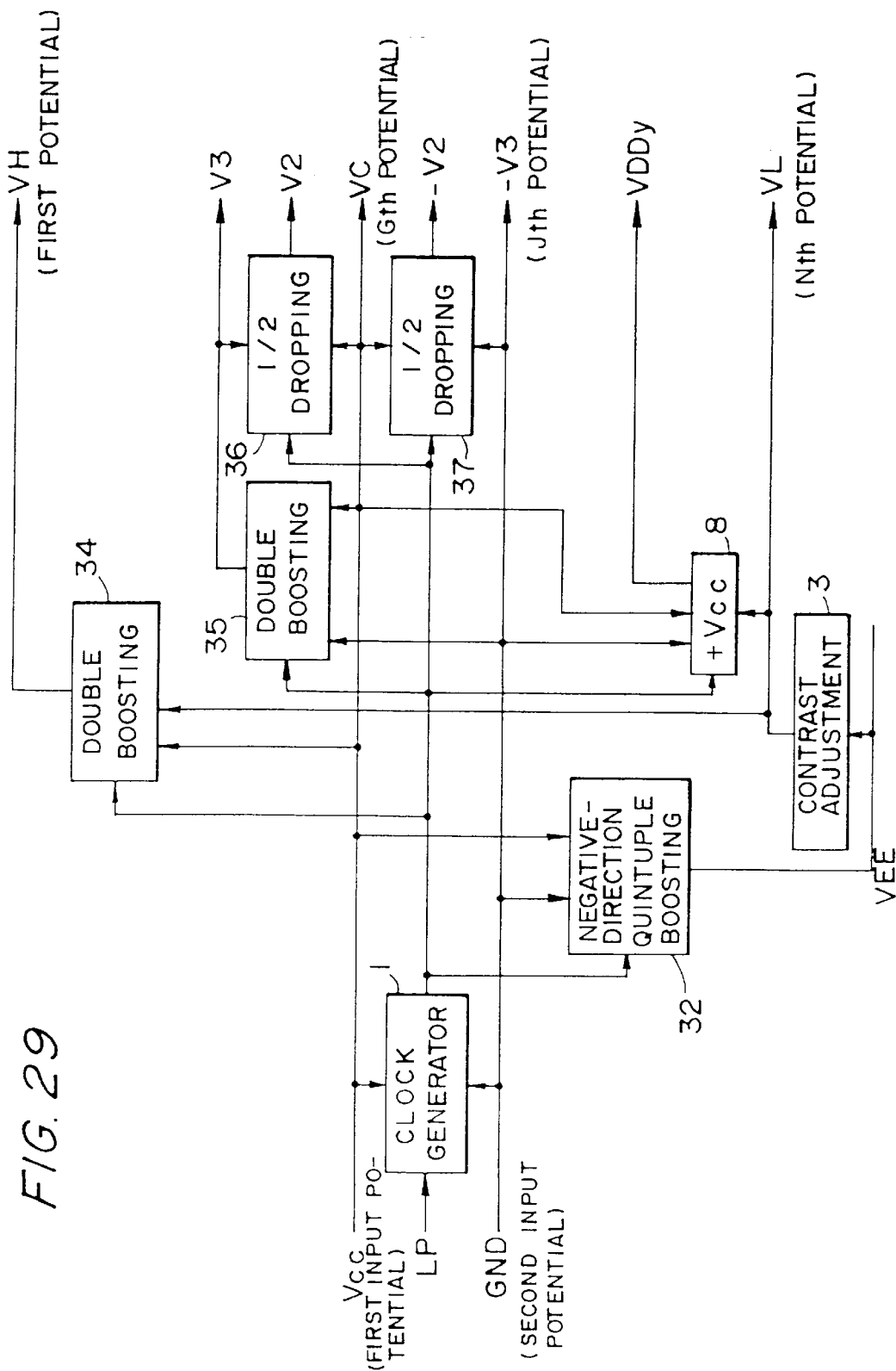
FIG. 29 is a block diagram of a power circuit relating to Embodiment 7.

A block diagram of a power circuit in accordance with Embodiment 7 is shown in FIG. 29. This power circuit has the function of generating voltages that are the same as the output voltages of Embodiment 1 of FIG. 1, but all displaced by (Vcc−GND) towards the high-potential side. Although the first to Nth potentials in Embodiment 1 of FIG. 1 are formed to be symmetrical with respect to a second input potential GND on a low-potential side thereof, they are formed to be symmetrical with respect to a first input potential Vcc on the high-potential side in FIG. 29.

To simplify the description, only the portions that differ from Embodiment 1 are described herein. A negative-direction quintuple boosting circuit 32 performs the charge pump operation to generate a voltage VEE which is five times GND with reference to Vcc in the negative direction. If Vcc is 3.3 V, VEE is −13.2 V. A double boosting circuit 34 generates a voltage VH which is twice Vcc with reference to VL. Another double boosting circuit 35 generates a voltage V3 which is twice Vcc with reference to GND. Two ½-times dropping circuits 36 and 37 generate a voltage V2 that is half the voltage between V3 and Vcc and a voltage −V2 that is half the voltage between Vcc and GND. The voltages for driving the liquid crystal panel are formed in the above manner. Note that Vcc is used without modification as a center potential VC and GND is used without modification as −V3. The levels of voltages output from this power circuit are characterized in being symmetrical with respect to the input power source Vcc on the high-potential side. The power circuit of this configuration enables a reduction in the power consumption of a liquid crystal display device driven by a four-line simultaneous selection drive method, for the same reasons as those given above for Embodiment 1.

A reduced power consumption can be expected for the liquid crystal display device by this use of a configuration in which, when the output voltages necessary for driving the liquid crystal have a center potential and a large proportion of the current consumption occurs when a current flows between this center potential and another voltage, the center potential is made to be the same as either the first or the second input potential and the output voltages are formed by circuits that mainly act as charge pump circuits. Since the current consumptions of the high voltages VH and VL are low, this configuration makes it possible to use charge pump circuits with low output capabilities to form these high voltages VH and VL easily. Since these high voltages are formed by charge pump circuits that have low power losses, an even lower power consumption can be expected for the liquid crystal display device.

Note that a configuration is possible in which the negative-direction quintuple boosting circuit in Embodiment 7 is adjusted into a positive-direction boosting circuit, and then, after VH has been formed by the contrast adjustment circuit, the voltage of VH is doubled in the negative direction to form VL.

EMBODIMENT 8

Figure 30:
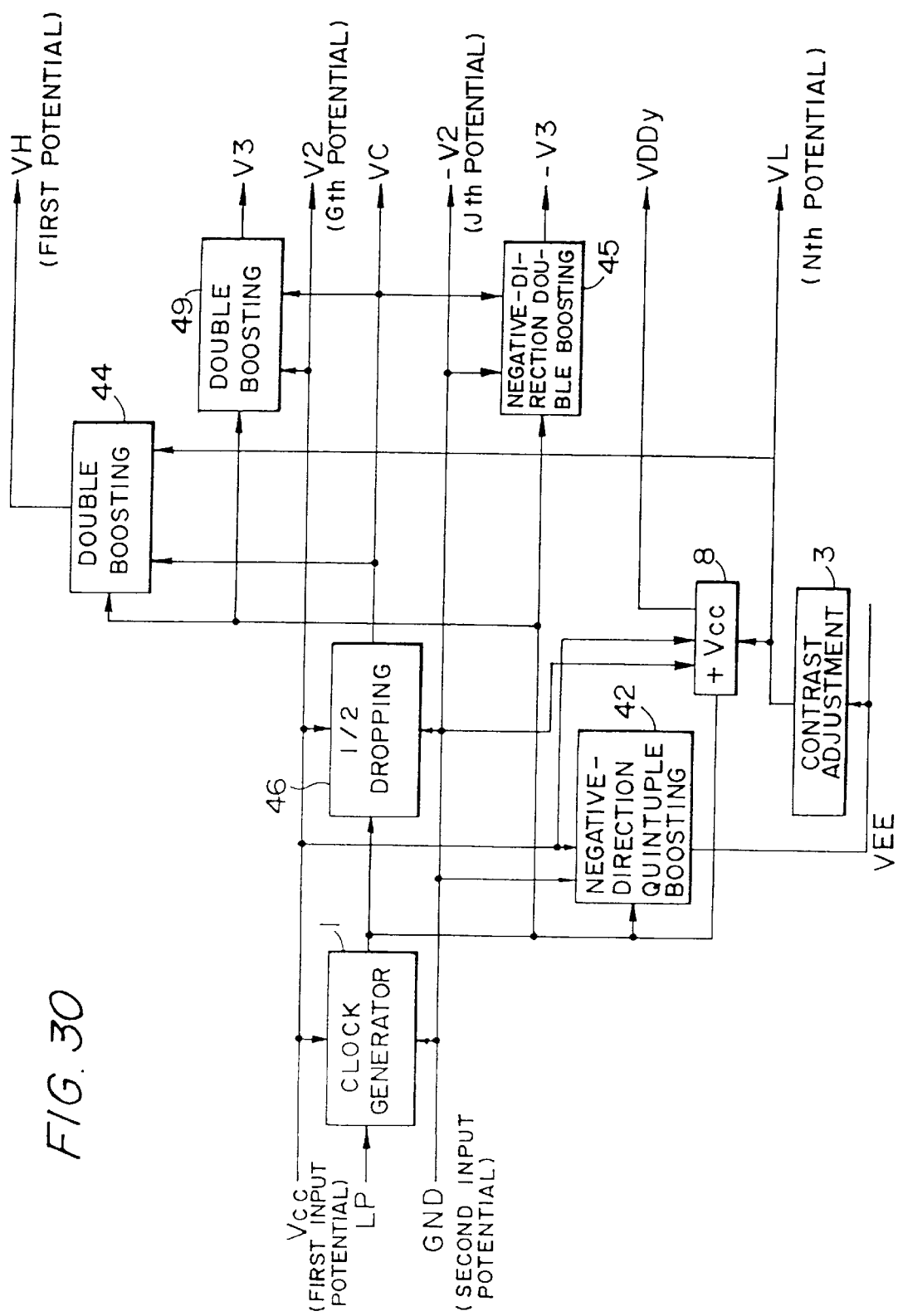
FIG. 30 is a block diagram of a power circuit relating to Embodiment 8.

A block diagram of a power circuit in accordance with Embodiment 8 is shown in FIG. 30. This power circuit has the function of generating voltages that are the same as the output voltages of Embodiment 1 of FIG. 1, but all displaced by {½×(Vcc−GND)} towards the high-potential side. In Embodiment 8, the first to Nth potentials are formed to be symmetrical with respect to a center potential between the first input potential Vcc and the second input potential GND.

A ½ dropping circuit 46 performs a charge pump operation to generate a voltage VC that is half the voltage between Vcc and GND, where that VC is used as a center potential for the first to Nth potentials. A negative-direction quintuple boosting circuit 42 generates a voltage VEE which is five times GND with reference to Vcc, in the negative direction. A double boosting circuit 44 generates a voltage VH which is twice VC with reference to VL. A negative-direction double boosting circuit 45 generates a voltage −V3 which is twice GND with reference to VC, in the negative direction. A double boosting circuit 49 generates a voltage V3 which is twice VCC with reference to VC, in the positive direction. The voltages for driving the liquid crystal panel are formed in the above manner. Note that Vcc is used without modification as V2 and GND is used without modification as −V2. This power circuit is characterized in that the output voltages are symmetrical with respect to the center potential VC between the first input potential and the second input potential. Embodiment 8 makes it possible to reduce the power consumption of a liquid crystal display device that is driven by a four-line simultaneous selection drive method, for the reasons discussed above with reference to Embodiment 1.

It should be noted that a configuration in which the double boosting circuit 49 and the negative-direction double boosting circuit 45 of FIG. 30 are omitted could be used if five levels of voltages are desired.

EMBODIMENT 9

Figure 31:
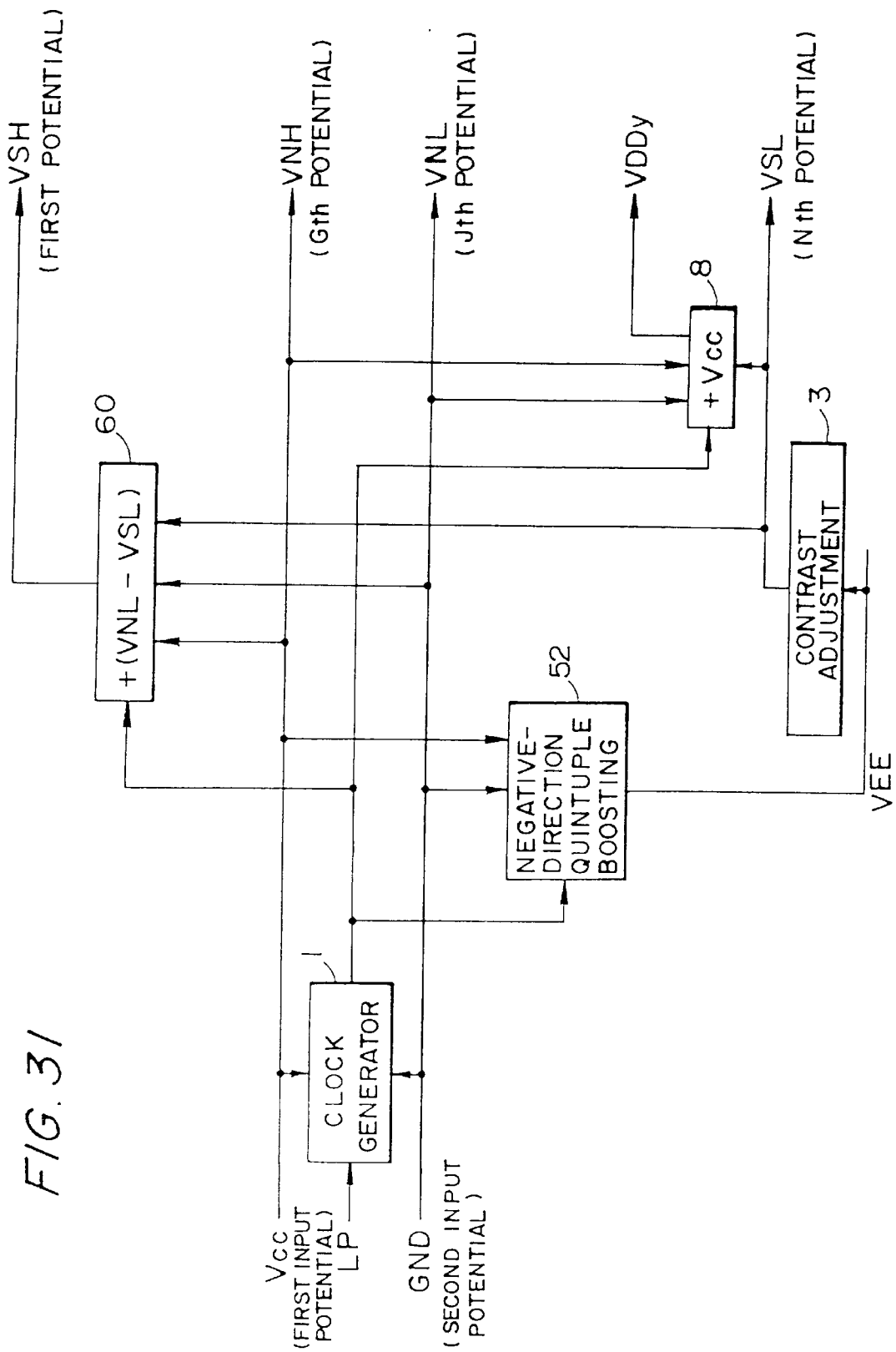
FIG. 31 is a block diagram of a power circuit relating to Embodiment 9.
Figure 51:
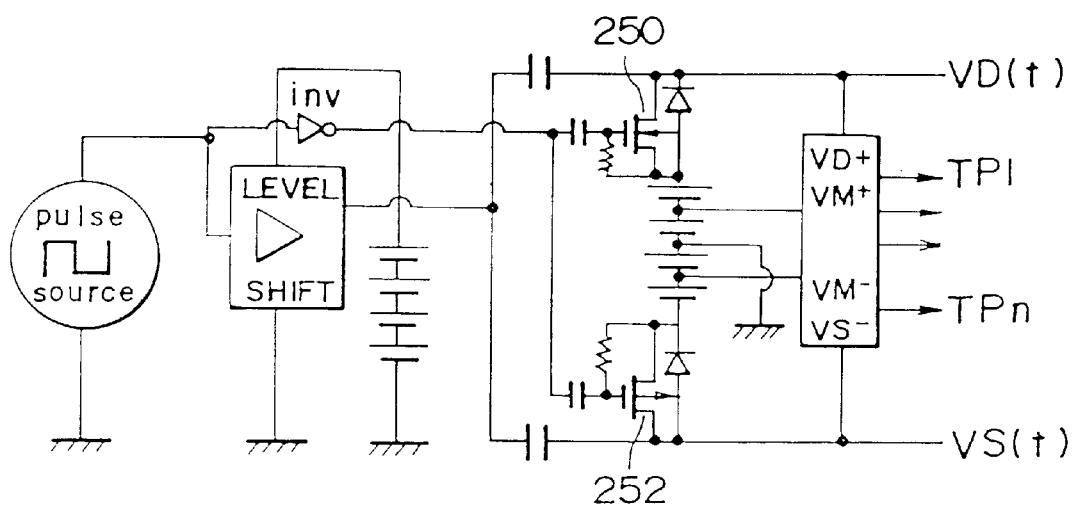
FIG. 51 is a circuit diagram of an example of the power circuit of a third prior-art example.

A block diagram of a power circuit in accordance with Embodiment 9 is shown in FIG. 31. In Embodiment 9, the output voltages are formed symmetrically with respect to a center potential between the first and second input potentials Vcc and GND. The power circuit of Embodiment 9 drives a liquid crystal panel in which a two-terminal type of non-linear switching element is used. In contrast to the power circuit described with reference to FIG. 51 which used a method of swinging the power voltage applied to the Y driver, the power circuit of Embodiment 9 outputs a steady voltage that does not vary. An example of the panel drive waveform that occurs when this power circuit is used is shown in FIG. 32.

Figure 32:
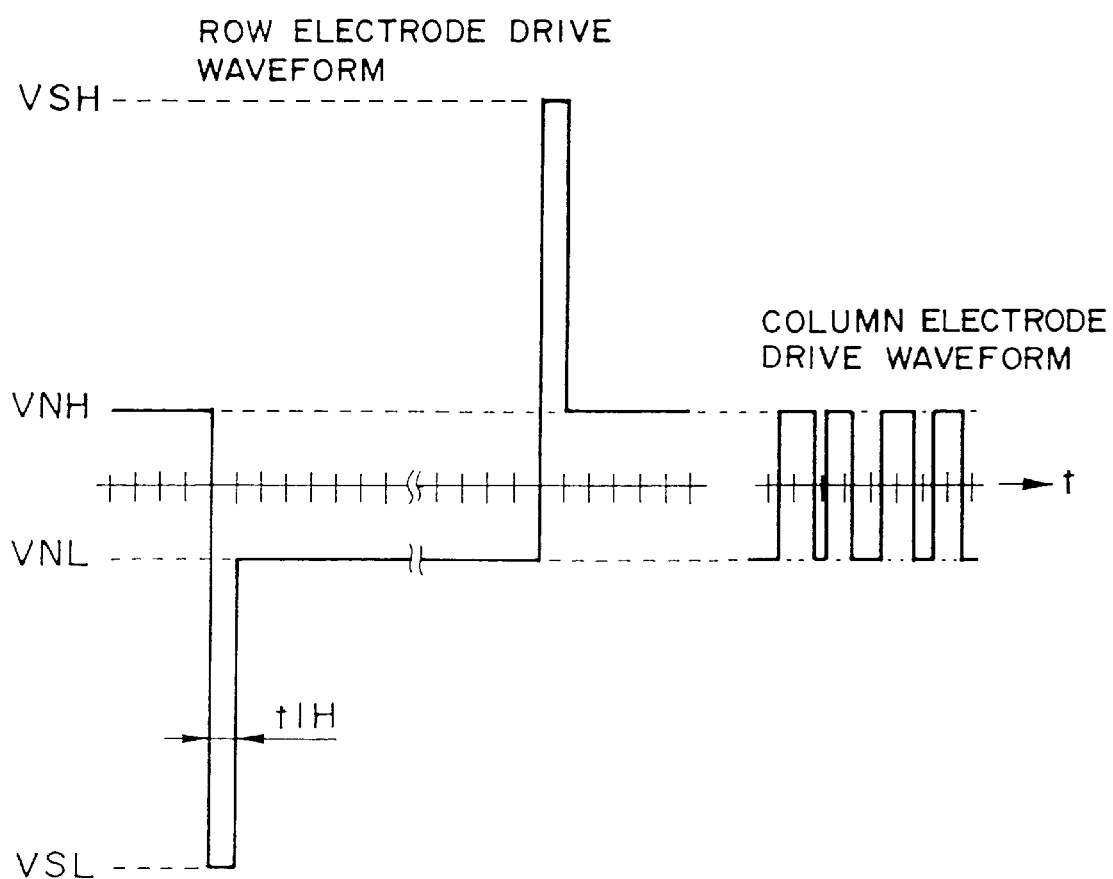
FIG. 32 shows an example of a waveform of the voltage for driving the panel.

The description first refers to FIG. 32. VSH is a selection voltage on a positive side and VSL is a selection voltage on a negative side. VNH is a non-selection voltage when VSH is a selection voltage and VNL is a non-selection voltage whenr VNL is a selection voltage. These voltages are in the relationship (VSH−VNH)=(VNL−VSL); in other words, the relationship is such that the center potential of VNH and VNL is the same as the center potential of VSH and VSL. The horizontal axis t is a time axis where each graduation corresponds to the length t1H of one selection period. The column electrode drive waveform is an example of the waveform that occurs when a grayscale is displayed by a pulse width modulation method. As can be seen from FIG. 32, the configuration of the power circuit is significantly simplified by making the voltage for driving the column electrodes the same as the non-selection voltage for the row electrodes.

The description now turns to the circuit of FIG. 31. The logic drive voltages Vcc and GND are used without modification as VNH and VNL which are non-selection voltages and, at the same time, column electrode drive voltages. A negative-direction quintuple boosting circuit 52 generates a voltage VEE that is five times GND with reference to Vcc, in the negative direction. If Vcc is 5 V, VEE is −20 V. A boosting circuit 60 generates VSH which is (VNL−VSL) higher than VNH. The voltages for driving the liquid crystal panel are formed in the above manner. The output voltages of this power circuit of this configuration are characterized in being symmetrical with respect to the center potential of the first second input potentials.

If the power circuit of the above described configuration drives a liquid crystal panel that uses a two-terminal type of non-linear switching element, the operating voltages of the power circuit and the Y driver are close to double those achieved with a swinging power source method, but the power consumption of the liquid crystal display device can still be reduced regardless. One reason for this is the fact that the voltage applied to the Y driver is static so that the problems caused by the swinging power source method does not occur. In other words, the problem caused by charging and discharging of the total parasitic capacitance of the Y driver by the swinging voltage amplitude and the problem caused by shorting currents flowing through the Y driver at the transition timing do not occur with this embodiment. Since these charging/discharging and shorting currents due to high voltages in the Y driver during one selection period occur in only one of the several hundred output lines, the increase in current due to a higher voltage is tiny, even if the high voltage is nearly doubled. Another reason is due to the extremely small power consumption in the power circuit itself. This is because the output voltages are generated by boosting circuits using a highly efficient charge pump method. This embodiment makes it possible to drive a liquid crystal panel that uses a two-terminal type of non-linear switching element, with a power consumption that is approximately half that of the swinging power source method.

Note that this embodiment has been described as using the negative-direction quintuple boosting circuit 52. However, if a low-voltage liquid crystal is used, the negative-direction quintuple boosting circuit 52 could be turned into a negative-direction quadruple boosting circuit. Conversely, Vcc could be lowered to 3.3 V and the negative-direction quintuple boosting circuit 52 could be turned into a negative-direction sextuple boosting circuit. This embodiment is also described that a grayscale is displayed by a pulse width modulation method, but a frame-rate-control method could equally well be used.

A ½-times dropping circuit could be added between Vcc and GND in FIG. 31 to generate a center potential, if five levels of voltages are desired.

EMBODIMENT 10

Figure 33:
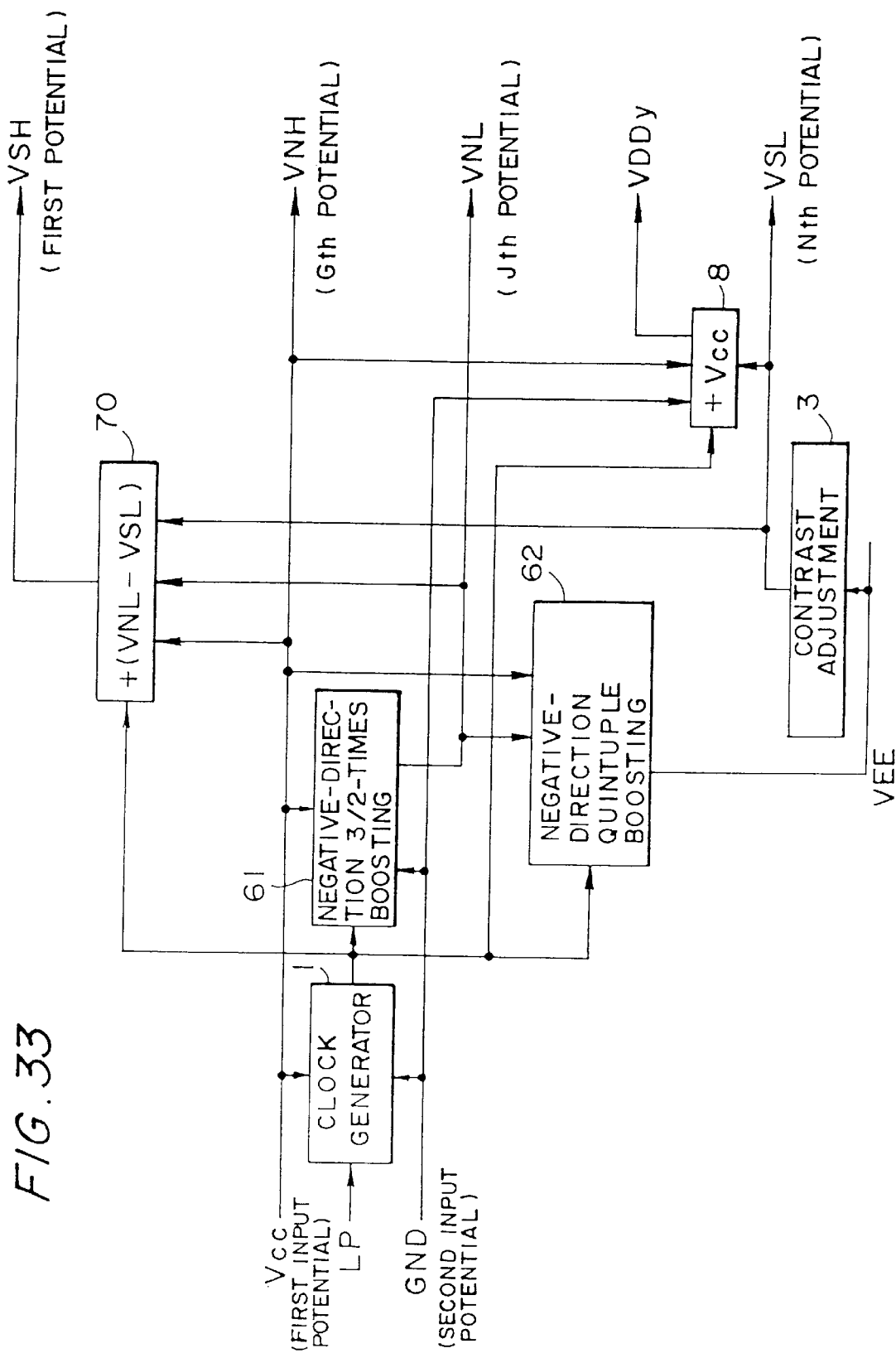
FIG. 33 is a block diagram of a power circuit relating to Embodiment 10.

A block diagram of a power circuit in accordance with Embodiment 10 is shown in FIG. 33. Embodiment 10 differs from Embodiment 9 in that it generates a potential VNL that is different from the first and second input potentials Vcc and GND. The output voltages of this power circuit are formed symmetrically with respect to the center potential between this VNL and either Vcc or GND.

In Embodiment 10, the logic drive voltage Vcc is used without modification as VNH, which is the non-selection voltage and also the column electrode drive voltage. A negative-direction ³⁄₂-times boosting circuit 61 generates a voltage VNL which is ³⁄₂ times GND with reference to Vcc, in the negative direction. A configurational example of the negative-direction ³⁄₂-times boosting circuit 61 has already been described with reference to FIGS. 15A and 15B. A negative-direction quintuple boosting circuit 62 generates a voltage VEE which is five times VNL with reference to Vcc, in the negative direction. If Vcc is 3.3 V, (Vcc−VNL) is 4.95 V and (VNL−VEE) is 19.8 V, so that substantially the same output voltages are obtained as those with Embodiment 9 when Vcc is 5 V. A boosting circuit 70 generates VSH, which is (VNL−VSL) higher than VNH. The voltages for driving the liquid crystal panel are formed in the above manner. This power circuit is characterized in using a charge pump circuit to generate a potential VNL that is different from the first and second input potentials, and the output voltages thereof are symmetrical with respect to a center potential between Vcc and VNL. Embodiment 10 of the above configuration makes it possible to use low voltages as the logic voltages, and thus reduce the power consumption of a liquid crystal panel that uses a two-terminal type of non-linear switching element further than in Embodiment 9.

EMBODIMENT 11

Figure 34:
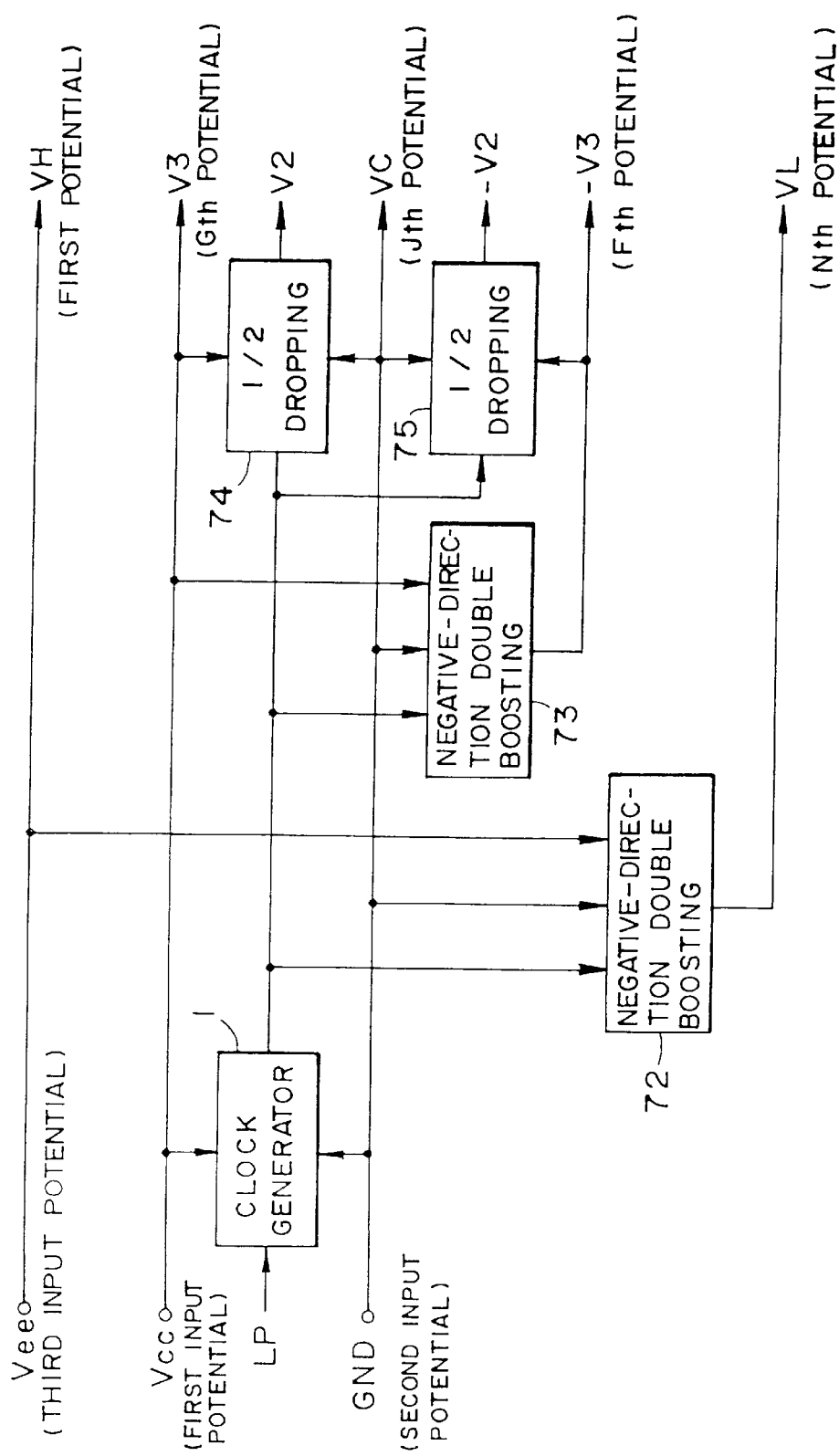
FIG. 34 is a block diagram of a power circuit relating to Embodiment 11.

A block diagram of a power circuit in accordance with Embodiment 11 is shown in FIG. 34. Embodiment 11 differs from Embodiment 1 of FIG. 1 in that the input power source comprise a third input potential Vee. In other words, whereas Embodiment 1 has a single power source configuration (Vcc and GND), Embodiment 11 has a twin power source configuration (Vee, Vcc, and GND).

A negative-direction double boosting circuit 72 performs a charge pump operation to generate a voltage VL which is twice GND with reference to the third input potential Vee, in the negative direction. A negative-direction double boosting circuit 73 generates a voltage −V3 which is twice GND with reference to the first input potential Vcc, in the negative direction. Two ½ dropping circuits 74 and 75 generate a voltage V2 that is half the voltage between Vcc and GND and a voltage −V2 that is half the voltage between GND and −V3. Vcc is used without modification as V3 and GND is used without modification as VC. The power circuit of the above configuration makes it possible to form the voltages necessary for a four-line simultaneous selection drive method, for example. Note that the configuration of the ½ dropping circuits using the charge pump method has already been described with reference to FIG. 9.

Figure 35:
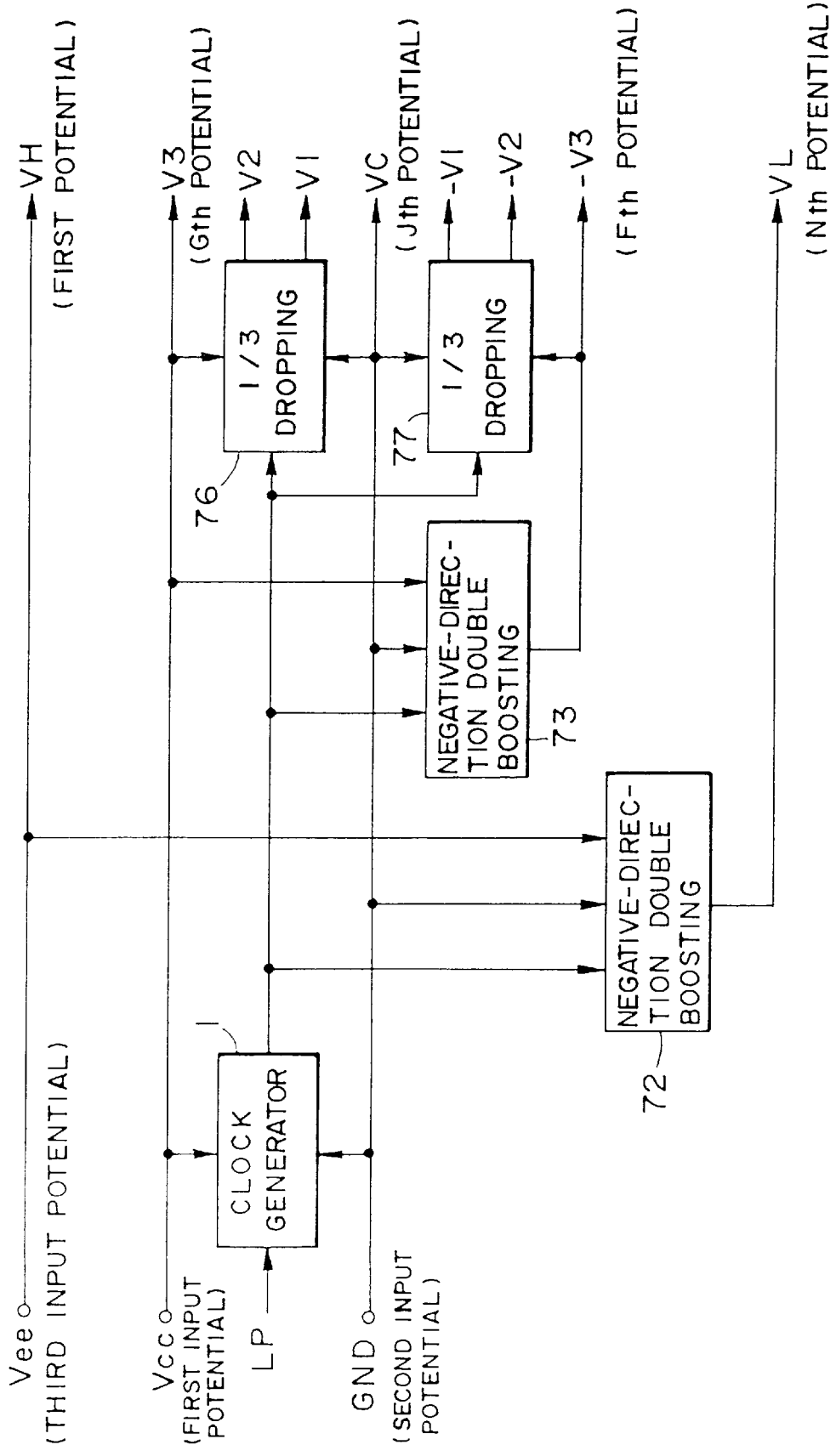
FIG. 35 is a block diagram of another example of a power circuit relating to Embodiment 11.

A block diagram of a circuit in which ⅓ dropping circuits 76 and 77 are provided instead of the ½ dropping circuits 74 and 75 is shown in FIG. 35. The ⅓ dropping circuits 76 and 77 generate voltages V1 and V2 that are each one-third of the voltage between Vcc and GND and voltages −V1 and −V2 that are each one-third of the voltage between GND and −V3, respectively. This power circuit makes it possible to form the voltages necessary for a six-line simultaneous selection drive method, for example.

Figure 36:
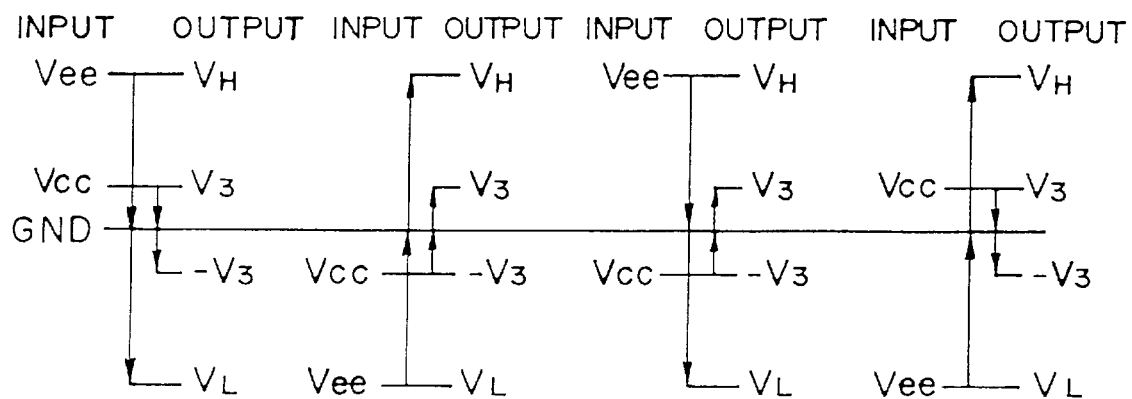
FIG. 36 is a diagram illustrative of potential relationships of input power source.

Note that the description of this embodiment assumed that both Vee and Vcc have positive potentials with reference to GND, to make it easier to understand, but it is not necessary for both Vee and Vcc to have positive potentials; either or both of Vee and Vcc could equally well have a negative potential with reference to GND, as shown in FIG. 36.

The configuration of the above described embodiment has the characteristics given below.

In this embodiment, a first input potential Vcc on the high-potential side comprised within the input power source and a second input potential GND on the low-potential side thereof are used without modification as the Gth potential V3 and the Jth potential VC within the first to Nth potentials (where $N \geq 4$). A third input potential Vee on either the high-potential side or the low-potential side of the first and second input potentials is used as either the first potential VH on the high-potential side or the Nth potential VL on the low-potential side. The power circuit also comprises a charge pump circuit (the negative-direction double boosting circuit 72) which operates based on a given clock signal to thereby supply either of the first and Nth potentials VH and VL, either directly or via adjustment means; and a charge pump circuit (the negative-direction double boosting circuit 73) for supplying an Fth potential (where 1<F<N) on either a high-potential side or a low-potential side of the Gth or Jth potential, either directly or via adjustment means. Furthermore, charge pump circuits (the ½ dropping circuits 74 and 75 or the ⅓ dropping circuits 76 and 77) supply potentials from within the first to Nth potentials but which are not one of the first, Fth, Gth, Jth, and Nth potentials by performing a charge pump operation based on a given clock signal. With the above configuration, the first potential VH or Nth potential VL, which does not require much of an output capability, is supplied by a charge pump circuit that is highly efficient but has a low output capability, and the Gth potential V3 and the Jth potential VC are connected directly to the input power source Vcc and GND, which have a high output capability. Other voltages such as V2 and −V2 are supplied by charge pump circuits. This configuration makes it possible to satisfy both of the improvement of display quality and reducing power consumption. Note that the configuration of this embodiment has the same characteristic as that described in (3) of the section on Embodiment 1, namely that charge pump circuits that provide K-times boosting and L/M-times dropping operations and the like can be comprised together.

The discussion now turns to the power consumption of this embodiment. If the current consumption of load circuits in stages after the power circuit that are operating on voltages V3 and VC is Ic and the current consumption of those operating on voltages −V3 and VC is Id, the power consumption due to Ic in this embodiment is (Ic×Vcc). Since the negative-direction double boosting circuit 73 is an efficient boosting circuit, the power consumption due to Id is substantially (Id×Vcc). In contrast thereto, the power consumption due to Ic in the power circuit of FIG. 49 is (Ic×VEE) and the power consumption due to Id therein is (Id×VEE). If it is assumed that Vcc=5 V and VEE=20 V, the power consumption of power circuit of FIG. 49 is {(Ic+Id)× 20} V whereas the power consumption of this embodiment is {(Ic+Id)×51}V. Therefore the power consumption can be reduced to approximately one quarter.

The above description concentrated solely on the intermediate voltages, but the same could be said for the power consumptions due to VH and VL. In other words, if the current consumption of load circuits in stages after the power circuit that are operating on voltages VH and VC is Ia and the current consumption of those operating on voltages VL and VC is Ib, the power consumption due to Ia and Ib in the power circuit of FIG. 49 is {(Ia+Ib)×20 V}. In contrast thereto, the use of an efficient boosting circuit as the negative-direction double boosting circuit 72 in this embodiment makes it possible to substantially halve that power consumption to {(Ia+Ib)×10 V}. As should be clear from the above description, a greatly reduced power consumption is enabled if a center voltage is required for the load circuits with this embodiment and a large proportion of the current consumption flows between this center voltage and other voltages.

Note that a clock signal could be generated from LP, which is a pulsed clock signal, and charge pump operation could be performed for Embodiment 11, in the same manner as that for Embodiment 1. Charge pump circuits of various different configurations could also be used for Embodiment 11, as described with reference to Embodiment 2. The various methods described with reference to Embodiments 3 to 6 could also be used with the intention of reducing the power consumption. In FIGS. 34 and 35, the outputs are symmetrical with respect to GND, but it is equally possible to form output voltages that are symmetrical with respect to Vcc, or symmetrical with respect to a center voltage between Vcc and GND, or symmetrical with respect to a center voltage between a given generated voltage and Vcc or GND. Furthermore, the ½ dropping circuits 74 and 75 are provided in the configuration of FIG. 34 in order to provide seven voltage levels, but the ½ dropping circuits 74 and 75 may be omitted if five voltage levels are desired. In addition, the configuration could be as shown in FIG. 2 if op-amps are used for ½ dropping and ⅓ dropping operations.

EMBODIMENT 12

Embodiment 12 relates to a configuration that releases any residual charge stored in circuit portions supplied by a voltage obtained from at least one of the first and Nth potentials, when the supply of input power source is stopped, when the supply of the given clock signal is stopped, or when a display-off control signal is input.

Figure 37:
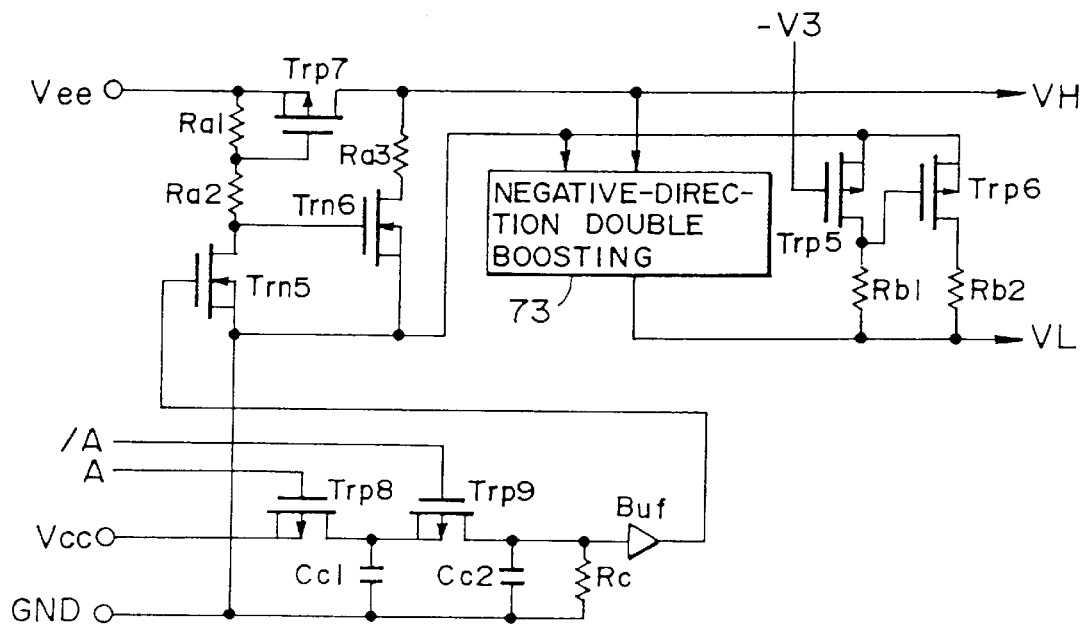
FIG. 37 is a circuit diagram of an example by which residual charge due to VH and VL is discharged.

An example of a circuit that releases residual charge due to VH and VL when the supply of input power source is stopped or when the supply of the clock signal is stopped is shown in FIG. 37. Signals /A and A in FIG. 37 are clock signals of mutually opposite phase. Trp8 and Trp9 are PMOS transistors which repeat an operation whereby one transistor turns on and the other turns off, while a clock signal is supplied. When Trp8 is on, a capacitor Cc1 is charged by the voltage Vcc; when Trp9 is on, the charge in Cc1 migrates to Cc2. If a time constant determined by Cc2 and a resistor Rc is set to be sufficiently larger than the period of a clock signal, the input to a buffer Buf is at a level substantially close to Vcc. If the clock signal is stooped, one or other of these transistors is always off so that the input to Buf is set to GND by Rc and thus the output of Buf also goes to GND. Similarly, the input and output of Buf reach GND level if the supply of the voltage Vcc is stopped.

Trn5 and Trn6 are NMOS transistors and Trp5, Trp6, and Trp7 are PMOS transistors. Ra1, Ra2, and Rb1 are resistors on the order of several MΩ that are each set to have larger resistances than those of Trn5 and Trp5 when those transistors are on. Therefore the current consumption through these resistors is small, even when these transistors are on. When the voltage Vcc is supplied and the clock signal is also supplied, the output of Buf is at Vcc level so Trn5 turns on. When Trn5 turns on, the gate of Trp7 goes low so that Trp7 turns on, and thus the voltage Vee is supplied to VH. The gate of Trn6 reaches GND level and Trn6 turns off. The voltage −V3 is an inverted output of the voltage Vcc (see FIGS. 1 and 34) and it is at substantially the −Vcc level while the voltage Vcc is supplied and the clock signal is operating. This turns Trp5 on and Trp6 off.

If the supply of voltage Vcc is stopped or the supply of the clock signal is stopped, the output of Buf and voltage −V3 reach GND level, turning both Trn5 and Trp5 off. When Trn5 turns off, the gate of Trp7 goes to the level of Vee, turning Trp7 off and interrupting the supply of Vee to VH. The gate of Trn6 reaches Vee level, turning Trn6 on, and the charge remaining in the VH-related circuits is discharged to GND through a resistor Ra3 on the order of 10 kΩ. When Trp5 turns off, the gate of Trp6 goes low, turning Trp6 on, and the charge remaining in the VL-related circuits is discharged to GND through a resistor Rb2 on the order of 10 kΩ.

With this embodiment as described above, the interruption of the supply of the voltage Vee together with the release of residual charge in the circuit portions supplied by voltages from VH and VL, when the supply of the voltage Vcc or the clock signal is stopped, makes it possible to achieve only little increase in the power consumption. This makes it possible to prevent abnormalities in these circuit portions caused by continuous application of high DC voltages abnormally.

Figure 38:
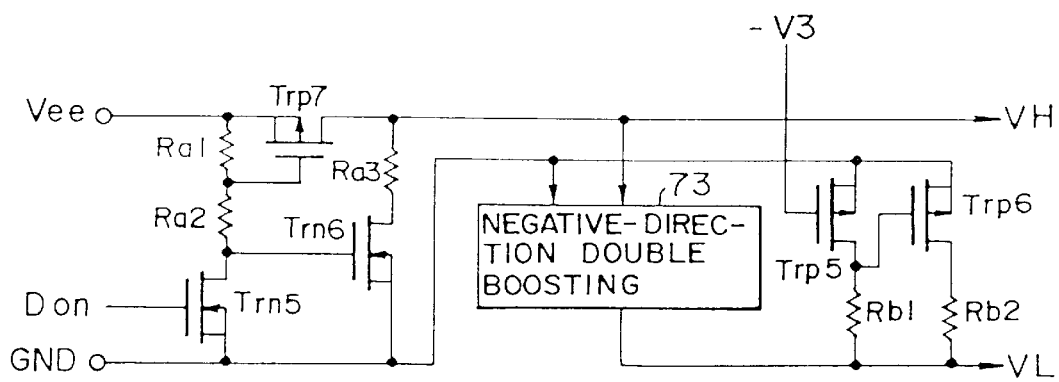
FIG. 38 is a circuit diagram of another example by which residual charge due to VH and VL is discharged.

An example of a circuit that releases residual charge due to VH and VL by the display on/off signal is shown in FIG. 38. The main difference from the circuit of FIG. 37 is the input of a signal Don to the gate of Trn5. This signal Don controls the turning on and off of the display of the liquid crystal display device; it goes high (Vcc) for display-on and low (GND) for display-off. When Don is high, Trn5 turns on, which sets the gate of Trp7 to low, turning Trp7 on. This supplies the voltage Vee to VH.

On the other hand, when Don is low, Trn5 turns off, which raises the gate of Trp7 to the same level as Vee, turning Trp7 off. This interrupts the supply of the voltage Vee to VH. At the same time, the gate of Trn6 also reaches the level of Vee, turning Trn6 on. This releases any VH-related residual charge.

This input of the display on/off control signal to the power circuit of this embodiment enables simple control over the turning on and off of the display of the liquid crystal display device, without increasing the current consumption. Note that the display-off state of the liquid crystal display device achieved by releasing VH-related residual charge could equally well be done by a method that adds a circuit for stopping the clock signal when Don is low, instead of the above described method of inputting the signal Don to the gate of Trn5 directly. The display-off state of the liquid crystal display device could also be achieved by stopping the clock signal by control of the reset pin of DF in FIG. 4 to stop the operation of the charge pump circuits.

Figure 39A:
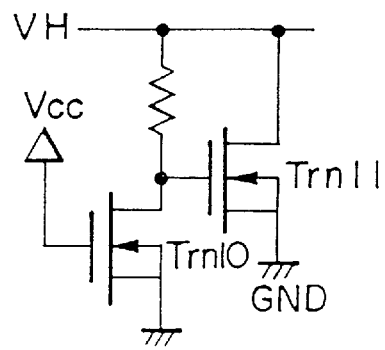
FIGS. 39A and 39B are circuit diagrams of further examples by which residual charge due to VH and VL is discharged.
Figure 39B:
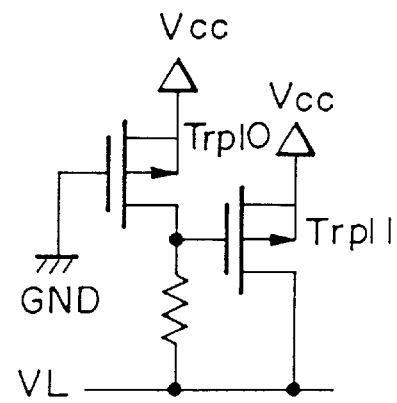

Examples of circuits for releasing charge due to VH and VL when input power has been turned off are shown in FIGS. 39A and 39B. If, for example, the input power is turned off in FIG. 39A and Vcc goes to GND, Trn10 turns off so that the gate of Trn11 goes high. This turns Trn11 on and releases the charge due to VH to GND. When Vcc reaches GND in FIG. 39B, Trp10 turns off so that the gate of Trp11 goes low. This turns Trp11 on and releases the charge due to VL to Vcc.

Figure 40A:
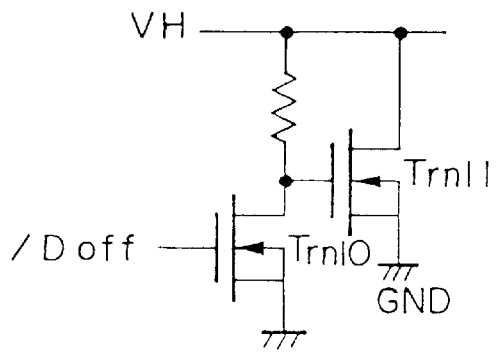
FIGS. 40A and 40B are circuit diagrams of still further examples by which residual charge due to VH and VL is discharged.
Figure 40B:
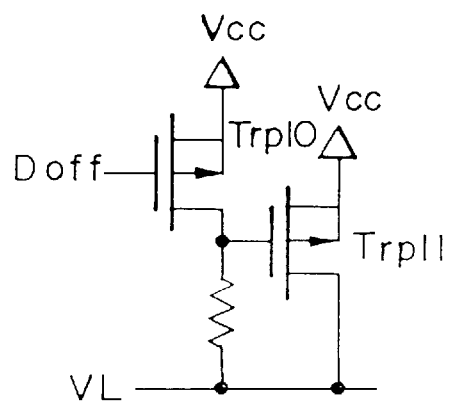

Examples of circuits for releasing charge due to VH and VL when input power has been turned off or a display-off signal is input are shown in FIGS. 40A and 40B. Doff is a signal that is high (at Vcc) when the display is off. When Doff goes high, an inverted signal thereof /Doff goes low (to GND), turning Trn10 off and making the gate of Trn11 high. This turns Trn11 on and releases the charge due to VH to GND. When Doff goes high in FIG. 40B, Trp10 turns off so that the gate of Trp11 goes low. This turns Trp11 on and releases the charge due to VL to Vcc.

EMBODIMENT 13

Figure 41:
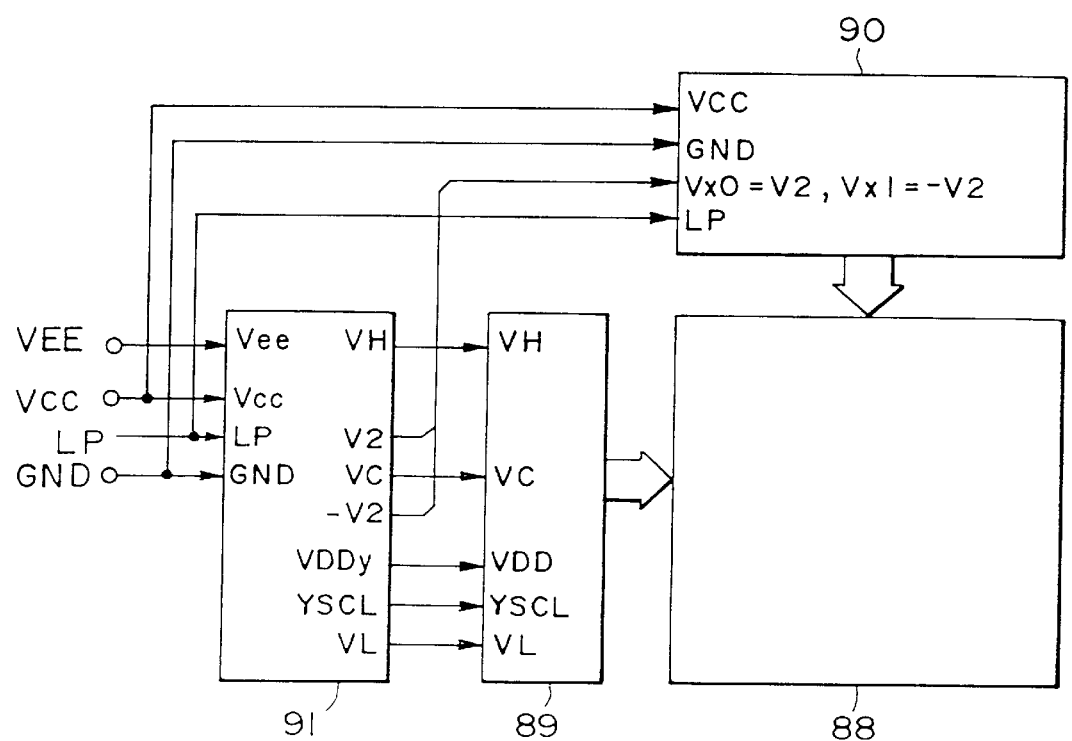
FIG. 41 is a block diagram of an example of a liquid crystal display device relating to Embodiment 13.

A configurational example of a liquid crystal display device that comprises one of the power circuits described as Embodiments 1 to 12 is shown in FIG. 41. This liquid crystal display device comprises a liquid crystal panel 88 having a liquid crystal layer driven by a plurality of data line electrodes and a plurality of scan line electrodes, a power circuit 91, an X driver IC (data line driver) 90 that drives data line electrodes on the basis of a voltage supplied by the power circuit 91, and a Y driver IC (scan line driver) 89 that drives scan line electrodes on the basis of a voltage supplied by the power circuit.

VCC and GND are power source inputs for driving the logic portions of the driver ICs, and VEE and GND are high-voltage power source inputs for forming selection voltages. If the power circuit has a configuration such as that of FIG. 1, VEE is not necessary. LP is a latch pulse signal for the X driver IC and it is usually also used as a shift clock signal for the Y driver IC which comprises shift registers. Depictions of other timing signals and data signals have been omitted from the figure for the sake of clarity.

Figure 42:
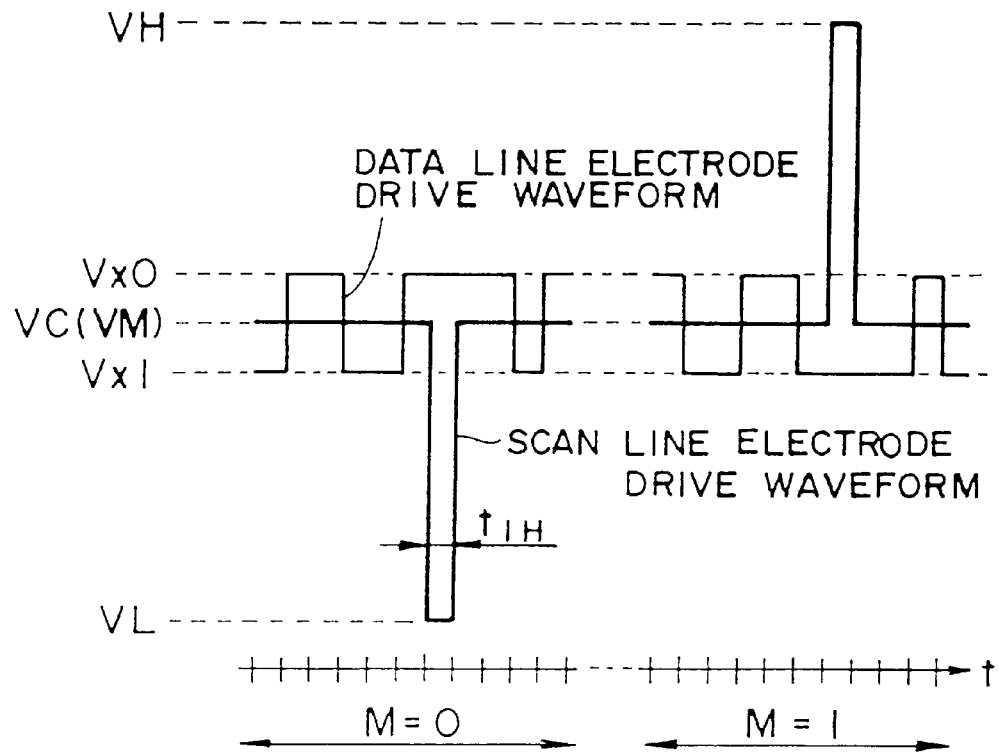
FIG. 42 is a diagram illustrative of the waveform of the voltage for driving the liquid crystal display device of FIG. 41.

An example of the drive voltage waveform used when driving a liquid crystal panel with the circuitry of FIG. 41 is shown in FIG. 42. This drive waveform is equivalent to the drive waveform used when V111 is set to V122, in the drive method disclosed in claim 1 of Japanese Patent Publication No. 57-57718. In this case, VH and VL are voltages applied to selected scan line electrodes, and VC (VM) is a voltage applied to non-selected scan line electrodes. Vx0 and Vx1 are voltages one of which is applied to the X electrodes depending on whether the display data is on or off. M is a control signal for driving the liquid crystal in an alternating polarity, such that the polarity of the voltage applied to the liquid crystal panel is inverted when the signal M goes high or low. t1H represents the length of time that one scan line electrode is being selected.

The voltages necessary for this drive method are formed by one of the power circuits described as Embodiments 1 to 12. For example, the outputs VC, VH, and VL of the power circuit 91 are used as the non-selection level VC and the selection levels VH and VL. Similarly, V2 could be used as the X electrode drive voltage Vx0 and −V2 could be used as Vx1. If, for example, the duty ratio is 1/240, VH is usually on the order of 20 V and V2 is on the order of 1.6 V, which is approximately half the logic voltage of 3.3 V. Therefore a voltage that is half the logic voltage could be used for V2.

Figure 43:
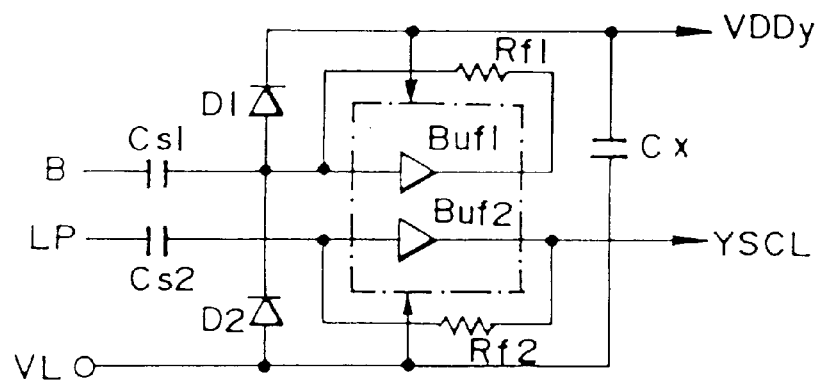
FIG. 43 is a circuit diagram of an example of a level-shifting means.

VCC and GND could be used without modification as the logic voltages of the X driver IC 90. If the Y driver is like a gate driver for a TFT panel, in which the logic voltage is intermediate of the output voltage, VCC and GND could be used without modification for that. If, however, the low-level logic voltage is the same as VL, as it is in an ordinary driver IC for an STN panel, it is necessary to create an another logic voltage VDD for the Y driver IC 89. An example of a circuit for generating logic voltages for the Y driver in this case is shown in FIG. 43, with the operation thereof being basically the same as that of the portion marked with H in FIG. 24. In other words, B is the signal shown in FIG. 5, which uses VCC and GND as power source for driving. Cs1 and Cs2 are coupling capacitors with capacitances on the order of 470 pF, D1 and D2 are diodes, Buf1 and Buf2 are buffers, and Rf1 and Rf2 are resistances on the order of 1 kΩ. Buf1 and Rf1 form one hold circuit and Buf2 and Rf2 form another hold circuit. If the connections are as shown in FIG. 43 and the negative power source terminal of the buffer is connected to VL, a voltage VDDy that is VCC higher than VL is generated at the positive power source terminal of the buffer. Therefore this VDDy can be used as a power source for the logic in the Y driver IC 89. The operating frequency of the Y driver IC 89 is on the order of 1/80 of that of the X driver IC 90, so the current consumption of the logic portion of the Y driver IC 89 is extremely small. It is therefore possible to provide sufficient driving with power voltages formed by the above described simple method. The circuit of FIG. 43 also has the function of shifting the level of the signal LP to form a shift clock signal YSCL for the Y driver. Note that it is preferable to insert a capacitor Cx of about 0.1 µF between the power source terminals of the buffers.

The above description assumed that VCC is 3.3 V. However, if VCC is 5 V, it is preferable to convert the voltage to less than VCC by using components such as op-amps and thereby drive the power circuit 91, the Y driver IC 89, and the X driver IC 90, in order to reduce the power consumption. If VCC is on the order of 1.5 V, that VCC could be used without modification as Vx0 and an inverted-boosted voltage of VCC (negative-direction double boosted voltage) could be used as Vx1.

The power circuit in this liquid crystal display device of this configuration has a low power consumption. The charging/discharging currents that constitute a large proportion of the panel current, in other words, the charging/discharging currents which flow between the X electrodes and the non-selected Y electrodes, are not supplied from the high-voltage side but are supplied from the lower voltage side for driving the logic portions. Therefore the power consumption due to panel currents is greatly reduced, and thus the overall power consumption can be made significantly smaller.

EMBODIMENT 14

Figure 44A:
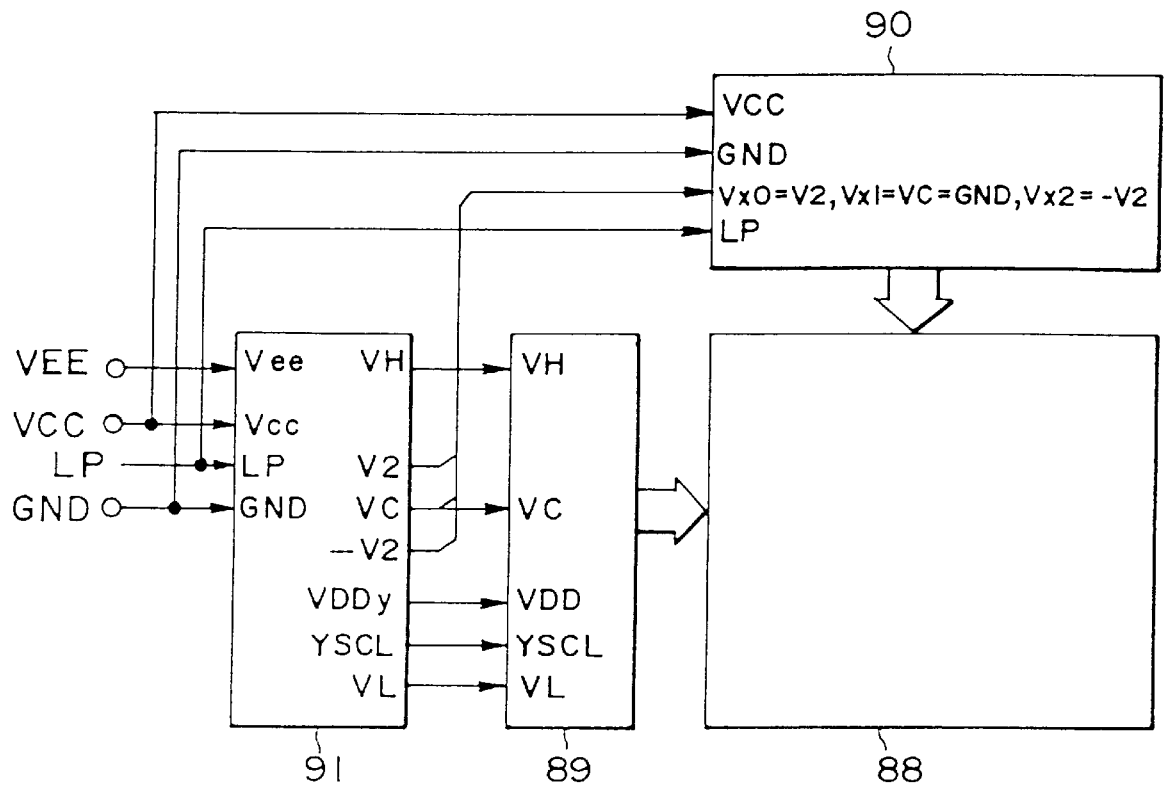

Another configurational example of a liquid crystal display device is shown in FIG. 44A. Since this configuration is basically the same as that of Embodiment 13, only the parts thereof that differ from Embodiment 13 will be described. This embodiment gives an example of driving Y electrodes by a two-line simultaneous selection method.

Figure 44B:
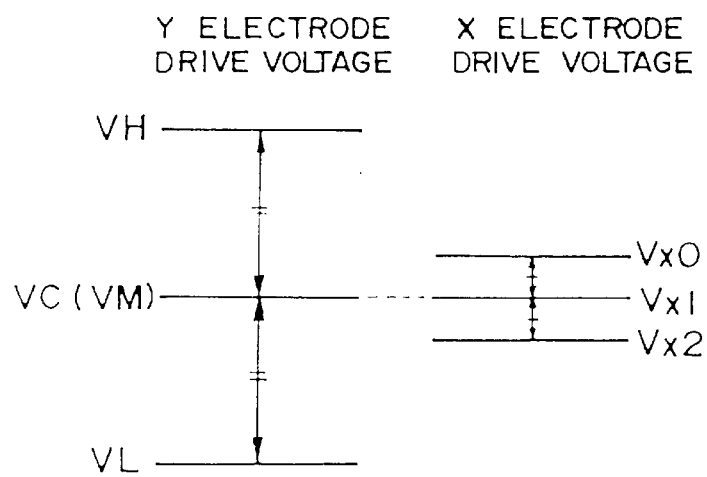
FIG. 44B is a diagram illustrative of the potential relationships of the drive voltages thereof.

The voltages that must be applied to the liquid crystal panel with this drive method are shown in FIG. 44B. In the same manner as in Embodiment 13, a non-selection level VC (VM) and selection levels VH and VL are necessary for driving the Y electrodes. In this case, VH and VL are in a mutually symmetrical relationship centered on VC. Three levels of voltages, Vx0 to Vx2, are necessary for driving the X electrodes. Vx1 and VC are at the same potential, and Vx0 and Vx2 are in a mutually symmetrical relationship centered on Vx1. If, for example, vC is 0 V when the number of Y electrodes scanned within one frame period is on the order of 240 and an ordinary liquid crystal having an effective voltage of Vth (the threshold voltage) on the order of 2 V is used, VH is approximately 16 V and Vx0 is approximately 2 V. In other words, this embodiment differs from Embodiment 13 in that a center potential is added as a drive voltage for the X electrodes, and VH is slightly lower and Vx0 is slightly higher. The power circuit of this embodiment is suitable for generating voltages in a symmetrical relationship, with a low power consumption.

If VCC is 3.3 V, a low-voltage liquid crystal with an effective voltage of Vth that is on the order of 1.6 V can be used. If VCC is on the order of 1.5 V, a low-voltage liquid crystal can be utilized and this VCC can be used without modification as Vx0.

The liquid crystal display device of this embodiment has a low power consumption in the power circuit itself, and the power consumption due to panel currents is also greatly reduced for the same reasons as those discussed with reference to Embodiment 13. Furthermore, the maximum voltage necessary for the driving can be made lower than that of Embodiment 13, enabling an even more reduced power consumption. If IXD is the current consumption in portions such as the logic portion of the X driver in the comparative example of FIG. 49, the resultant power consumption is (IXD×VEE). In contrast thereto, the power consumption in this embodiment is only (IXD×VCC), enabling a greatly reduced power consumption than that of the comparative example.

EMBODIMENT 15

Figure 45A:
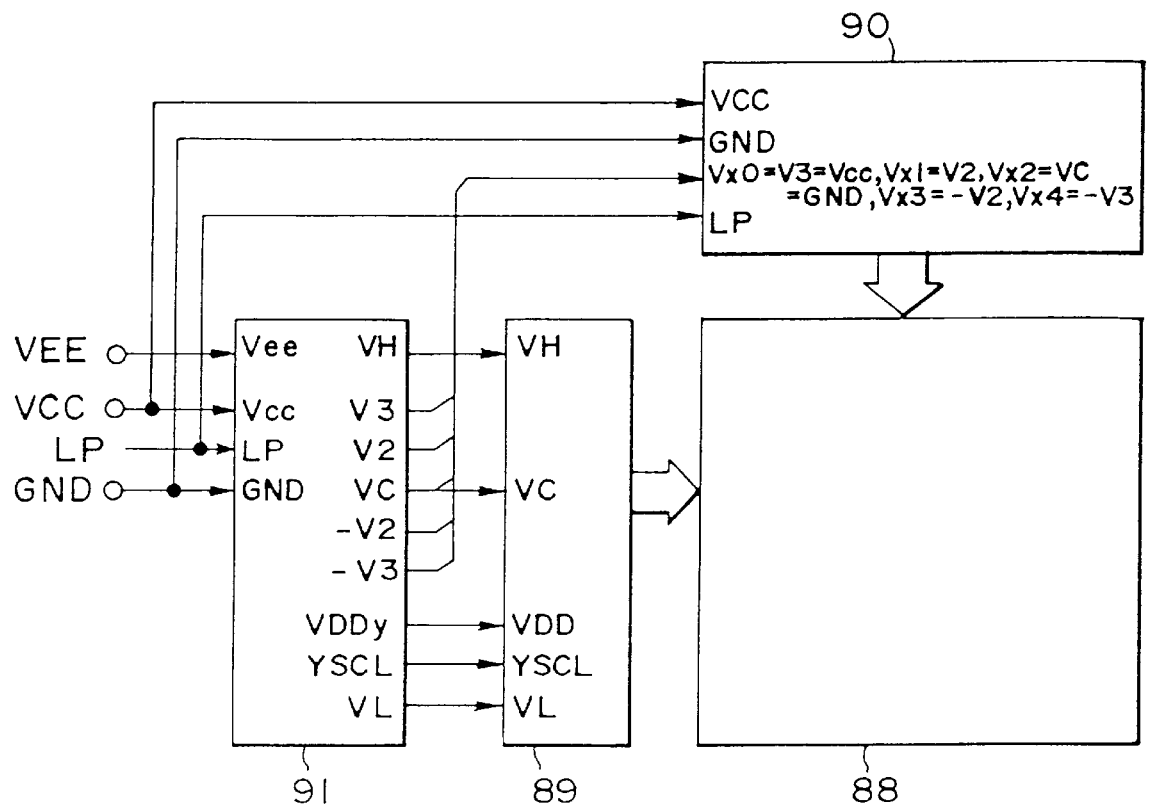

Yet another configurational example of a liquid crystal display device is shown in FIG. 45A. This embodiment gives an example of driving Y electrodes by a four-line simultaneous selection drive method.

Figure 45B:
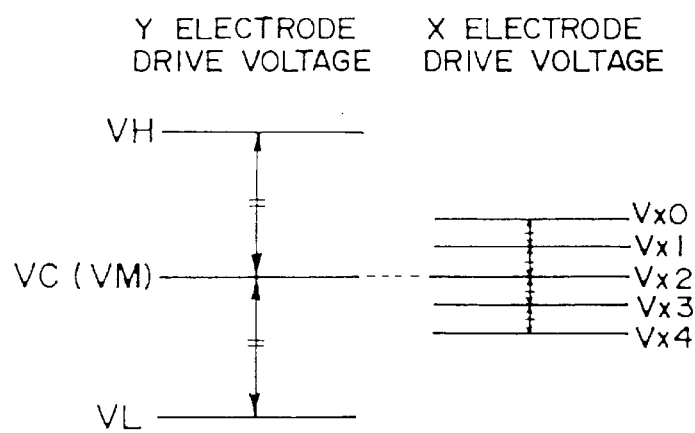
FIG. 45B is a diagram illustrative of the potential relationships of the drive voltages thereof.

The voltages that must be applied to the liquid crystal panel with this drive method are shown in FIG. 45B. A non-selection level VC and selection levels VH and VL are necessary for driving the Y electrodes, and VH and VL are in a mutually symmetrical relationship centered on VC. Five levels of voltages, Vx0 to vx4, are necessary for driving the X electrodes, where Vx2 and vC are at the same potential. Vx0 and Vx4, and Vx1 and Vx3 are in mutually symmetrical relationships centered on Vx2, and the relationships (Vx0−Vx1)=(Vx1−Vx2)=(Vx2−Vx3)=(Vx3−Vx4) are satisfied. If, for example, the voltage of vC is 0 V and the number of Y electrodes scanned within one frame period is on the order of 240 and an ordinary liquid crystal having an effective voltage of Vth on the order of 2 V is used, VH is approximately 11.3 V and Vx0 is approximately 2.9 V. In other words, this embodiment differs from Embodiment 14 in that two levels of voltages that are mutually symmetrical with respect to a center potential are added as drive voltages for the X electrodes, and VH is slightly lower and VH is slightly higher.

Since the levels of VCC and Vx0 are comparatively close, particularly when VCC is 3.3 V, it is possible to use VCC without modification as Vx0, as shown in FIG. 45A. In such a case, use of a liquid crystal with a slightly high Vth or a setting of VEE that is slightly low will facilitate contrast adjustment.

EMBODIMENT 16

Figure 46A:
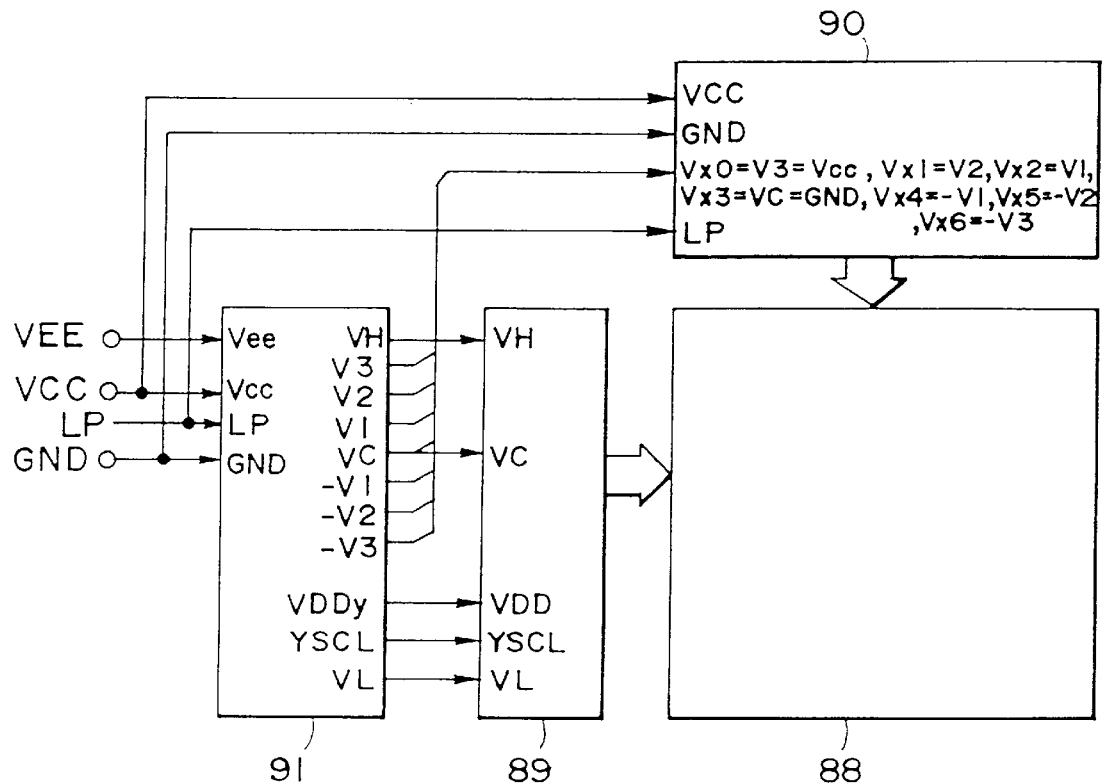

Another configurational example of a liquid crystal display device is shown in FIG. 46A. This embodiment gives an example of driving Y electrodes by a six-line simultaneous selection drive method.

Figure 46B:
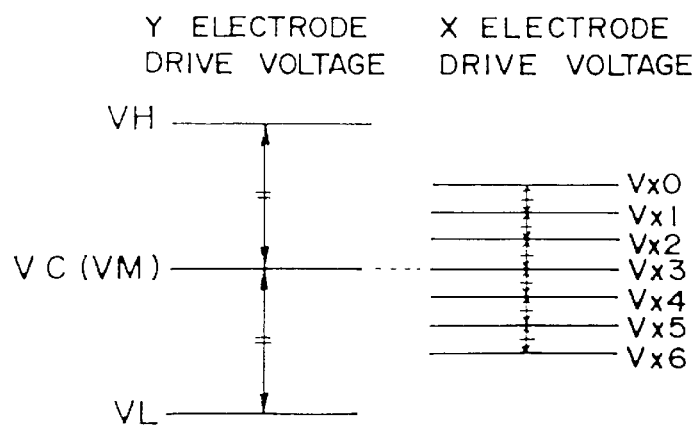
FIG. 46B is a diagram illustrative of the potential relationships of the drive voltages thereof.

The voltages that must be applied to the liquid crystal panel with this drive method are shown in FIG. 46B. A non-selection level VC and selection levels VH and VL are necessary for driving the Y electrodes, and VH and VL are in a mutually symmetrical relationship centered on VC. Seven levels of voltages, Vx0 to Vx6, are necessary for driving the X electrodes, where Vx3 and VC are at the same potential and Vx0 to Vx6 satisfy the relationships (Vx0−Vx1)=(Vx1−Vx2)=(Vx2−Vx3)=(Vx3−Vx4)=(Vx4−Vx5)=(Vx5−Vx6). If, for example, the voltage of VC is 0 V and the number of Y electrodes scanned within one frame period is on the order of 240 and an ordinary liquid crystal having an effective voltage of Vth on the order of 2 V is used, VH is approximately 9.2 V and Vx0 is approximately 3.6 V. In other words, this embodiment differs from Embodiment 15 in that two levels of voltages that are mutually symmetrical with respect to a center potential are added as drive voltages for the X electrodes, and VH is slightly lower and Vx0 is slightly higher.

Since the levels of VCC and Vx0 are comparatively close, particularly when VCC is 3.3 V, it is possible to use VCC without modification as Vx0, as shown in FIG. 46A. In such a case, use of a liquid crystal with a slightly low Vth or a setting of VEE slightly high will facilitate contrast adjustment.

The discussion now turns to how far it is practicable to increase the number of simultaneously selected Y electrodes. If, for example, 15 or 16 lines are simultaneously selected and the number of Y electrodes scanned within one frame period is on the order of 240, the maximum voltage amplitude necessary for driving the Y electrodes becomes equal to the maximum voltage amplitude necessary for driving the X electrodes. If an ordinary liquid crystal having an effective voltage of Vth on the order of 2 V is used, this voltage is a little less than 6 V. It is possible to make do with a lower maximum voltage necessary for the drive method as the number of simultaneously selected Y electrodes increases, within a range in which the number of simultaneously selected lines is 16 or less, and this has the advantage of reducing the power consumption. It should be noted, however, that the power circuit becomes more complicated as the number of necessary voltage levels increases, and also the cost of the X driver IC increases, so it could be said that the practicable number of simultaneously selected lines is no more than eight.

In the above described Embodiments 13 to 16, the first and second input potentials VCC and GND are used as one of V3, V2, V1, VC, −V1, −V2, and −V3 (the first to Nth potentials) and also as a power source for the logic portions of the driver ICs. It is preferable to provide another power source for driving the logic portions of the driver ICs, in addition to the input power source (VEE, VCC and GND, or VCC and GND) used by the power circuit 91, from the viewpoint of driving the liquid crystal panel with optimal voltages. However, it is not preferable to increase the number of potentials within the input power source, from the viewpoint of the user of the liquid crystal display device. As described with reference to Embodiments 13 to 16, drive is performed with a voltage that deviates somewhat from the optimum voltage, even when VCC and GND are used as one of V3, V2, V1, VC, −V1, −V2, and −V3 and also as a power source for the logic portions of the driver ICs, but a display with a problem-free image quality can be obtained in practice. It is therefore practicable to restrain any increase in the number of potentials within the input power source in Embodiments 13 to 16.

Note that, if there is no voltage equal to VCC or GND within the voltages V3, V2, V1, VC, −V1, −V2, and −V3, the configuration could be such that a voltage different from VCC and GND is generated by a charge pump operation and the thus generated voltage is used as one of V3, V2, V1, VC, −V1, −V2, and −V3, as described previously with reference to FIG. 33.

As shown in FIG. 41, etc., the latch pulse signal LP for the X driver or the shift clock signal YSCL for the Y driver is used as the pulsed clock signal that is input to the power circuit 91 of Embodiments 13 to 16. The reasons why the signal that forms the clock signal for the power circuit 91 is preferably a periodically pulsed clock signal have already been discussed in the section on Embodiment 2. Since the latch pulse signal for the X driver is normally a periodic pulsed clock signal with a period on the order of 30 μs to 100 μs and a pulse width on the order of 100 ns to 300 ns, it can be used without problems as the pulsed clock signal of the power circuit 91. With some liquid crystal display devices, the shift clock signal for the Y driver is input separately from the latch pulse signal for the X driver, but both of the shift clock signal for the Y driver and the latch pulse signal for the X driver are periodic pulsed clock signals, so there is no problem which either of these signals is used as a clock signal. These signals are most suitable, of the timing signals that are input to the liquid crystal display device. Since a large proportion of the current consumption in a liquid crystal display device is due to currents flowing at the switching of the horizontal scan periods, it seems reasonable to ensure that the charge pump circuits that supply these currents operate in synchronization with the latch pulse signal for the X driver or the shift clock signal for the Y driver, which are clock signals with a pulse in every horizontal scan period. A clock signal with a longer period would cause an insufficient boosting capability. Conversely, a pulsed clock signal with a shorter period would be preferable from the viewpoint of ensuring a good boosting capability, but such a signal would not have to be input to the liquid crystal display device which would make it necessary to fabricate it specially, and this would lead to an increase in the size of the circuit.

EMBODIMENT 17

Figure 47:
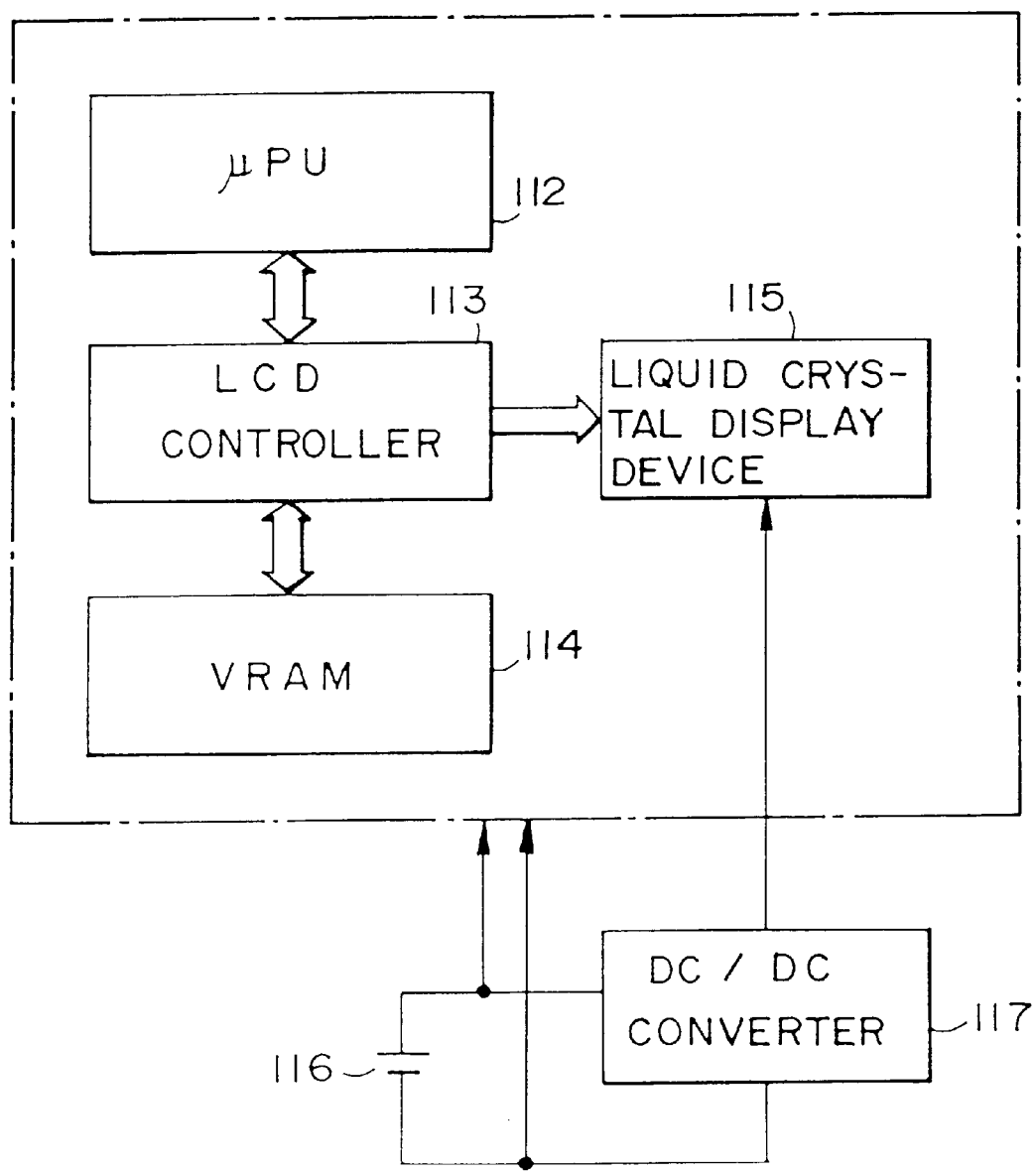
FIG. 47 is a block diagram of an example of electronic equipment relating to Embodiment 17.
Figure 48:
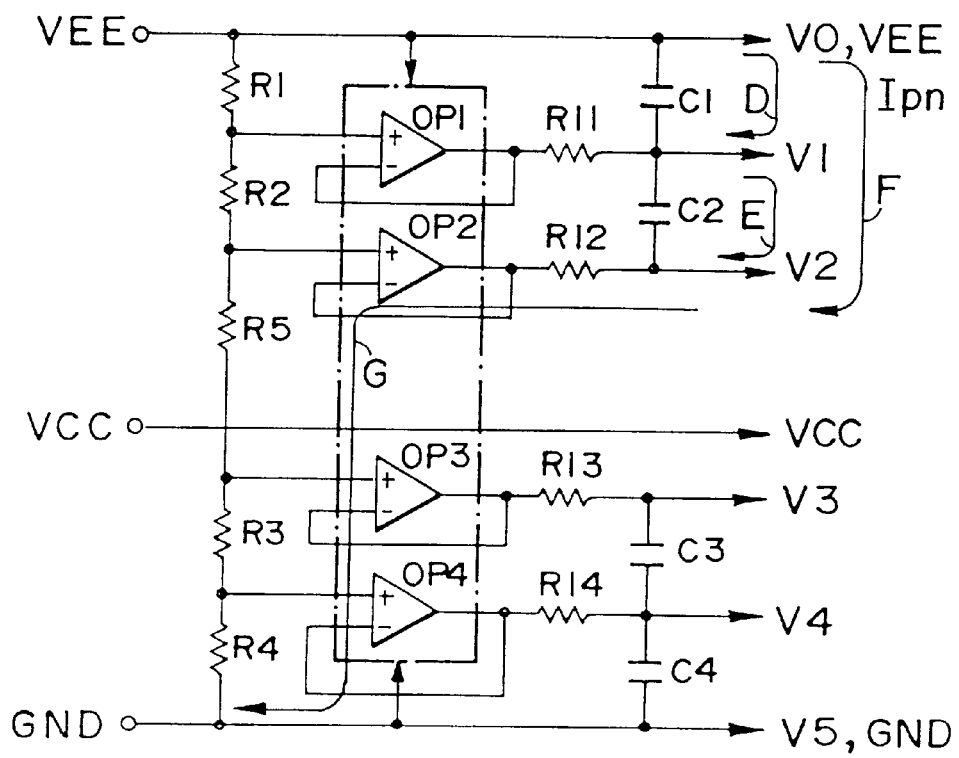
FIG. 48 is a circuit diagram of an example of the power circuit of a first prior-art example.

An example of electronic equipment in which the liquid crystal display device of this invention is installed is shown in FIG. 47. A micro processor unit (μPU) 112 is designed to control the entire electronic equipment, and an LCD controller 113 is designed to send necessary timing signals and display data to a liquid crystal display device 115. Memory (VRAM) 114 is designed to store display data and a battery 116 is the power source of the electronic equipment. A DC/DC converter 117 generates the high voltages necessary for the liquid crystal display device 115, from the voltage of the battery 116. The DC/DC converter 117 could be incorporated within the liquid crystal display device, and if it is incorporated therein it is preferable to use a DC-DC converter using the charge pump method of this invention. Use of the liquid crystal display device of this invention in such electronic equipment makes it possible to greatly reduce the power consumption of the electronic equipment.

It should be noted that this invention is not limited to Embodiments 1 to 17 described herein, and it is possible to conceive of many different modifications within the scope of this invention.

For example, the method of using a pulsed clock signal, the method of adjusting the boosting ratio, and the method of performing a charge pump operation every horizontal scan period are not limited to the power circuits of the configurations shown in FIGS. 1 and 34, etc., and thus they can be applied in many different forms, provided that the power circuit comprises at least a charge pump circuit for supplying the first to Nth potentials.

Similarly, the configurations of the charge pump circuits are not limited to those shown in FIGS. 6 to 24.

Furthermore, although the above embodiments were described by way of example as using charge pump circuits that utilize a latch pulse signal LP, a non-overlapping clock signal could be generated by means such as a delay circuit, if LP is not used.

I claim:

1. A power circuit to which input power source is applied and which supplies first to Nth potentials (where N≧4) for driving a display element, said power circuit comprising:

means for supplying a first input potential on a high-potential side comprised within said input power source as a Gth potential within said first to Nth potentials (where 1<G<N);

means for supplying a second input potential on a low-potential side comprised within said input power source as a Jth potential within said first to Nth potentials (where 1<J<N);

a charge pump circuit which operates based on a given clock signal to thereby supply said first potential on the high-potential side, either directly or via adjustment means; and a charge pump circuit which operates based on a given clock signal to thereby supply said Nth potential on the low-potential side, either directly or via adjustment means.

2. The power circuit as defined in claim 1, wherein:

a potential other than said first, Gth, Jth, and Nth potentials within said first to Nth potentials is supplied by a given op-amp or a charge pump circuit which operates based on a given clock signal.

3. The power circuit as defined in claim 1, wherein:

said first to Nth potentials are formed symmetrically with respect to one of:

said first input potential; said second input potential; a center potential between said first and second input potentials; or, when a potential differing from said first and second input potentials has been generated, a center potential between said generated potential and said first or second input potential.

4. The power circuit as defined in claim 1, wherein:

a potential differing from said first and second input potentials is generated by the charge pump circuit on the basis of said first and second input potentials, and said generated potential is used as one of said Gth and Jth potentials.

5. A power circuit to which input power source is applied and which supplies first to Nth potentials (where $N \geq 4$) for driving a display element, said power circuit comprising:

a charge pump circuit for performing a K-times (where $K \geq 2$) boosting charge pump operation based on a given clock signal to thereby supply one of said first to Nth potentials, either directly or via adjustment means; and a charge pump circuit for performing an L/M-times (where L/M is not an integer) dropping or M/L-times boosting charge pump operation based on a given clock signal to thereby supply one of said first to Nth potentials, either directly or via adjustment means.

6. A power circuit to which input power source is applied and which supplies first to Nth potentials (where $N \geq 4$) for driving a display element, said power circuit comprising:

a charge pump circuit which operates based on a clock signal comprising periodical pulses, to thereby supply one of said first to Nth potentials, either directly or via adjustment means; and means for stopping charging of a pumping capacitor comprised within said charge pump circuit and charging of a backup capacitor by said pumping capacitor during a period within said pulses.

7. A power circuit to which input power source is applied and which supplies first to Nth potentials (where $N \geq 4$) for driving a display element, said power circuit comprising:

a charge pump circuit which operates based on a given clock signal to thereby supply one of said first potential on a high-potential side and said Nth potential on a low-potential side, either directly or via adjustment means; and a charge pump circuit which operates for charging a backup capacitor alternately by a plurality of pumping capacitors on the basis of a given clock signal, to thereby supply an Ith potential within said first to Nth potentials (where $1<I<N$), either directly or via adjustment means.

8. A power circuit to which input power source is applied and which supplies first to Nth potentials (where $N \geq 4$) for driving a display element, said power circuit comprising:

a charge pump circuit which operates based on a given clock signal to thereby supply one of said first to Nth potentials either directly or via an adjustment means; and means for charging a pumping capacitor comprised within said charge pump circuit and charging a backup capacitor by said pumping capacitor, every horizontal scan period.

9. The power circuit as defined in claim 8, wherein said charge pump circuit operates for alternately charging said backup capacitor by a plurality of pumping capacitors every horizontal scan period.

10. A power circuit to which input power source is applied and which supplies first to Nth potentials (where $N \geq 4$) for driving a display element, said power circuit comprising:

a charge pump circuit for performing a K-times (where $K \geq 2$) boosting or L/M-times (where L/M is not an integer) dropping or M/L-times boosting charge pump operation based on a given clock signal to thereby supply one of said first to Nth potentials, either directly or via adjustment means; and means for adjusting boosting ratio or dropping ratio of said charge pump circuit.

11. A power circuit to which input power source is applied and which supplies first to Nth potentials (where $N \geq 4$) for driving a display element, said power circuit comprising:

a charge pump circuit which operates based on a given clock signal to thereby supply one of said first potential on a high-potential side and said Nth potential on a low-potential side, either directly or via adjustment means; and means for stopping the generation of said first potential or said Nth potential by said charge pump circuit during a given period after the application of said input power source.

12. A power circuit to which input power source is applied and which supplies first to Nth potentials (where $N \geq 4$) for driving a display element, said power circuit comprising:

means for supplying a first input potential on a high-potential side comprised within said input power source as a Gth potential within said first to Nth potentials (where $1<G<N$);

means for supplying a second input potential on a low-potential side comprised within said input power source as a Jth potential within said first to Nth potentials (where $1<J<N$);

means for supplying a third input potential on the high-potential side or low-potential side of said first and second input potentials comprised within said input power source as one of said first potential on a high-potential side and said Nth potential on a low-potential side;

a charge pump circuit which operates based on a given clock signal to thereby supply one of said first and Nth potentials, either directly or via adjustment means; and a charge pump circuit which operates based on a given clock signal to thereby supply an Fth potential (where $1<F<N$) on either a high-potential side or a low-potential side of said Gth and Jth potential, either directly or via adjustment means; and wherein potentials within said first to Nth potentials but which are not one of said first, Fth, Gth, Jth, and Nth potentials are each supplied by a charge pump circuit that operates based on a given clock signal.

13. A power circuit to which input power source is applied and which supplies first to Nth potentials (where $N \geq 4$) for driving a display element, said power circuit comprising:

a charge pump circuit which operates based on a given clock signal to thereby supply one of said first to Nth potentials either directly or via an adjustment means; and means for releasing residual charge in circuit portions supplied with a potential obtained from at least one of said first and Nth potentials, when at least one of the following events has occurred: the supply of said input power source is stopped the supply of said given clock signal is stopped, or a display-off control signal is input.

14. The power circuit as defined in claim 1 or 5 further comprising:

means for stopping said given clock signal of said charge pump circuits.

15. A liquid crystal display device comprising:

a power circuit as defined in claims 1, 5 or 12;

a liquid crystal panel having a liquid crystal layer driven by a plurality of data line electrodes and a plurality of scan line electrodes;

a data line driver for driving said data line electrodes; and a scan line driver for driving said scan line electrodes.

16. A liquid crystal display device comprising:

a power circuit to which input power source is applied and which supplies first to Nth potentials (where $N \geq 4$);

a liquid crystal panel having a liquid crystal layer driven by a plurality of data line electrodes and a plurality of scan line electrodes;

a data line driver for driving said data line electrodes; and a scan line driver for driving said scan line electrodes; and wherein said power circuit comprises:

means for supplying a first input potential on a high-potential side and a second input potential on a low-potential side comprised within said input power source, as the other of said first to Nth potentials; and a charge pump circuit which operates based on a given clock signal to thereby supply one of said first to Nth potentials either directly or via an adjustment means; and wherein said first and second input potentials are used as power source for a logic portion in at least one of said data line driver and said scan line driver.

17. The liquid crystal display device as defined in claim 16, wherein said power circuit comprises:

a charge pump circuit for generating a potential differing from said first and second input potentials by a charge pump operation based on a given clock signal, and supplying said generated potential as one of said first to Nth potentials.

18. A liquid crystal display device comprising:

a power circuit to which input power source is applied and which supplies first to Nth potentials (where $N \geq 4$);

a liquid crystal panel having a liquid crystal layer driven by a plurality of data line electrodes and a plurality of scan line electrodes;

a data line driver for driving said data line electrodes; and a scan line driver for driving said scan line electrodes; and wherein said power circuit comprises:

a charge pump circuit which operates based on a clock signal generated from a latch pulse signal for said data line driver or a shift clock signal for said scan line driver, to thereby supply one of said first to Nth potentials, either directly or via adjustment means.

19. Electronic equipment comprising a liquid crystal display device as defined in claim 15.

20. Electronic equipment comprising a liquid crystal display device as defined in claims 16 or 17.

* * * * *